United States Patent
Shimodaira et al.

(10) Patent No.: US 10,974,386 B2
(45) Date of Patent: Apr. 13, 2021

(54) ROBOT SIMULATION APPARATUS AND ROBOT SIMULATION METHOD

(71) Applicant: Keyence Corporation, Osaka (JP)

(72) Inventors: Masato Shimodaira, Osaka (JP); Tomotaka Shimano, Osaka (JP); Naoki Takayama, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 367 days.

(21) Appl. No.: 15/893,736

(22) Filed: Feb. 12, 2018

(65) Prior Publication Data

US 2018/0250820 A1 Sep. 6, 2018

(30) Foreign Application Priority Data

Mar. 3, 2017 (JP) .............................. JP2017-040967

(51) Int. Cl.
*G06F 111/10* (2020.01)
*G06F 3/0484* (2013.01)
(Continued)

(52) U.S. Cl.
CPC ........... *B25J 9/1671* (2013.01); *B25J 9/1669* (2013.01); *B25J 9/1697* (2013.01); *G06F 30/20* (2020.01);
(Continued)

(58) Field of Classification Search
CPC ...... B25J 9/1671; B25J 9/1669; B25J 9/1697; G06F 30/20; G06F 30/23; G06F 2111/10;
(Continued)

(56) References Cited

U.S. PATENT DOCUMENTS 9,529,945 B2 * 12/2016 Atohira .................. B25J 9/1687
9,569,568 B2 * 2/2017 Kimoto .................. B25J 9/1671
(Continued)

FOREIGN PATENT DOCUMENTS

JP 2002-331480 11/2002
JP 2007-241857 9/2007
(Continued)

OTHER PUBLICATIONS

U.S. Appl. No. 15/893,741, filed Feb. 12, 2018 (257 pages).
(Continued)

*Primary Examiner* — Juan C Ochoa
(74) *Attorney, Agent, or Firm* — Kilyk & Bowersox, P.L.L.C.

(57) ABSTRACT

The robot simulation apparatus includes: a workpiece model setting unit 11 that sets a workpiece model obtained by forming a model of a three-dimensional shape of a workpiece; a bulk pile data generating unit 20 that generates virtual bulk pile data of a plurality of workpiece models piled up in a virtual work space as a virtually formed work space; a region estimating unit 22 that identifies an estimated region that is estimated to be three-dimensionally measurable by a sensor unit which is disposed above the work space, based on a position and a posture of each workpiece model in the bulk pile data; and a picking motion simulating
(Continued)

unit 30 that executes a simulation for verifying the picking motion from the bulk pile of the workpiece models in the virtual work space, based on data of the estimated region identified by the region estimating unit 22.

17 Claims, 61 Drawing Sheets

(51) Int. Cl.
*B25J 9/16* (2006.01)
*G06F 30/20* (2020.01)
*G06F 30/23* (2020.01)
*G06T 15/50* (2011.01)

(52) U.S. Cl.
CPC .... *G06F 30/23* (2020.01); *G05B 2219/40053* (2013.01); *G05B 2219/45063* (2013.01); *G06F 3/04847* (2013.01); *G06F 2111/10* (2020.01); *G06T 15/50* (2013.01); *G06T 2215/16* (2013.01); *Y10S 901/02* (2013.01); *Y10S 901/31* (2013.01); *Y10S 901/47* (2013.01)

(58) Field of Classification Search
CPC ...... G06F 3/04847; G05B 2219/40053; G05B 2219/45063; G06T 15/50; G06T 2215/16; G06T 17/00; Y10S 901/02; Y10S 901/31; Y10S 901/47
USPC .................................................. 703/1, 4, 7
See application file for complete search history.

(56) References Cited

U.S. PATENT DOCUMENTS

| | | | | |
|---|---|---|---|---|
| 2013/0158947 A1* | 6/2013 | Suzuki | .................... | G06F 15/00 |
| | | | | 702/155 |
| 2013/0301909 A1* | 11/2013 | Sato | ..................... | G03H 1/0443 |
| | | | | 382/154 |
| 2015/0323321 A1* | 11/2015 | Oumi | ........................ | G06T 7/74 |
| | | | | 348/136 |
| 2016/0125126 A1* | 5/2016 | Albou | .................... | G16B 15/00 |
| | | | | 703/11 |
| 2016/0379370 A1* | 12/2016 | Nakazato | ............... | G01B 11/24 |
| | | | | 382/103 |

FOREIGN PATENT DOCUMENTS

| | | |
|---|---|---|
| JP | 2007-326160 | 12/2007 |
| JP | 4153528 B2 | 9/2008 |
| JP | 2012-71394 | 4/2012 |
| JP | 2015-171745 | 10/2015 |
| JP | 2015-215259 | 12/2015 |

OTHER PUBLICATIONS

U.S. Appl. No. 15/893,852, filed Feb. 12, 2018 (255 pages).
U.S. Appl. No. 15/894,183, filed Feb. 12, 2018 (444 pages).
U.S. Appl. No. 15/894,962, filed Feb. 13, 2018 (434 pages).
U.S. Appl. No. 15/895,263, filed Feb. 13, 2018 (77 pages).
U.S. Appl. No. 15/895,467, filed Feb. 13, 2018 (171 pages).

* cited by examiner

WMC

WMC

WMC

WMC

WMC

| DISPOSITION METHOD | | |
|---|---|---|
| NUMBER OF DISPOSED WORKPIECE MODELS IN X DIRECTION | 5 | MODELS |
| DISPOSITION INTERVAL | 50 | mm |
| NUMBER OF DISPOSED WORKPIECE MODELS IN Y DIRECTION | 3 | MODELS |
| DISPOSITION INTERVAL | 100 | mm |
| NUMBER OF LAYER IN Z DIRECTION | 3 | LAYERS |
| OK | CANCEL | |

— 120

WM4

WM4

WM5

WM5

ROBOT SIMULATION APPARATUS AND ROBOT SIMULATION METHOD

CROSS-REFERENCE TO RELATED APPLICATIONS

The present application claims foreign priority based on Japanese Patent Application No. 2017-040967, filed Mar. 3, 2017, the contents of which is incorporated herein by reference.

BACKGROUND OF THE INVENTION

1. Field of the Invention

The present invention relates to a robot simulation apparatus, and a robot simulation method.

2. Description of Related Art

A robot apparatus that includes a manipulator combined with robot vision and is capable of imaging a workpiece which is a target so as to acquire height information, then, grasping (picking) an appropriate position of the workpiece, and mounting (placing) the workpiece at a desired position has been developed. By using such a robot apparatus, multiple workpieces put in a returnable container are imaged by a sensor unit such as a camera such that postures thereof are found and an appropriate grasping position is found. Then, an arm of a robot is moved to the grasping position, and an end effector such as a hand portion grasps the workpiece and places the workpiece at a determined position outside the returnable container. Such work is referred to as picking from a bulk pile, and a robot simulation apparatus has been developed to perform, in a three dimensional manner in advance, a simulation of a picking or placing motion of a robot that performs the picking from a bulk pile such that it is possible to properly operate the picking from a bulk pile.

In such a robot simulation apparatus, CAD models as workpiece models which have a three-dimensional shape of a workpiece are randomly disposed in a virtual work space that is a virtually formed work space and a picking-up process, that is, the picking from a bulk pile, by a robot is simulated.

However, during an actual operation, a region of a workpiece which can be measured by a sensor unit is only a region positioned on the outermost surface when viewed from the sensor unit installed above, and it is not possible to measure a region of the workpiece on the back side or a region at a blind spot formed due to another workpiece or a container. In addition, even when a region is positioned on the outermost surface, it is not possible to measure a region having a steep inclination or having a large amount of specular component because it is not possible for the sensor unit to receive sufficient reflected light. For example, a metal workpiece may have high specular reflection, and thus there may be a portion that is not measurable due to the posture of the workpiece.

As an example, regarding a certain workpiece, FIGS. 79A and 79B illustrate an appearance of a workpiece displayed in the simulation and a state in which the real shape of the workpiece is actually measured, respectively. With a workpiece model WM having a shape that is clearly displayed in the simulation as illustrated in FIG. 79A, it is not possible to measure a three-dimensional shape of a portion having a steep inclination in a case where the portion is imaged from above by a camera or with illumination during actual measurement as illustrated in FIG. 79B.

As described above, bulk pile data of piled-up CAD models used in the simulation is three-dimensional data including complete height information. Therefore, although it is possible to search for a workpiece model, there is a region on which it is not possible to perform measurement during an actual operation, and thus the search may be unsuccessful. In other words, in the simulation in the related art, since a workpiece model is detected to have a complete three-dimensional shape that cannot be acquired during an actual operation, a workpiece model that cannot be detected during the actual operation is even successfully grasped in the simulation. Therefore, even when grasping is successfully performed in the simulation, grasping is likely to be unsuccessful in the actual operation. This may be a reason for a difference between a result of a simulation and a result of an actual operation.

Japanese Patent 4153528, JP-A-2015-215259, JP-A-2002-331480, and JP-A-2015-171745 are examples of the related art.

SUMMARY OF THE INVENTION

The present invention is made in such a circumstance, and an object thereof is to provide a robot simulation apparatus, a robot simulation method, a robot simulation program, and a computer readable recording medium and recording device by which a result of a simulation approximates to a result obtained during an actual operation.

According to a first aspect of the present invention, there is provided a robot simulation apparatus that causes a sensor unit to measure three-dimensional shapes of a plurality of workpieces piled up in a work space so as to simulate picking motions from a bulk pile by a robot which performs picking sequentially, the robot simulation apparatus including: a workpiece model setting unit that sets a workpiece model obtained by forming a model of a three-dimensional shape of a workpiece; a bulk pile data generating unit that generates virtual bulk pile data of the plurality of workpiece models piled up in a virtual work space as a virtually formed work space; a region estimating unit that identifies an estimated region that is estimated to be three-dimensionally measurable by a sensor unit which is disposed above the work space, based on a position and a posture of each workpiece model in the bulk pile data; and a picking motion simulating unit that executes a simulation for verifying the picking motion from the bulk pile of the workpiece models in the virtual work space, based on data of the estimated region identified by the region estimating unit. In this configuration, even when there is no preparation of disposing a sensor unit, piling up workpieces, or the like in the real world, it is possible to virtually establish a state approximate to a state in which workpieces piled in bulk are imaged and to perform a simulation in advance. In particular, a simulation is performed in consideration of a region that cannot be three-dimensionally measured during an actual operation. In this manner, it is possible to reduce a difference between the simulation and the actual operation, and to perform a simulation with high reliability.

In addition, according to a second aspect, there is provided a robot simulation apparatus that causes a sensor unit to measure three-dimensional shapes of a plurality of workpieces piled up in a work space so as to simulate picking motions from a bulk pile by a robot which performs picking sequentially, the robot simulation apparatus including: a workpiece model setting unit that sets a workpiece model obtained by forming a model of a three-dimensional shape of a workpiece; a bulk pile data generating unit that generates virtual bulk pile data of the plurality of workpiece models piled up in a virtual work space as a virtually formed work space; a region estimating unit that identifies an estimated region that is estimated to be difficult to be three-dimensionally measured by a sensor unit which is disposed above the work space, based on a position and a posture of each workpiece model in the bulk pile data; a simulating data generating unit that generates bulk pile data as data for simulation, which does not include data of the estimated region identified by the region estimating unit; and a picking motion simulating unit that executes a simulation for verifying the picking motion from the bulk pile of the workpiece models in the virtual work space, by using the data for simulation. In this configuration, even when there is no preparation of disposing a sensor unit, piling up workpieces, or the like in the real world, it is possible to virtually establish a state approximate to a state in which workpieces piled in bulk are imaged and to perform simulation in advance. In particular, the simulation is performed in consideration of a region in which that cannot be three-dimensionally measured during an actual operation. In this manner, it is possible to reduce a difference between the simulation and the actual operation, and to perform the simulation with high reliability.

Further, in the robot simulation apparatus according to a third aspect, in addition to this configuration, when any workpiece model is picked up during execution of the simulation of picking motion from a bulk pile by the picking motion simulating unit, the simulating data generating unit may be configured to update the data for simulation by re-estimating a measurable region with respect to remaining workpiece models. In this configuration, a change in the remaining workpiece models, which can occur in a case where the workpiece model on the top side is picked up, is considered. Therefore, it is possible to measure a workpiece model positioned below the top workpiece model, and thus the simulation of picking from a bulk pile is realized with higher accuracy.

Furthermore, the robot simulation apparatus according to a fourth aspect may further include, in addition to any one of the configurations, a sensor model setting unit that sets a camera model, as a virtual sensor model, which virtually indicates a position and a posture of a camera, which is used for three-dimensional measurement of a workpiece.

Furthermore, in the robot simulation apparatus according to a fifth aspect, in addition to this configuration, the sensor model setting unit may be configured to include a projector model that virtually indicates a position and a posture of a projector, which is used for three-dimensional measurement of a workpiece, in the sensor model.

Furthermore, in the robot simulation apparatus according to a sixth aspect, in addition to this configuration, the region estimating unit may have a configuration in which the estimated region, that is, a region at a blind spot when viewed from the sensor model set by the sensor model setting unit, is estimated as a blind spot region in which measurement is difficult to be performed.

Furthermore, in the robot simulation apparatus according to a seventh aspect, in addition to any one of the configurations, as the estimated region, depending on a type of a sensor model that measures a three-dimensional shape set by the sensor model setting unit, the region estimating unit may define, as a blind spot region, a region at a blind spot from any one of the camera model and the projector model in a case where a sensor unit virtually reproduces a state of three-dimensional measurement through a fringe projection method or an optical cutting method, and a region at a blind spot from any one of a plurality of camera models in a case where a sensor unit virtually reproduces a state of the three-dimensional measurement through a stereo method using a plurality of cameras.

Furthermore, in the robot simulation apparatus according to an eighth aspect, in addition to this configuration, the region estimating unit may change the blind spot region depending on a position of the workpiece model in a plane direction in the virtual work space. In this configuration, it is possible to take action for a case where a blind spot is more likely to be generated on a peripheral portion than on the central portion of a visual field of the measurement in the work space and the like, and thus it is possible to increase the accuracy of the simulation.

Furthermore, in the robot simulation apparatus according to a ninth aspect, in addition to any one of the configurations, the region estimating unit may be configured to define a line segment, as a virtual optical axis, which connects a three-dimensional virtual measurement light source used when the three-dimensional measurement is performed using the sensor model and each of points that configure the bulk pile data, to determine whether or not a point of another workpiece model is present on the virtual optical axis, to estimate the point as a point that is difficult to be three-dimensionally measured in a case where the point of the other workpiece model is present, and to identify an estimated region with a set of points that are difficult to be three-dimensionally measured. In this configuration, it is possible to estimate a difficulty in measurement based on whether or not interference occurs between the virtual optical axis and the workpiece models, and thus it is possible to increase the accuracy of the simulation.

Furthermore, in the robot simulation apparatus according to a tenth aspect, in addition to any one of the configurations, the region estimating unit may have a configuration in which a region having an inclination angle equal to and larger than a predetermined angle threshold with respect to a measurement axis extending from the three-dimensional virtual measurement light source of the sensor model set by the sensor model setting unit is estimated as a region that is difficult to be three-dimensionally measured.

Furthermore, in the robot simulation apparatus according to an eleventh aspect, in addition to any one of the configurations, the angle threshold may be a predetermined fixed value.

Furthermore, the robot simulation apparatus according to a twelfth aspect may further include, in addition to any one of the configurations, a front-surface state parameter setting unit that inputs a parameter related to a front-surface state of the workpiece model. The angle threshold may be changed depending on the front-surface state parameter set by the front-surface state parameter setting unit.

Furthermore, in the robot simulation apparatus according to a thirteenth aspect, in addition to any one of the configurations, the angle threshold may be changed, based on three-dimensional measurement data actually measured by a sensor unit.

Furthermore, in the robot simulation apparatus according to a fourteenth aspect, in addition to any one of the configurations, the region estimating unit may be configured to estimate an estimated region, in which measurement is difficult to be performed, from bulk pile data of the piled-up workpiece models used in a simulation, based on the virtual sensor model set by the sensor model setting unit.

Furthermore, in the robot simulation apparatus according to a fifteenth aspect, in addition to any one of the configurations, the region estimating unit may be configured to estimate an estimated region, in which measurement is difficult to be performed, based on actual measurement data obtained by simulatively performing three-dimensional measurement on workpieces piled in bulk, by the sensor unit. In this configuration, since it is possible to estimate a region, in which the measurement is difficult to be performed, based on data obtained by performing the actual measurement on the workpieces piled in the bulk, it is possible to execute the simulation with higher accuracy.

Furthermore, the robot simulation apparatus according to a sixteenth aspect, may further include, in addition to any one of the configurations, a simulation environment setting unit that sets information of an environment of a simulation.

Furthermore, in the robot simulation apparatus according to a seventeenth aspect, in addition to this configuration, the simulation environment setting unit may be configured to be capable of setting a container model obtained by forming a model of a container that accommodates workpieces and is configured to estimate an estimated region, based on a relative positional relationship between the sensor model and the container model.

Furthermore, the robot simulation apparatus according to an eighteenth aspect, in addition to any one of the configurations, the workpiece model setting unit may set the workpiece model as a three-dimensional CAD model generated by CAD.

Furthermore, in the robot simulation apparatus according to a nineteenth aspect, in addition to any one of the configurations, the workpiece model setting unit may set the workpiece models as point group data having three-dimensional information.

Furthermore, in the robot simulation apparatus according to a twentieth aspect, in addition to any one of the configurations, the workpiece model setting unit may set the workpiece models as image data having height information.

Furthermore, according to a twenty-first aspect, there is provided a robot simulation method for simulating picking motions from a bulk pile by a robot which sequentially picks up a plurality of workpieces piled up in a work space, the robot simulation method including: setting a workpiece model obtained by forming a model of a three-dimensional shape of a workpiece; generating virtual bulk pile data of the plurality of piled-up workpiece models, which are set in the setting of the workpiece model, in a virtual work space as a virtually formed work space; identifying an estimated region that is estimated to be three-dimensionally measurable by a sensor unit which is disposed above the work space, based on a position and a posture of each workpiece model in the bulk pile data generated in the generating of the bulk pile data; and executing a picking motion simulation for verifying the picking motion from the bulk pile of the workpiece models in the virtual work space, based on data of the estimated region identified in the identifying of the estimated region. In this configuration, even when there is no preparation of disposing a sensor unit, piling up workpieces, or the like in the real world, it is possible to virtually establish a state approximate to a state in which workpieces piled in bulk are imaged and to perform a simulation in advance.

Furthermore, according to a twenty-second aspect, there is provided a robot simulation program for simulating picking motions from a bulk pile by a robot which sequentially picks up a plurality of workpieces piled up in a work space, the robot simulation program causing a computer to realize: a workpiece model setting function of setting a workpiece model obtained by forming a model of a three-dimensional shape of a workpiece; a bulk pile data generating function of generating virtual bulk pile data of the plurality of piled-up workpiece models, which are set by the workpiece model setting function, in a virtual work space as a virtually formed work space; a region estimating function of identifying an estimated region that is estimated to be three-dimensionally measurable by a sensor unit which is disposed above the work space, based on a position and a posture of each workpiece model in the bulk pile data generated by the bulk pile data generating function; and a picking motion simulating function of executing a picking motion simulation for verifying the picking motion from the bulk pile of the workpiece models in the virtual work space, based on data of the estimated region identified by the region estimating function. In this configuration, even when there is no preparation of disposing a sensor unit, piling up workpieces, or the like in the real world, it is possible to virtually establish a state approximate to a state in which workpieces piled in bulk are imaged and to perform a simulation in advance.

Furthermore, according to a twenty-third aspect, there is provided a computer readable recording medium or recording device that records the robot simulation program. Examples of the recording media include a CD-ROM, a CD-R, CD-RW, or flexible disk, magnetic tape, a magnetic disk having a format of MO, DVD-ROM, DVD-RAM, DVD-R, DVD+R, DVD-RW, DVD+RW, Blu-ray, or HD DVD (AOD), an optical disk, a magneto-optical disk, a semiconductor memory, and another medium that is capable of storing a program. In addition, examples of programs include a program distributed by downloading through a network line such as the Internet, as well as a program that is stored in the recording media and is distributed. Further, an example of the recording device includes a general-purpose or dedicated device installed in a state in which the program can be executed in a format such as software or firmware. Furthermore, a process or a function included in the program may be executed by a program software that can be executed by a computer, or a process of each unit may be realized by hardware such as a predetermined gate array (an FPGA or an ASIC) or a form combination of the program software and a partial hardware module that realizes some elements of the hardware.

DESCRIPTION OF EMBODIMENTS

Hereinafter, embodiments of the present invention will be described with reference to the figures. However, the embodiments to be described below are examples for embodying the technical ideas of the present invention and the present invention is not limited to the following embodiments. In addition, in the present specification, a member in claims is not specifically limited to a member of the embodiments. In particular, a dimension, a material, a shape, relative disposition, or the like of constituent components, which is described in the embodiment, is not provided to limit the range of the present invention thereto only but is provided only as an example of description, as long as there is no specific description thereof. Sizes, a positional relationship, or the like of members may be illustrated in the figures in an exaggerated manner for clear description. Further, in the following description, the same name or reference sign represents the same or similar member, and detailed description thereof is appropriately omitted. Further, elements that configure the present invention may be realized in an aspect in which a plurality of elements are configured of the same member such that one member serves as the plurality of elements. Conversely, a function of one member can be realized by being imposed on a plurality of members.

Robot System

Figure 1:
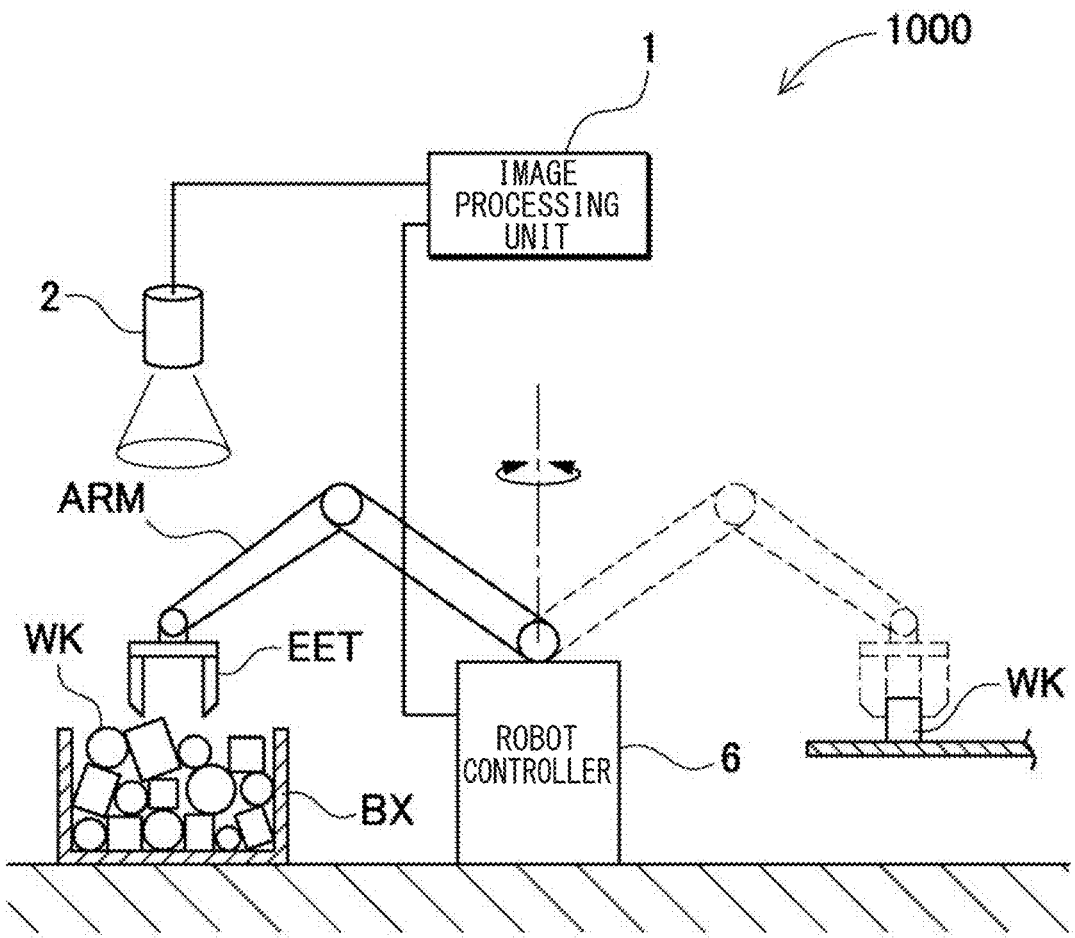
FIG. 1 is a schematic diagram illustrating a state of performing a picking motion from a bulk pile by using a robot system.
Figure 2:
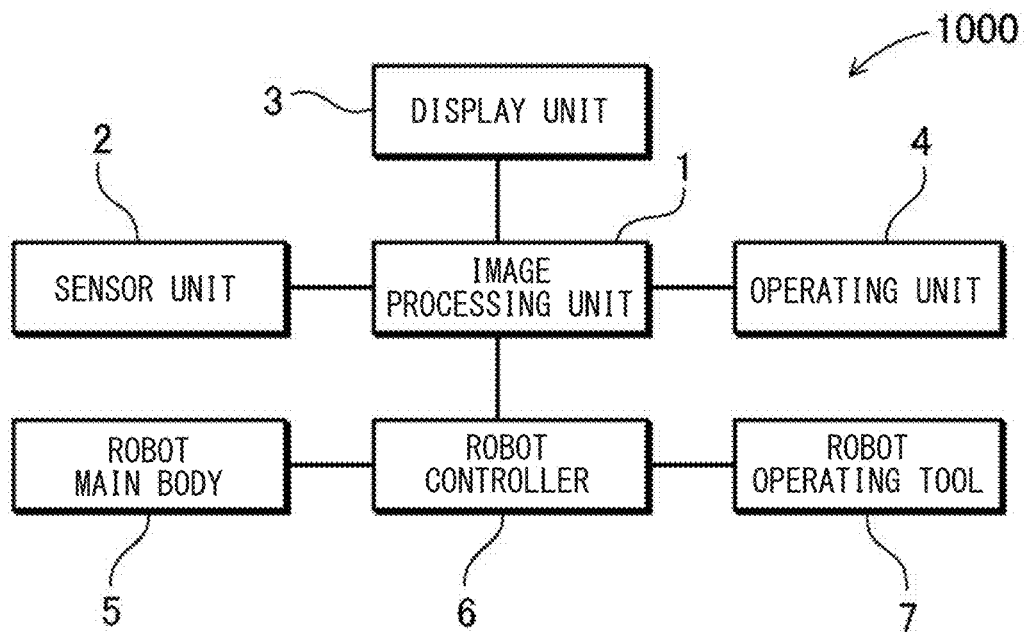
FIG. 2 is a block diagram of the robot system.

A picking motion from a bulk pile of workpieces is performed by using a robot system 1000. FIGS. 1 and 2 illustrate a configurational example of the robot system 1000 and a block diagram of the robot system 1000, respectively. In such picking from a bulk pile, a plurality of workpieces WK piled up in a work space are picked up sequentially by using a robot and are disposed at predetermined positions. For example, three-dimensional shapes of multiple components which are randomly put in an accommodation container BX are acquired by a sensor unit such as a camera or illumination, the workpieces WK are grasped one by one by an end effector EET provided at the distal end of an arm ARM of the robot, and the workpieces are aligned at predetermined positions on a conveyor belt, for example.

Picking Motion Simulation

For the picking motion from a bulk pile performed by the robot system 1000, a simulation is performed in advance such that the picking motion from the bulk pile is verified. For example, it is not possible to correctly grasp a workpiece due to an installation position of the robot, the accommodation container BX, a relative position of mounting positions thereof, a height thereof, or the like in some cases. In addition, it is not possible to correctly image the workpiece or it is even difficult to accurately measure a three-dimensional shape of the workpiece due to a position or angle at which a sensor unit is installed. A three-dimensional picking motion simulation of a picking or placing motion of a robot that performs the picking from a bulk pile in advance is performed by using a robot simulation apparatus. In the robot simulation apparatus, CAD models as workpiece models which have a three-dimensional shape of a workpiece are randomly disposed in a virtual work space that is a virtually formed work space and a picking-up process, that is, the picking from a bulk pile, by a robot is simulated. In a case where a user determines that picking is not sufficiently successful in such a simulation, the user modifies parameters for causing the robot to perform a motion and performs another simulation again.

Embodiment 1

Robot Simulation Apparatus

In Embodiment 1, three-dimensional measurement data obtained by excluding a portion, which is not measurable, is generated, based on a posture of a workpiece model in a bulk pile state such that it is possible to execute a simulation in a state approximate to the largest extent to a state of actually performing three-dimensional measurement of the workpiece, and a picking motion simulation is performed, based on the generated three-dimensional measurement data. Specifically, it is not possible to perform the three-dimensional measurement of a portion having a steep angle equal to or larger than a certain angle, based on an angle of a front surface of a workpiece model which is determined from a posture in the bulk pile state, and thus the portion is excluded from bulk pile data that is generated in the picking motion simulation. In this manner, although checking work or setting adjustment, for which time and effort is required for installing a sensor unit or actually preparing workpieces, is not performed, it is possible to realize a state approximate to a state of actually imaging workpieces piled in bulk.

Figure 3:
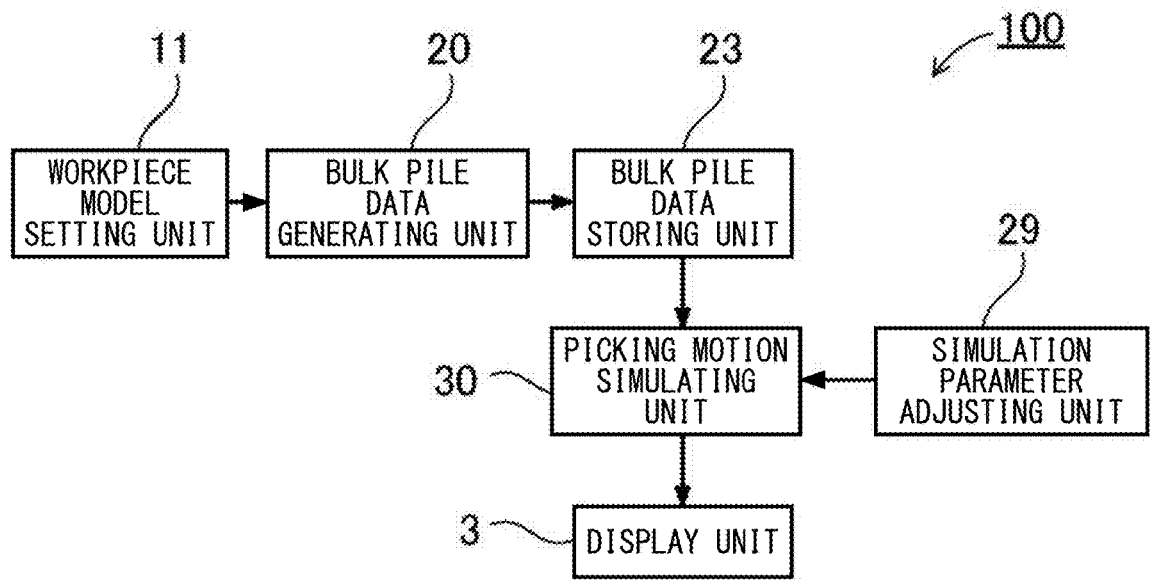
FIG. 3 is a block diagram illustrating a robot simulation apparatus according to Embodiment 1.

FIG. 3 illustrates a block diagram of a robot simulation apparatus 100 according to Embodiment 1 of the present invention. The robot simulation apparatus 100 illustrated in FIG. 3 includes a workpiece model setting unit 11, a bulk pile data generating unit 20, a bulk pile data storing unit 23, a picking motion simulating unit 30, and a simulation parameter adjusting unit 29.

The workpiece model setting unit 11 is a member that sets a workpiece model obtained by forming a model of a three-dimensional shape of a workpiece.

The bulk pile data generating unit 20 is a member that generates bulk pile data of the plurality of workpiece models piled up in a virtual work space, in accordance with a posture condition set by a posture condition setting unit 16.

The picking motion simulating unit 30 is a member that executes a simulation of the picking motion from a bulk pile for verifying the picking motion of the workpiece models in the virtual work space, with the bulk pile data generated by the bulk pile data generating unit 20.

The bulk pile data storing unit 23 is a member that stores at least any item of bulk pile data obtained before the execution of the picking motion simulation or bulk pile data obtained during the picking motion simulation executed by the picking motion simulating unit 30.

The simulation parameter adjusting unit 29 is a member that adjusts simulation parameters related to a motion of a robot in a case where there is a workpiece model that cannot be picked up by the robot in a result of the picking motion simulation executed by the picking motion simulating unit 30.

The picking motion simulating unit 30 reads the bulk pile data obtained before the execution of the simulation or during the execution of the simulation which is stored in the bulk pile data storing unit 23 and re-executes the picking motion simulation by using the simulation parameters adjusted by the simulation parameter adjusting unit 29. In this manner, the bulk pile data used in the picking motion simulation is stored, and thereby it is easy to determine whether or not an effective result is obtained by adjusting the simulation parameters.

Display Unit 3

In addition, the robot simulation apparatus may include a display unit 3 that is capable of displaying the bulk pile data stored in the bulk pile data storing unit 23. In this manner, while the user visually checks the saved bulk pile data, it is possible to adjust the simulation parameters, and thus it is possible to improve the operability.

Embodiment 1B

Figure 4:
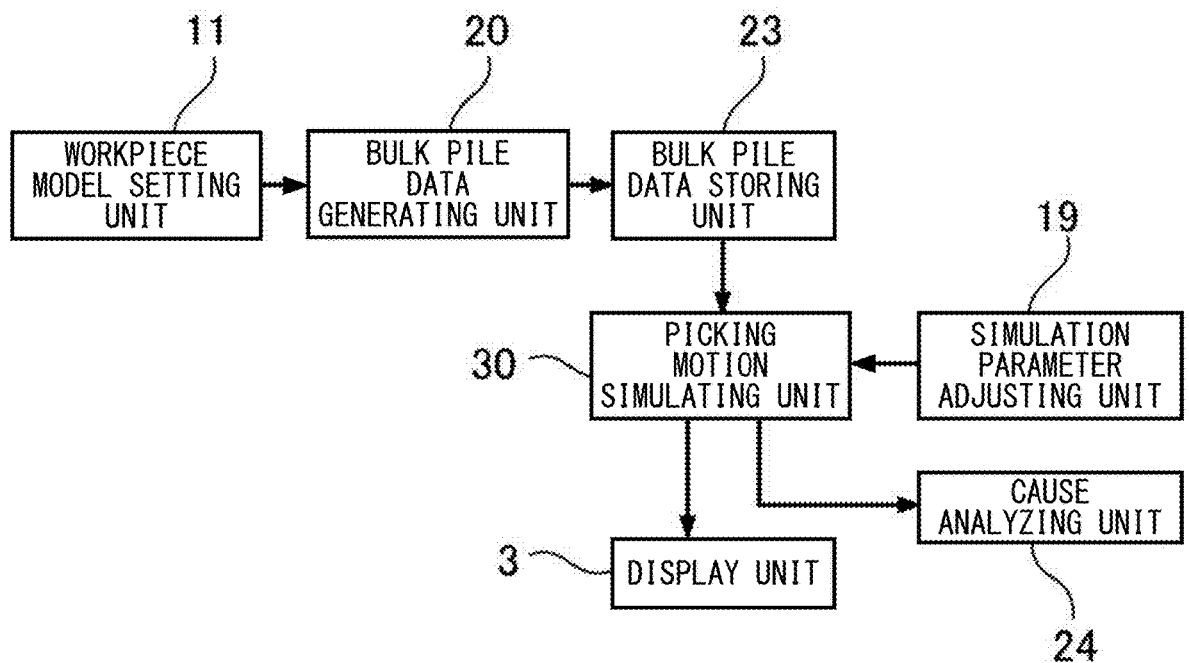
FIG. 4 is a block diagram illustrating a picking motion simulating system according to Embodiment 1B.

Further, the robot simulation apparatus may further include a cause analyzing unit 24 for analyzing whether a cause of picking-up failure of the workpiece model corresponds to one of a plurality of cause candidates defined in advance in a case where there is a workpiece model that cannot be picked up by the robot in a result of the picking motion simulation executed by the picking motion simulating unit 30. In this manner, the cause of picking-up failure by which it is not possible to perform the picking-up is displayed, and thereby it is easy to prepare a countermeasure for how to correct the cause of failure. In addition, while the picking motion from a bulk pile is simulated, it is possible to easily perform work of adjustment to appropriate setting. Such an example is illustrated in FIG. 4 as Embodiment 1B. The robot simulation apparatus illustrated in the figure includes the workpiece model setting unit 11, the bulk pile data generating unit 20, the bulk pile data storing unit 23, the picking motion simulating unit 30, the simulation parameter adjusting unit 29, the display unit 3, and the cause analyzing unit 24. Also in Embodiment 1B, the same reference signs are assigned to the same members as those in Embodiment 1 described above, and the detailed description thereof is appropriately omitted. The cause analyzing unit 24 will be described below in detail.

Embodiment 2

Figure 79A:
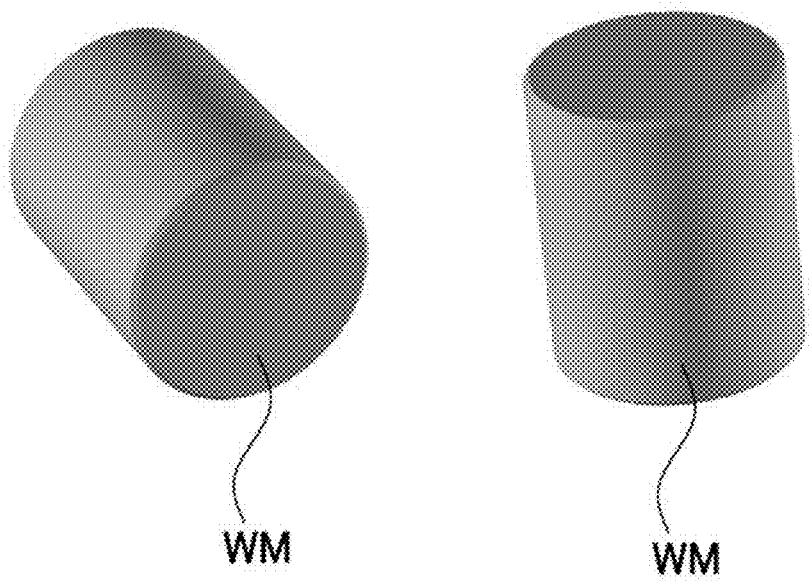
FIG. 79A is an image view illustrating an appearance of a workpiece displayed in a simulation.
Figure 79B:
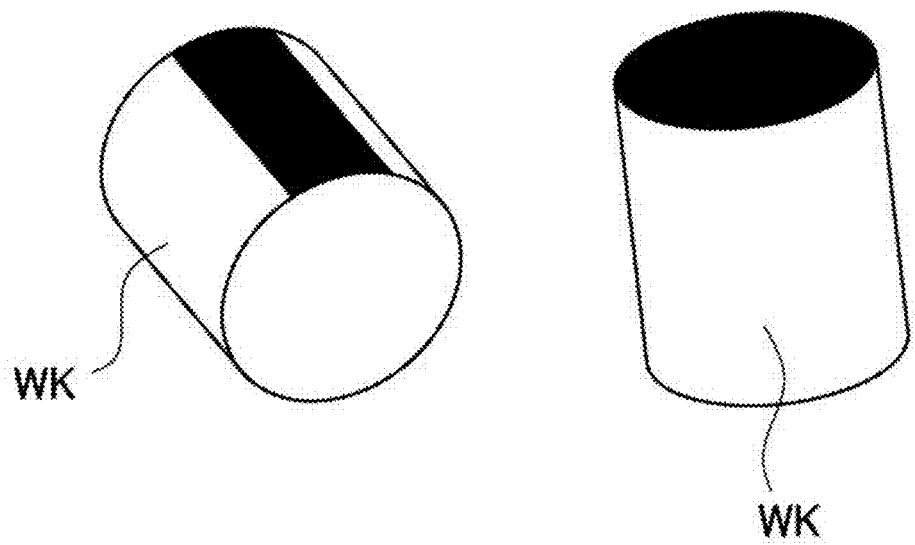
FIG. 79B is an image view illustrating a state in which measurement is performed during an actual operation of the workpiece in FIG. 79A.

In the picking motion simulation, even when an end effector model obtained by simulating an end effector of a robot is determined to be capable of performing the grasping, it is not possible to successfully perform the picking from a bulk pile when an operation is actually performed. This is because there is a case where it is not possible to acquire the three-dimensional shape of the workpiece during the actual operation whereas the determination is performed by using the workpiece model WM having a virtual three-dimensional shape during the picking motion simulation as illustrated in FIG. 79A. For example, in a case where specular reflection is high such as a case of a metal workpiece, there is a portion that is not measurable due to the posture of the workpiece. For example, as illustrated in FIG. 79B, in a result of performing the imaging by the sensor unit from above the work space, it is not possible to measure the three-dimensional shape of a site of the workpiece WK having a steep inclination. Further, when a plurality of workpieces overlap each other, a problem arises in that it is not possible to three-dimensionally measure the shapes of the workpieces on the lower side. As a result, it is possible to search for the three-dimensional shape in the simulation; however, the search is likely to fail during the actual operation.

In Embodiment 2, three-dimensional measurement data obtained by excluding a portion, which is not measurable, is generated, based on a posture of a workpiece model in a bulk pile state such that it is possible to execute a simulation in a state approximate to the largest extent to a state of actually performing the three-dimensional measurement of the workpiece, and a picking motion simulation is performed, based on the generated three-dimensional measurement data. Specifically, it is not possible to perform the three-dimensional measurement of a portion having a steep angle equal to or larger than a certain angle, based on an angle of a front surface of a workpiece model which is determined from a posture in the bulk pile state, and thus the portion is excluded from bulk pile data that is generated in the picking motion simulation. In this manner, although checking work or setting adjustment, for which time and effort is required for installing a sensor unit or actually preparing workpieces, is not performed, it is possible to realize a state approximate to a state of actually imaging workpieces piled in bulk.

Physical Simulation Unit

Figure 5:
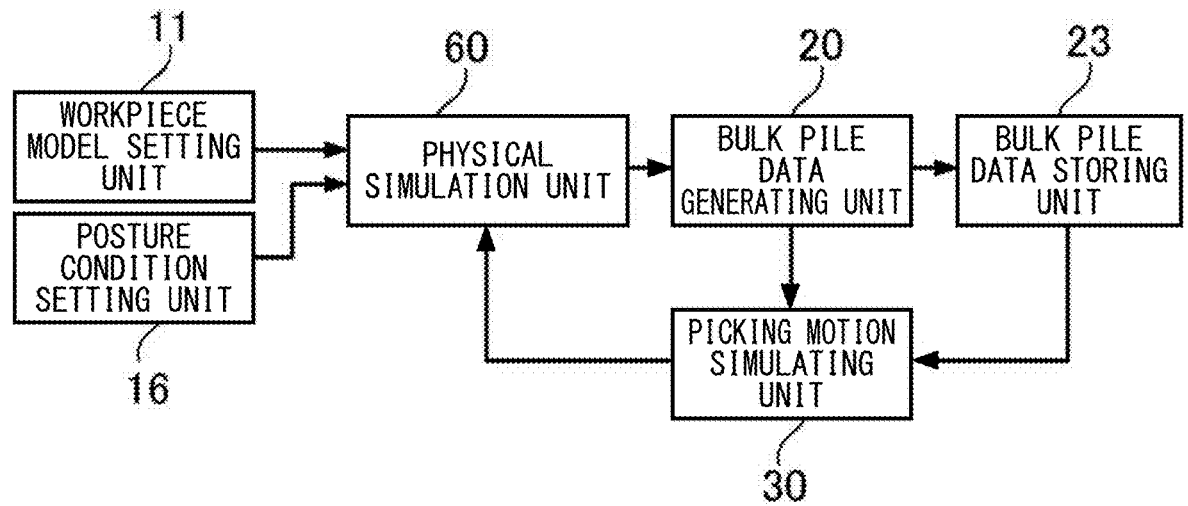
FIG. 5 is a block diagram illustrating a picking motion simulating system according to Embodiment 2.

In addition, the robot simulation apparatus performs a physical simulation of virtually reproducing a bulk pile state in which workpieces are piled up, thereby making it possible to generate bulk pile data. Such an example is illustrated in FIG. 5 as Embodiment 2. The robot simulation apparatus illustrated in the figure includes the workpiece model setting unit 11, the posture condition setting unit 16, a physical simulation unit 60, the bulk pile data generating unit 20, the bulk pile data storing unit 23, a region estimating unit 22, and the picking motion simulating unit 30. The robot simulation apparatus performs the physical simulation of virtually reproducing the bulk pile state in which workpieces are piled up, thereby generating bulk pile data.

In this manner, since the bulk pile data is generated in accordance with an actual operation environment of the user by excluding a workpiece model that obviously has an unnatural posture or the like such that the picking motion simulation is executed, it is possible to perform suitable setting adjustment or verification in advance in a state approximate to the state of the actual operation without actually preparing workpieces.

The bulk pile data generating unit 20 is capable of generating the bulk pile data by excluding a workpiece model having a posture which is not in conformity with a posture condition set by a posture condition setting unit 16. Otherwise, the bulk pile data generating unit 20 may be configured to generate the bulk pile data by excluding a workpiece model that is physically made at a low probability. In this case, a condition of the workpiece model that is physically made at the low probability can be prepared by the robot simulation apparatus in advance, as well as the workpiece model that is physically made at the low probability, being designated by the posture condition setting unit 16 controlled by the user. The posture condition setting unit 16 is also configured to set the posture condition with such a defined value.

In addition, the bulk pile data generating unit 20 may be configured to regenerate the bulk pile data in a case where a workpiece model that is not in conformity with the posture condition set by the posture condition setting unit 16 is present in the bulk pile data or in a case where such workpiece models are present at a rate equal to or higher than a predetermined rate. In this manner, in a case where the bulk pile data that is very different from data obtained during the actual operation is obtained, the bulk pile data is regenerated without performing the picking motion simulation, and the picking motion simulation is performed with only the bulk pile data approximate to data obtained during the actual operation. Then, it is possible to obtain more accurate simulation results.

When a workpiece model set by the workpiece model setting unit 11 is disposed in a virtual work space as a virtually formed work space, the posture condition setting unit 16 is a member that sets a condition related to a posture taken by the workpiece model, as a posture condition. In the configuration, the posture condition may be provided as a preset value in advance in the robot simulation apparatus, as well as being manually set by the user. In addition, the user may be able to adjust an initial value of the posture condition provided by the robot simulation apparatus. The posture condition setting unit 16 can be configured to be capable of setting an allowable rotation angle or an inclination angle from a reference posture of the workpiece model, as the posture condition. In addition, the posture condition setting unit 16 may be configured to project a contact position with a floor of the workpiece model or another workpiece model from directly above and to be capable of setting a ratio of the largest area of the largest circumscribed rectangle of the workpiece model to an area of a circumscribed rectangle surrounding the projected contact position, as the posture condition. Further, the posture condition setting unit 16 can be configured to be capable of setting, as the posture condition, the contact position with the floor of the workpiece model, the contact position with another workpiece model, or a difference between a contact position at the lowest position and the center-of-gravity position in a height direction within a contact surface. It is possible to consider a workpiece model supported at a lower position than the center of gravity to be unstable. Furthermore, the posture condition setting unit 16 may be configured to be capable of setting the posture condition such that a specific surface of a workpiece model is the bottom surface. In addition, the posture condition setting unit 16 can be configured to be capable of setting a disposition interval between the workpiece models in an X direction and/or a Y direction and the number of layers of workpiece models, as the posture conditions.

The physical simulation unit 60 is a member that simulates a motion of putting a workpiece into a work space under the influence of gravity as putting the workpiece models into the virtual work space by using the workpiece model set by the workpiece model setting unit 11. In addition, such a simulation of putting the workpiece models into the virtual work space is referred to as a physical simulation or a putting-in motion simulation. In addition, in the present specification, the term, "putting-in" or "dropping", is not limited to a motion of physical falling from a high position and is used to mean falling while pushing is performed in a horizontal direction from a predetermined height, throwing-up and falling in a parabola shape, or a motion of mounting or causing still standing of a workpiece model in an accommodation container or on a floor, in order to verify tumbling, for example. Further, the physical simulation can be a simulation of a motion of putting-in of a plurality of workpiece models at the same time or falling or still standing as well as sequentially putting the workpiece models one by one into the work space.

In this manner, based on a result obtained by repeatedly performing the physical simulation a plurality of times or collectively performing the physical simulation, that is, a workpiece model group in which a plurality of workpiece models are piled up randomly or in a predetermined fashion, the bulk pile data generating unit 20 generates three-dimensional virtual bulk pile data of the plurality of workpiece models piled up in the virtual work space.

The picking motion simulating unit 30 is a member that verifies the picking motion from the bulk pile of the workpiece models in the virtual work space, with the generated bulk pile data. In this manner, it is possible to perform the simulation in advance in the state approximate to the actual operation without the checking work or setting adjustment, for which time and effort is required, such as checking whether or not the three-dimensional position and the posture of the workpiece are detected, and without actually preparing workpieces (the detailed description to be provided below).

In particular, the physical simulation unit 60 re-executes the physical simulation with the bulk pile data of a state obtained after the workpiece models are picked up after the picking motion simulating unit 30 grasps one workpiece model and at least a picking-up motion is started. Timing of re-executing the physical simulation may be during work of picking-up of the workpiece model, as well as after the workpiece model is grasped and placed at a mounting position. In other words, in a state in which an end effector model grasps the workpiece model and the workpiece model is held up, one workpiece model is removed. In this manner, since it is possible to move disposition of another workpiece model on the periphery of the one workpiece model, there is no need to delay the execution until the grasped workpiece model is mounted. Hence, timing of the second execution of the physical simulation can be timing of holding-up of the one grasped workpiece model, or timing after another workpiece model moves under the influence of gravity after the holding-up and waiting is performed until a state thereof is stable. For example, the timing of the second execution may be after a predetermined period of time elapses from a time point of the grasping and holding-up of the workpiece model (for example, after 10 seconds).

The bulk pile data generating unit 20 receives result thereof and updates the bulk pile data according to the result of the second execution of the physical simulation by the physical simulation unit 60 during the simulation of the picking motion by the picking motion simulating unit 30. As described above, when one workpiece model is picked up from the bulk pile data during the picking motion simulation, the picking motion simulating unit 30 also computes a motion of collapsing of a bulk-piled workpiece model group due to the picking-up, by the physical simulation, and thus the simulation of the picking from a bulk pile is realized with high accuracy.

In addition, in a case where the bulk pile data generating unit 20 excludes the workpiece model that is not in conformity with the posture condition set by the posture condition setting unit 16, the physical simulation unit can be configured to re-apply the physical simulation to the bulk pile data of a state obtained after the workpiece model that is not in conformity with the posture condition is excluded. In this manner, since a workpiece model having a posture that cannot be physically present such as a posture of floating in the air can occur during the physical simulation, such a workpiece model is excluded, and thereby it is possible to obtain a physical simulation result having high reliability.

Initial Posture

The physical simulation unit may be configured to determine an initial posture of a workpiece model based on the posture condition set by the posture condition setting unit 16 and to execute the physical simulation of falling of the workpiece having the initial posture into a work space. In addition, in a case where the physical simulation unit executes the physical simulation, a workpiece model that is not in conformity with the posture condition set by the posture condition setting unit 16 may be again excluded in the configuration.

For example, such members can be realized by a microprocessor (MPU), a CPU, LSI, a gate array such as an FPGA or an ASIC, hardware or software such as a DSP, or a combination thereof. In addition, constituent elements may not necessarily have the same configuration illustrated in FIG. 3 or the like, and a configuration having substantially the same function as that in the figure and a configuration in which one element has function of a plurality of elements in the configuration illustrated in FIG. 3 are included in the present invention.

For example, the physical simulation unit 60 in an example in FIG. 5 is prepared separately from the bulk pile data generating unit 20; however, the physical simulation unit can be incorporated in the bulk pile data generating unit. Otherwise, the physical simulation unit and the bulk pile data generating unit may be incorporated in the picking motion simulating unit.

On the other hand, the robot system 1000 illustrated in a block diagram in FIG. 2 includes a sensor unit 2, an image processing unit 1, the display unit 3, an operating unit 4, a robot main body 5, a robot controller 6, and a robot operating tool 7. The sensor unit 2 is a member that images the work space and measures a three-dimensional shape. In addition, the image processing unit 1 is a member that performs a three-dimensional search, interference determination, and grasping solution calculation. The sensor unit 2 only images the work space, and the image processing unit 1 can be configured to measure the three-dimensional shape. Examples of methods of acquiring the three-dimensional shape include a pattern projection method, a stereo method, a lens focus method, a light sectioning method, an optical radar method, interferometry, a TOF method, and the like. In the embodiment, a phase shift method within the pattern projection method is used.

Figure 6:
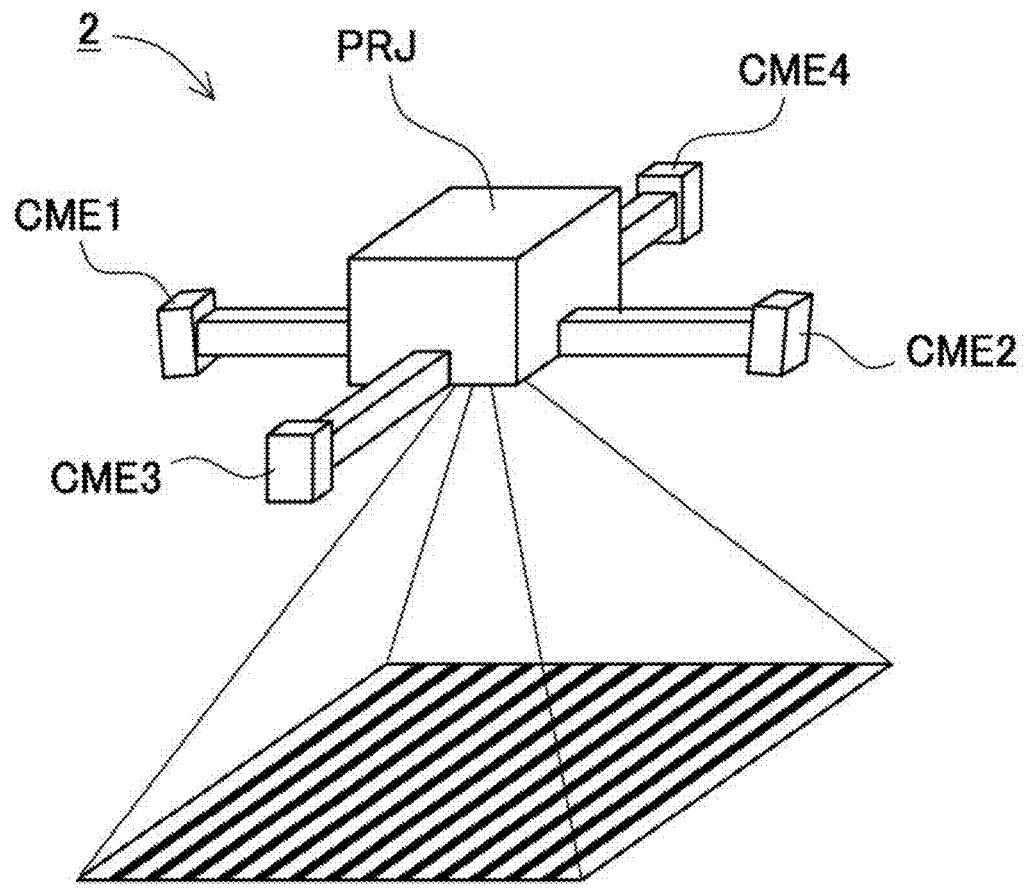
FIG. 6 is a perspective view illustrating an example of a sensor unit.

Depending on such a three-dimensional shape measuring technology, the configuration of the sensor unit 2 is determined. The sensor unit 2 includes a camera, illumination, a projector, or the like. For example, in a case where a three-dimensional shape of a workpiece is measured in the phase shift method, a projector PRJ and a plurality of cameras CME1, CME2, CME3, and CME4 are provided as the sensor unit 2 as illustrated in FIG. 6. The sensor unit 2 may have a configuration in which the cameras and the projector are integrally provided, as well as a configuration in which a plurality of members of the cameras or the projector are provided. For example, the sensor unit can be a 3D imaging head having a head shape in which the cameras or the projector are integrally provided.

The image processing unit 1 performs the three-dimensional search, the interference determination, and the grasping solution calculation, based on the obtained bulk pile data of workpieces as described above. The image processing unit 1 can be used in a general-purpose computer in which a dedicated image processing program is installed, a dedicated controller, or the like. In FIG. 2, an example in which the image processing unit 1 is configured of an individual member is described; however, the present invention is not limited to this configuration, and the sensor unit and the image processing unit can be integrally provided or the image processing unit can be incorporated in the robot controller, for example. In addition, the image processing unit may be configured to acquire a three-dimensional shape of a workpiece based on the data imaged by the sensor unit.

The display unit 3 is a member that displays the three-dimensional shape of the workpiece which is acquired in the image processing unit 1 or checking various types of setting or a motion state. A liquid crystal monitor, an organic EL display, a CRT, or the like can be used as the display unit. The operating unit 4 is a member that performs various types of setting such as image processing, and an input device such as a keyboard or a mouse can be used as the operating unit. In addition, a touch panel is used as the display unit 3, and thereby the operating unit and the display unit can be integrally provided.

For example, in a case where a computer, in which a robot simulation program is installed, is used as the robot simulation apparatus or the image processing unit, a graphical user interface (GUI) screen of the robot simulation program is displayed on the display unit. It is possible to perform various types of setting on the GUI displayed on the display unit, and it is possible to display a processing result such as a simulation result. In this case, the display unit can be used as a setting unit for performing the various types of setting.

The robot controller 6 controls a motion of a robot based on information obtained by performing the imaging by the sensor unit 2. In addition, the robot operating tool 7 is a member that performs motion setting of the robot main body 5, and a pendant or the like can be used as the robot operating tool.

The robot main body 5 includes the movable arm ARM and the end effector EET fixed to the distal end of the arm ARM. The robot main body 5 is controlled by the robot controller 6 such that the arm ARM is caused to motion, picks up one workpiece WK, moves the workpiece to a desired position, places the workpiece at the position, and then releases the workpiece. Therefore, the end effector EET for grasping the workpiece WK is provided at the distal end of the arm ARM. In addition, examples of the mounting position, at which the workpiece WK is placed, include a position on a tray or on a conveyor.

A plurality of workpieces WK are randomly accommodated in the accommodation container BX such as a returnable container as illustrated in FIG. 1. The sensor unit 2 is disposed above the work space. The sensor unit 2 includes a camera or illumination, the sensor unit 2 can measure the three-dimensional shapes of workpieces WK. The robot controller 6 controls the robot such that the robot identifies a workpiece WK which is a grasping target within the plurality of workpieces based on the three-dimensional shapes of the workpieces WK measured by the sensor unit 2 and the robot grasps the workpiece WK. While the workpiece WK is grasped, the arm ARM is caused to motion and to move the workpiece to a predetermined mounting position and mounts the workpiece WK in a predetermined posture. In other words, the robot controller 6 controls the motion of the robot such that the sensor unit 2 identifies the workpiece WK which is a picking target, the end effector EET grasps the workpiece WK, the grasped workpiece WK is mounted at the mounting position as a position at which the workpiece is placed in a predetermined reference posture, and the end effector EET releases the workpiece.

Figure 7A:
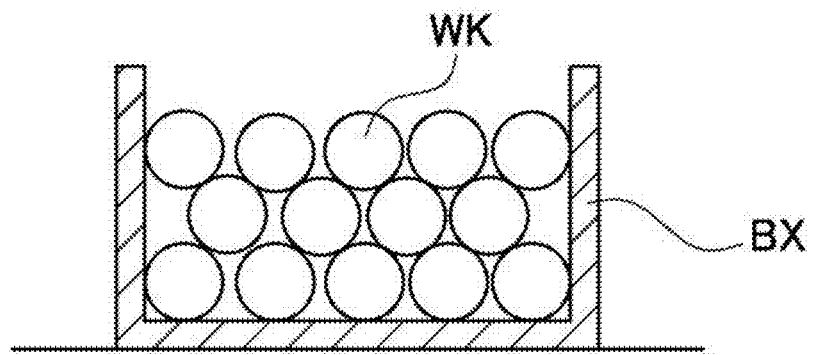
FIG. 7A is a schematic sectional view illustrating an example in which workpieces are randomly put in and are piled up in an accommodation container.
Figure 7B:
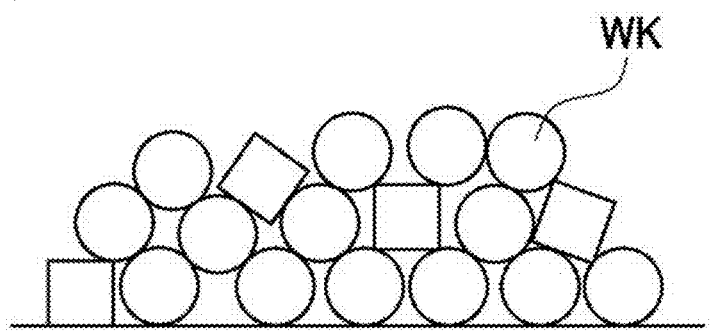
FIG. 7B is schematic sectional view illustrating an example in which workpieces are piled up on a floor.
Figure 7C:
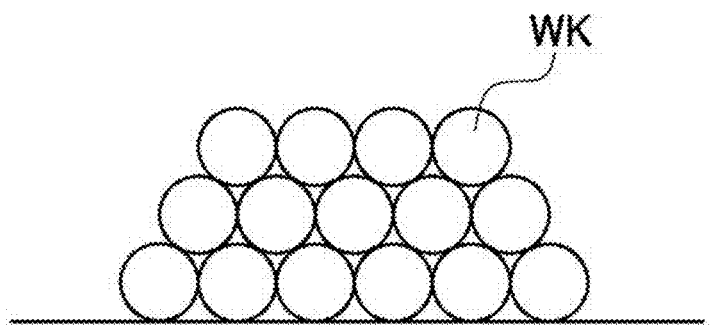
FIG. 7C is a perspective view illustrating a state in which workpieces are arranged in a certain posture on a tray.

Here, in the present specification, the term, the picking from a bulk pile, is used to mean that a robot grasps each of the workpieces WK which are put in and are randomly piled up in the accommodation container BX as illustrated in FIG. 7A, and mounts the workpiece at a predetermined position, including an example in which a robot grasps each of the workpieces WK which are piled up in a predetermined region without using the accommodation container BX as illustrated in FIG. 7B, and mounts the workpiece, or an example in which a robot sequentially grasps the workpieces WK which are arranged and piled up in a predetermined posture as illustrated in FIG. 7C, and mounts the workpieces.

In addition, the sensor unit 2 is provided in a fixed manner above the work space in the example in FIG. 1; however, the sensor unit may be disposed at any position at which imaging of the work space can be performed, and the sensor unit can be disposed at an arbitrary fixed position on an inclined side, a side, a lower side, or the like of the work space. However, an aspect in which the sensor unit is disposed at an unfixed movable position above the arm ARM or the like is excluded. Further, the number of cameras or illuminations included in the sensor unit is not limited to one and a plurality of cameras or illuminations may be provided. Furthermore, connection between the sensor unit 2 or the robot and the robot controller 6 is not limited to wired connection, and the connection may be wireless connection.

Figure 8A:
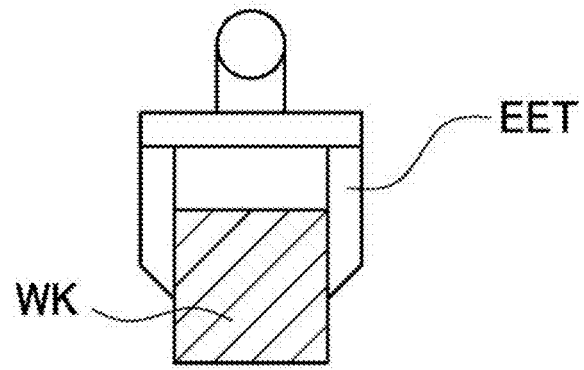
FIG. 8A is a schematic view illustrating an example in which an end effector grasps a workpiece.
Figure 8B:
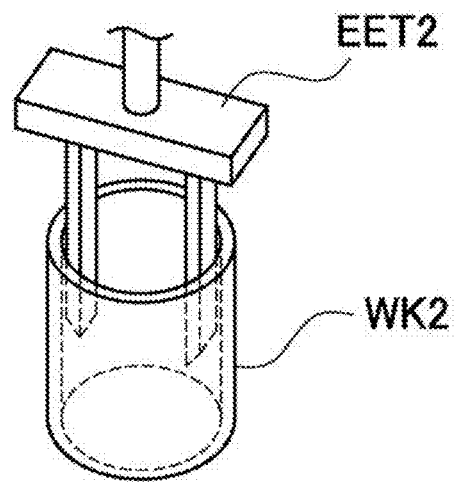
FIG. 8B is a schematic view illustrating an example in which a hollow workpiece is grasped from the inner surface thereof.
Figure 8C:
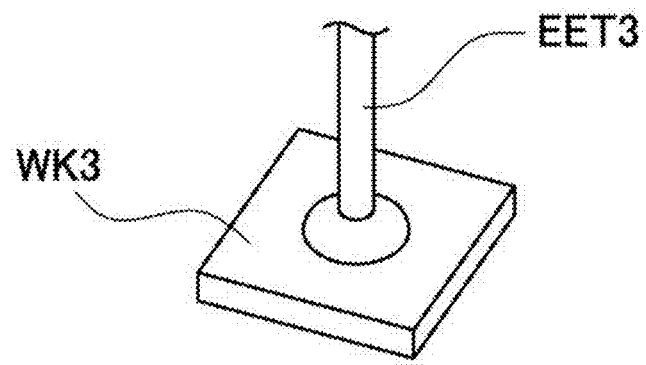
FIG. 8C is a schematic view illustrating an example in which a plate-shaped workpiece is suctioned and grasped.

In addition, the term, the grasping of the workpiece, is used to mean that the outer sides of the workpiece WK are grasped to be pinched as illustrated in FIG. 8A, including an example in which claw portions of an end effector EET2 are inserted into a hollow workpiece WK2 and are widely opened such that the workpiece is held as illustrated in FIG. 8B or an example of an end effector EET3 that suctions and holds a plate-shaped workpiece WK3 as illustrated in FIG. 8C. Hereinafter, an aspect of gripping outer surfaces of a workpiece from both sides as an example of grasping the workpiece will be described. In addition, in a state in which multiple number of workpieces are accommodated to be randomly piled up in the accommodation container BX as illustrated in FIG. 1, a simulation of picking motions from a bulk pile of causing the end effector EET to repeatedly perform work of picking the plurality of the workpieces WK one by one and placing the workpiece at mounting positions is performed. The simulation will be described below.

Figure 9:
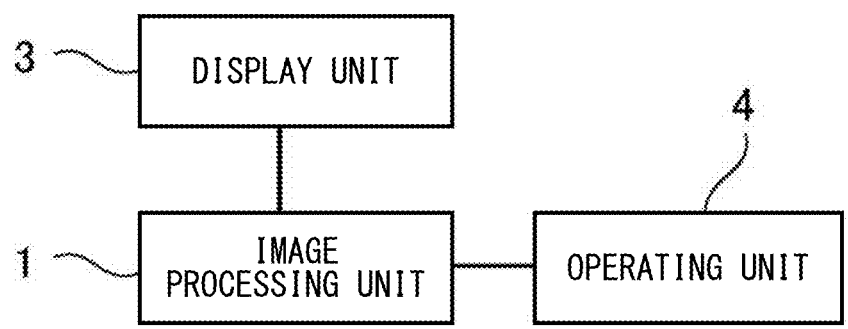
FIG. 9 is a block diagram illustrating a picking motion simulating system.

Next, FIG. 9 illustrates a block diagram of a system configuration during a picking motion simulation. A picking motion simulating system illustrated in FIG. 9 includes the image processing unit 1, the display unit 3, and the operating unit 4. In this configuration, the entire simulation is performed on the image processing unit 1. In other words, a member that functions as the image processing unit 1 during the actual operation functions as the robot simulation apparatus during the picking motion simulation. However, the configuration is not limited to the configuration in which the robot simulation apparatus serves as the image processing unit, and it is possible to separately prepare the robot simulation apparatus from the image processing unit.

Embodiment 4

Figure 10:
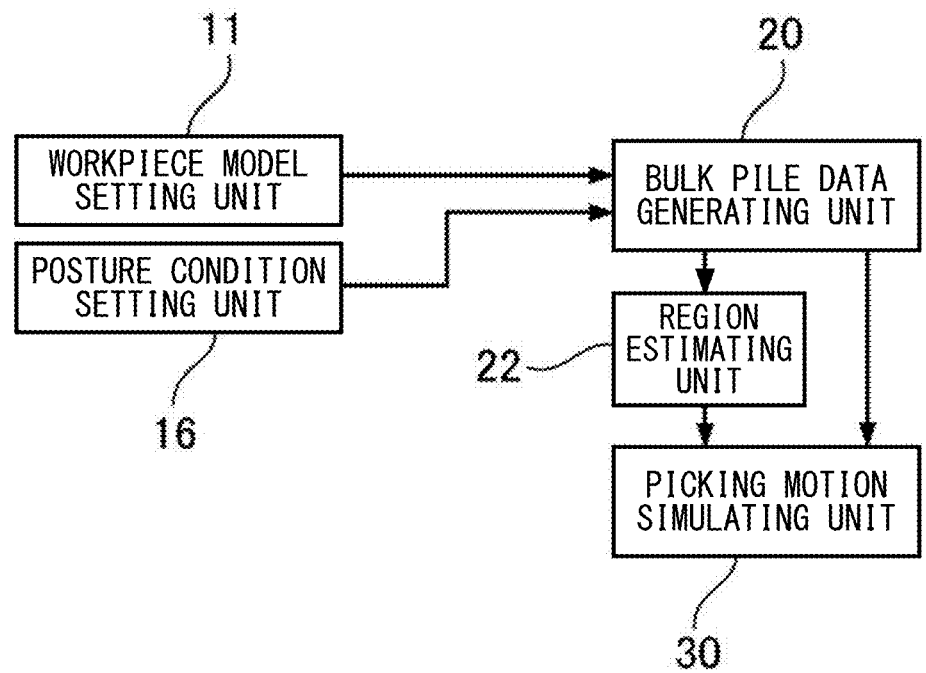
FIG. 10 is a block diagram illustrating a picking motion simulating system according to Embodiment 4.

In addition, the present invention is not limited to the configuration in which the picking motion simulation is executed as it is with respect to a bulk-piled workpiece model group by the physical simulation, and the present invention may employ a configuration in which it is determined whether Or not it is possible to perform the three-dimensional measurement for each portion with respect to the bulk-piled workpiece model group such that the picking motion simulation is performed, based on the determination result. FIG. 10 illustrates such an example as a robot simulation apparatus according to Embodiment 4. The robot simulation apparatus illustrated in FIG. 10 includes the workpiece model setting unit 11, the posture condition setting unit 16, the bulk pile data generating unit 20, the region estimating unit 22, the picking motion simulating unit 30, and the display unit 3. In Embodiment 4, the same reference signs are assigned to the same members as those in Embodiment 1 described above, and the detailed description thereof is appropriately omitted.

Region Estimating Unit 22

The region estimating unit 22 illustrated in FIG. 10 is a member that identifies an estimated region that is estimated to be difficult to be three-dimensionally measured by the sensor unit, based on a position and a posture of each workpiece model in the bulk pile data.

The picking motion simulating unit 30 executes a picking motion simulation for verifying the picking motion from a bulk pile of the workpiece models in a virtual work space, based on the obtained data of the estimated region as described above. In other words, the picking motion simulating unit 30 removes the estimated region from the bulk pile data and executes the picking motion simulation.

In the example described above, the estimated region that is estimated by the region estimating unit is set as a region that is estimated to be difficult to be three-dimensionally measured by the sensor unit. Conversely, a region that is estimated to be three-dimensionally measurable by the sensor unit may be set as the estimated region.

Embodiment 5

Figure 11:
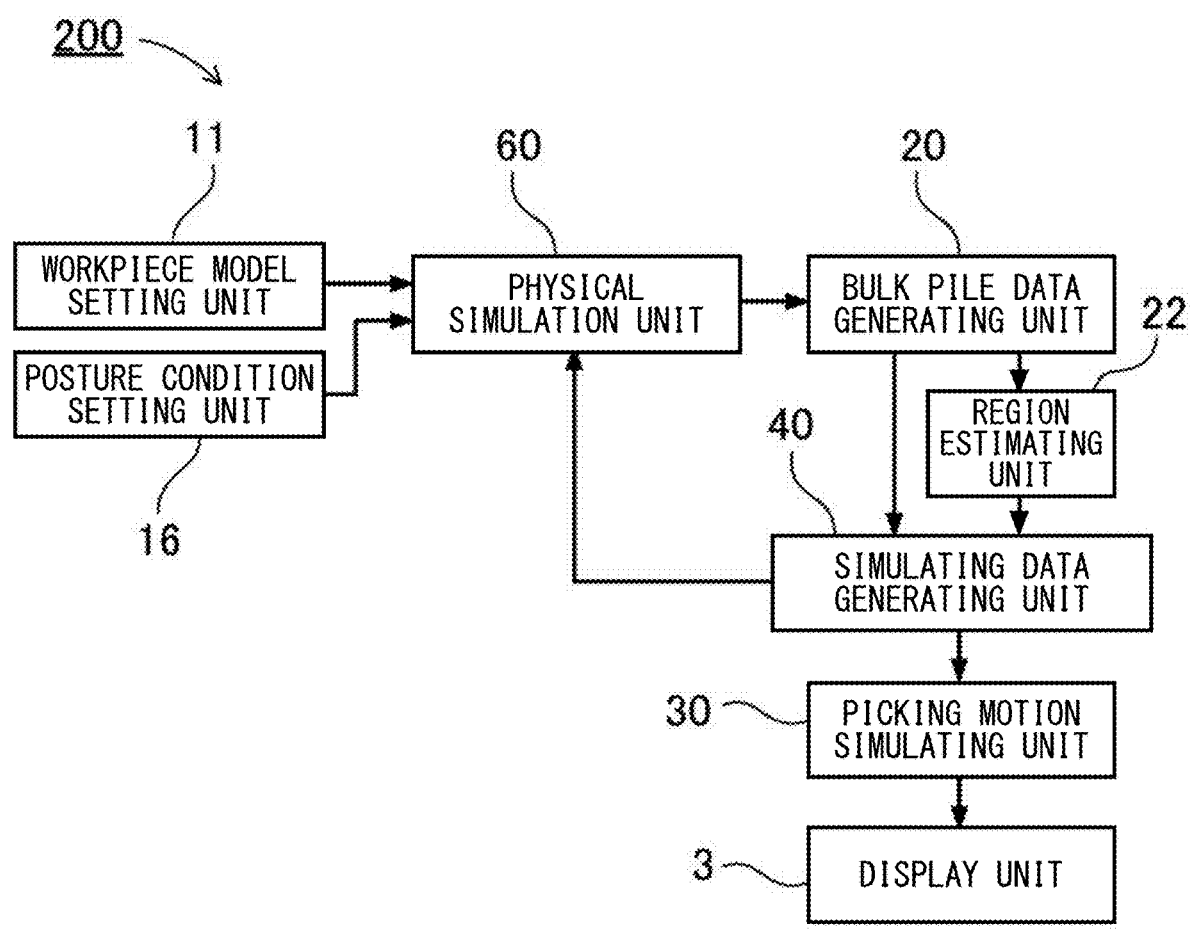
FIG. 11 is a block diagram illustrating a robot simulation apparatus according to Embodiment 5.

In addition, a simulating data generating unit that generates data for simulation which is obtained by removing the estimated region from bulk pile data may be added to the configuration. Such an example is illustrated in FIG. 11 as Embodiment 5. A robot simulation apparatus 200 illustrated in FIG. 11 includes the workpiece model setting unit 11, the posture condition setting unit 16, the physical simulation unit 60, the bulk pile data generating unit 20, the region estimating unit 22, the picking motion simulating unit 30, the simulating data generating unit 40, and the display unit 3. In Embodiment 5, the same reference signs are assigned to the same members as those in Embodiment 1 described above, and the detailed description thereof is appropriately omitted.

Simulating Data Generating Unit 40

The simulating data generating unit 40 is a member that generates bulk pile data as data for simulation, which does not include the data of the estimated region identified by the region estimating unit 22. The picking motion simulating unit 30 executes the picking motion simulation, by using the data for simulation which is generated by the simulating data generating unit 40.

In addition, the display unit 3 can display the bulk pile data generated by the bulk pile data generating unit 20. When the bulk pile data is updated by the physical simulation unit 60, the bulk pile data can be updated in real time and can be displayed on the display unit 3. In this manner, after a workpiece model is picked up as in the related art, a state in which a workpiece model is present in the air is avoided without re-executing the physical simulation and the result from the second execution of the physical simulation is displayed on the display unit 3. Accordingly, it is possible to display workpieces in a bulk pile state without making the user uncomfortable.

Figure 60A:
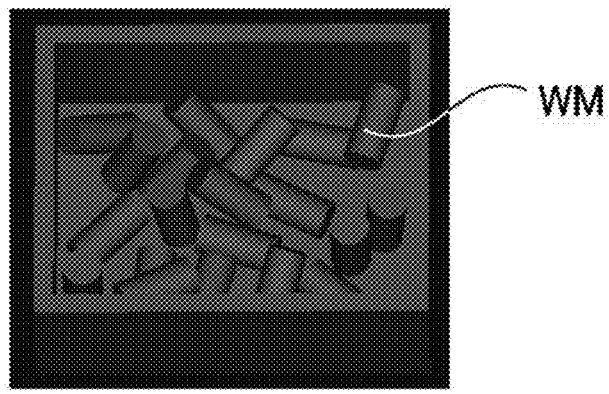
FIG. 60A is a perspective view of bulk pile data.
Figure 60B:
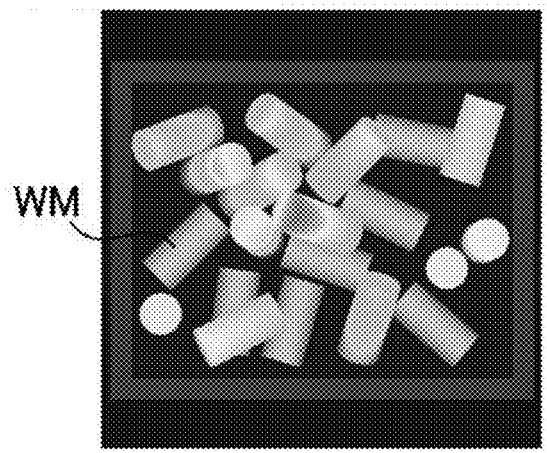
FIG. 60B is a bulk pile image obtained after the view in FIG. 60A is converted into a height image.
Figure 60D:
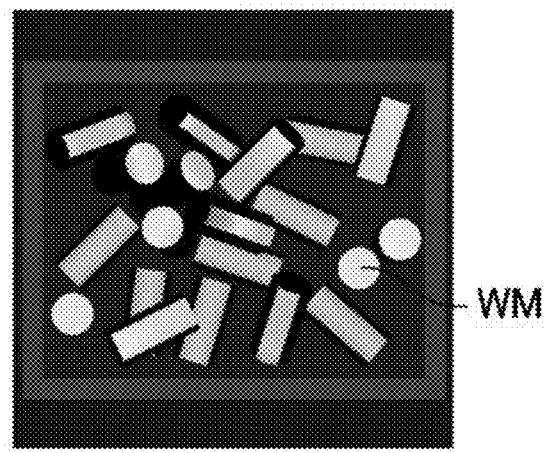
FIG. 60D is a bulk pile image obtained after the view in FIG. 60A is converted into a height image by invalidating inclined surfaces.
Figure 62A:
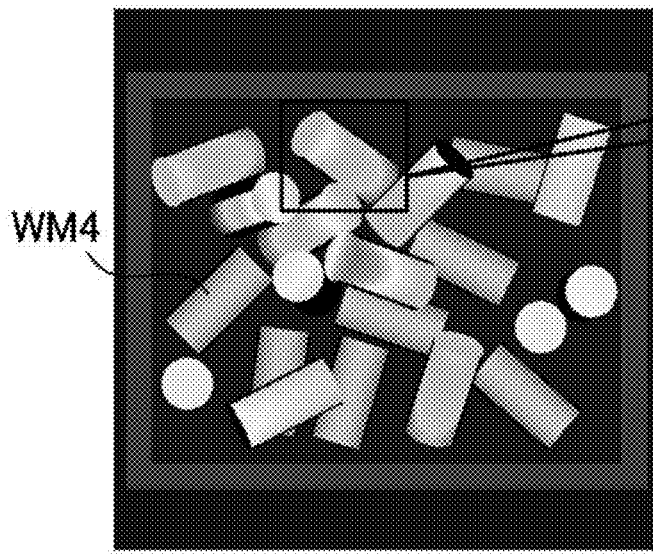
FIG. 62A is an image view illustrating bulk pile data of piled-up resin workpieces.
Figure 62B:
FIG. 62B is a partially enlarged view illustrating an enlarged resin workpiece in FIG. 62A.
Figure 62C:
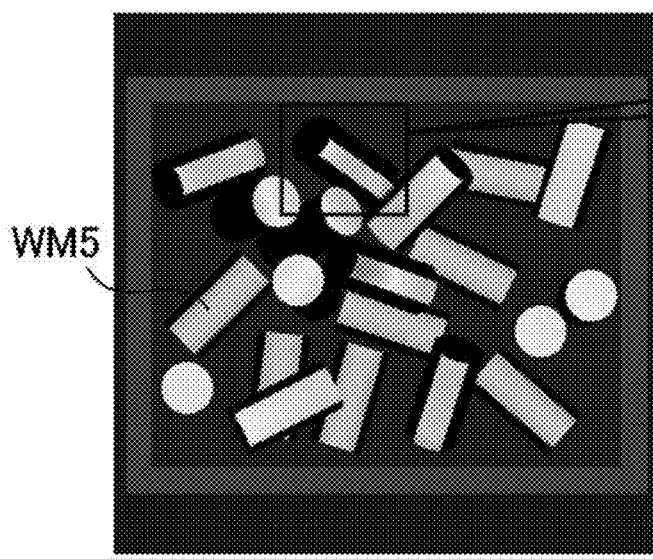
FIG. 62C is an image view illustrating bulk pile data of piled-up metal workpieces.

Further, the display unit 3 displays the data for simulation generated by the simulating data generating unit 40 and enables the user to check the data. At this time, as illustrated in FIG. 60D, 62A, 62C, or the like to be described below, the region that is not measurable during the actual operation may be displayed to be distinguished from a measurable region. This causes the user to visually find the appearance which is viewed during the actual operation.

Embodiment 6

Figure 12:
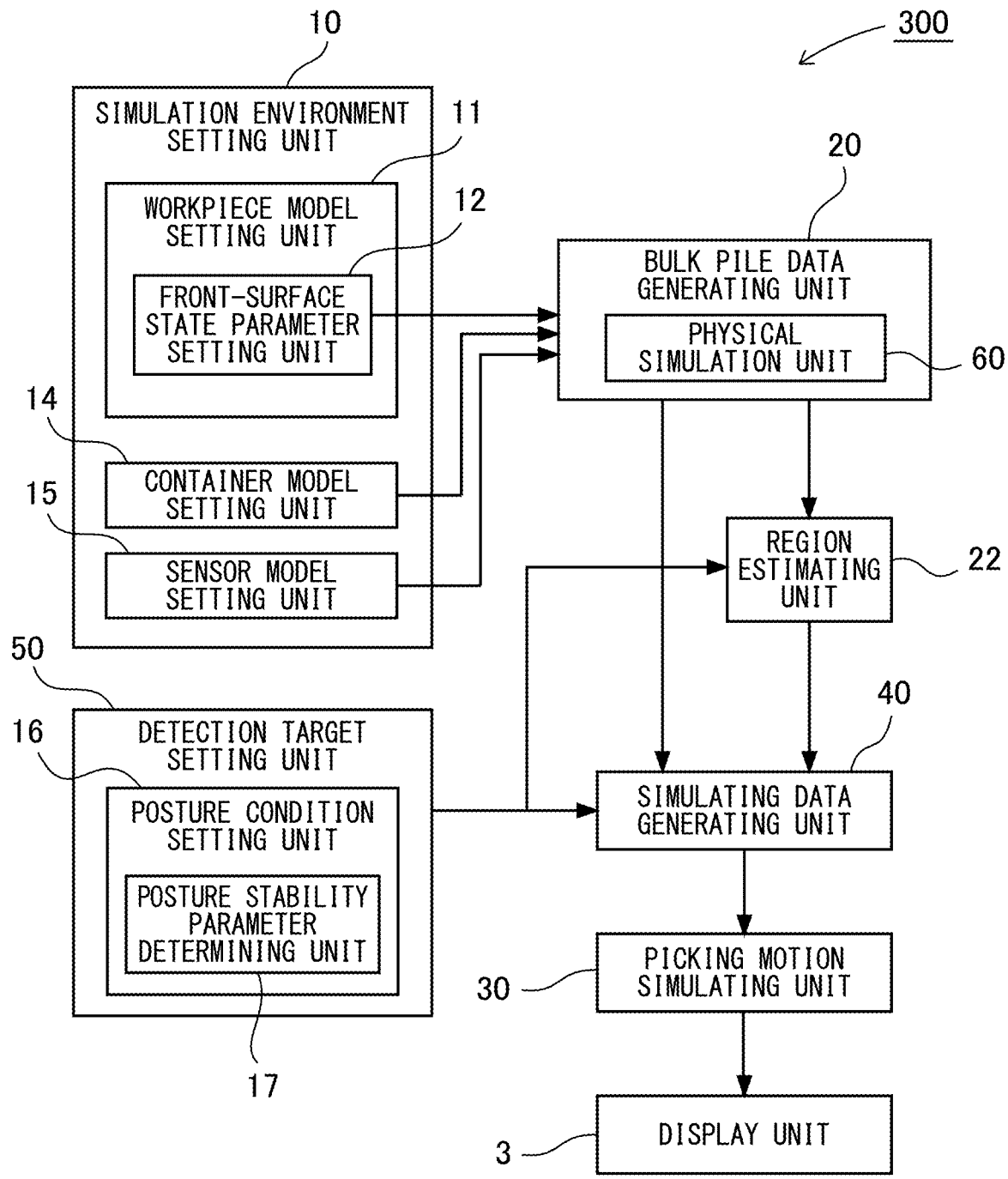
FIG. 12 is a block diagram illustrating a robot simulation apparatus according to Embodiment 6.

Further, during the picking motion simulation, it is possible to add a sensor model setting unit that sets a virtual sensor model. FIG. 12 illustrates such an example as a robot simulation apparatus 300 according to Embodiment 6.

The robot simulation apparatus 300 according to Embodiment 6 illustrated in FIG. 12 includes a simulation environment setting unit 10, a detection target setting unit 50, the bulk pile data generating unit 20, the region estimating unit 22, the simulating data generating unit 40, the picking motion simulating unit 30, and the display unit 3. The bulk pile data generating unit 20 includes the physical simulation unit 60. Also in Embodiment 6, the same reference signs are assigned to the same members as those in Embodiment 1 described above, and the detailed description thereof is appropriately omitted.

Detection Target Setting Unit 50

The detection target setting unit 50 is a member that performs various types of setting for detection of a position or a posture, interference determination, or grasping solution calculation. Here, examples of the setting include setting related to detection (three-dimensional search) of a position or a posture (for example, designating a decimation amount of data, posture restriction, or an important characteristic site), setting of a holding posture of the end effector with respect to the workpiece, and the like.

Simulation Environment Setting Unit 10

In addition, the simulation environment setting unit 10 is a member that performs various types of setting for acquiring a bulk pile image. Here, examples of information for setting of a simulation environment include the number of workpieces piled in a bulk, information of the accommodation container, information of the floor, design information of the cameras or the projector that configure the sensor unit, or the like. In addition, during the picking motion simulation, it is possible to cause a random positional shift with respect to the accommodation container, which can occur in the actual operation, and it is possible to add a range of the positional shift at this time to the setting of the simulation environment. The simulation environment setting unit 10 includes the workpiece model setting unit 11, a sensor model setting unit 15, and the posture condition setting unit 16.

Workpiece Model Setting Unit 11

The workpiece model setting unit 11 sets a condition related to a workpiece model. It is possible to use CAD data generated by the CAD as the workpiece model. Regarding CAD data of a workpiece, there is no particular limitation to a data format of the CAD; however, in the embodiment, the simplest STL format is used as three-dimensional CAD data. The STL is data configured of only a series of polygon information of a triangle (coordinates of three points and a normal vector of a surface thereof). Otherwise, the workpiece model may be configured of point group data having three-dimensional information (in FIG. 60E to be described below, a point group display image displayed on the display unit 3 is illustrated). Alternatively, the workpiece model may be configured of image data having height information, such as a height image or a distance image.

Front-Surface State Parameter Setting Unit

In addition, the workpiece model setting unit 11 may include a front-surface state parameter setting unit 12. The front-surface state parameter setting unit 12 is a member that inputs a parameter related to a front-surface state of the workpiece model. As a front-surface state parameter, reflectance or the like of the front surface of the workpiece is defined as a numerical value. Otherwise, a material of the workpiece is defined. In this case, options of the materials include "metal", "glass", "resin", or the like, and a user may select one in the configuration. Alternatively, sensorial options, with which the front-surface state is distinguished, may be selected from "shiny", "rough", "transparent", "frosted", "whitish", "dark", or the like. It is possible to change angle threshold, which will be described below, depending on the front-surface state parameter set by the front-surface state parameter setting unit 12.

Container Model Setting Unit 14

Further, the simulation environment setting unit 10 may include the container model setting unit 14 that sets a container model by forming a model of the accommodation container such as a returnable container, which accommodates the workpieces. In this case, it is possible to achieve a configuration in which the estimated region is estimated, based on a relative positional relationship between the sensor model and the container model.

The posture condition setting unit 16 can be configured to be capable of setting the posture condition such that a specific surface or side of a workpiece model has a specific relationship with the container model.

In addition, the physical simulation unit may be configured to set the number of layers of the container models which are set by the container model setting unit and to be capable of executing a physical simulation of falling of a plurality of workpiece models into the container model at the same time.

Sensor Model Setting Unit 15

The sensor model setting unit 15 sets a camera model or a projector model which virtually indicates a position or a posture for any one member or all of the members that configure the sensor unit, such as a camera for performing three-dimensional measurement of a workpiece. Whether the sensor model is on the camera model or also includes the projector model depends on a method for measuring the three-dimensional shape of a workpiece which is employed by the sensor unit and a member that realizes the method. For example, in a case of a passive stereo system, there is no need to provide the projector, and thus only the camera model is sufficient.

In this case, the region estimating unit 22 can have a configuration in which the estimated region, that is, a region at a blind spot when viewed from the sensor model set by the sensor model setting unit 15, is estimated as a blind spot region in which measurement is difficult to be performed. The definition of the blind spot region differs depending on types of the sensor models set by the sensor model setting unit 15. In a case where a three-dimensional measurement method employed in the sensor unit is a fringe projection method or an optical cutting method, a region at a blind spot from any one of the camera model and the projector model is set as the blind spot region. In addition, in a case of the stereo method using a plurality of cameras, a region at a blind spot from any one of a plurality of camera models is set as the blind spot region.

Further, the blind spot region may be changed depending on a position in a plane of the workpiece model. A blind spot is more likely to be positioned on a peripheral portion than on the central portion of a visual field of the measurement, and the blind spot region is changed in response to this. In this manner, it is possible to increase the accuracy of the simulation.

Updating of Data for Simulation

Further, when any one of the workpiece models is picked up during the execution of the picking motion simulation, the region estimating unit 22 can re-estimate a measurable region with respect to remaining workpiece models and update the data for simulation. In other words, when any workpiece model is picked up during the execution of the simulation of picking motion from a bulk pile by the picking motion simulating unit 30, the simulating data generating unit 40 can update the data for simulation by re-estimating a measurable region with respect to remaining workpiece models. In the related art, when the picking motion simulation is executed one time, the data for simulation is maintained as it is even when the workpiece models are sequentially picked up. As a result, a state in which a workpiece model that is unnatural as floating in the air remains is obtained. Conversely, according to Embodiment 5, it is possible to measure a workpiece model positioned below a workpiece model in consideration of a change in the remaining workpiece models, which can occur in a case where the workpiece model positioned above the remaining workpiece model is picked up, and thus the simulation of picking from the bulk pile is more accurately realized.

Also in Embodiment 1 described above or the other embodiments to be described below, in the motion, the blind spot region re-estimated by the region estimating unit 22 is read again by the picking motion simulating unit 30 such that it is possible to update the result of the picking motion simulation.

Embodiment 7

Figure 13:
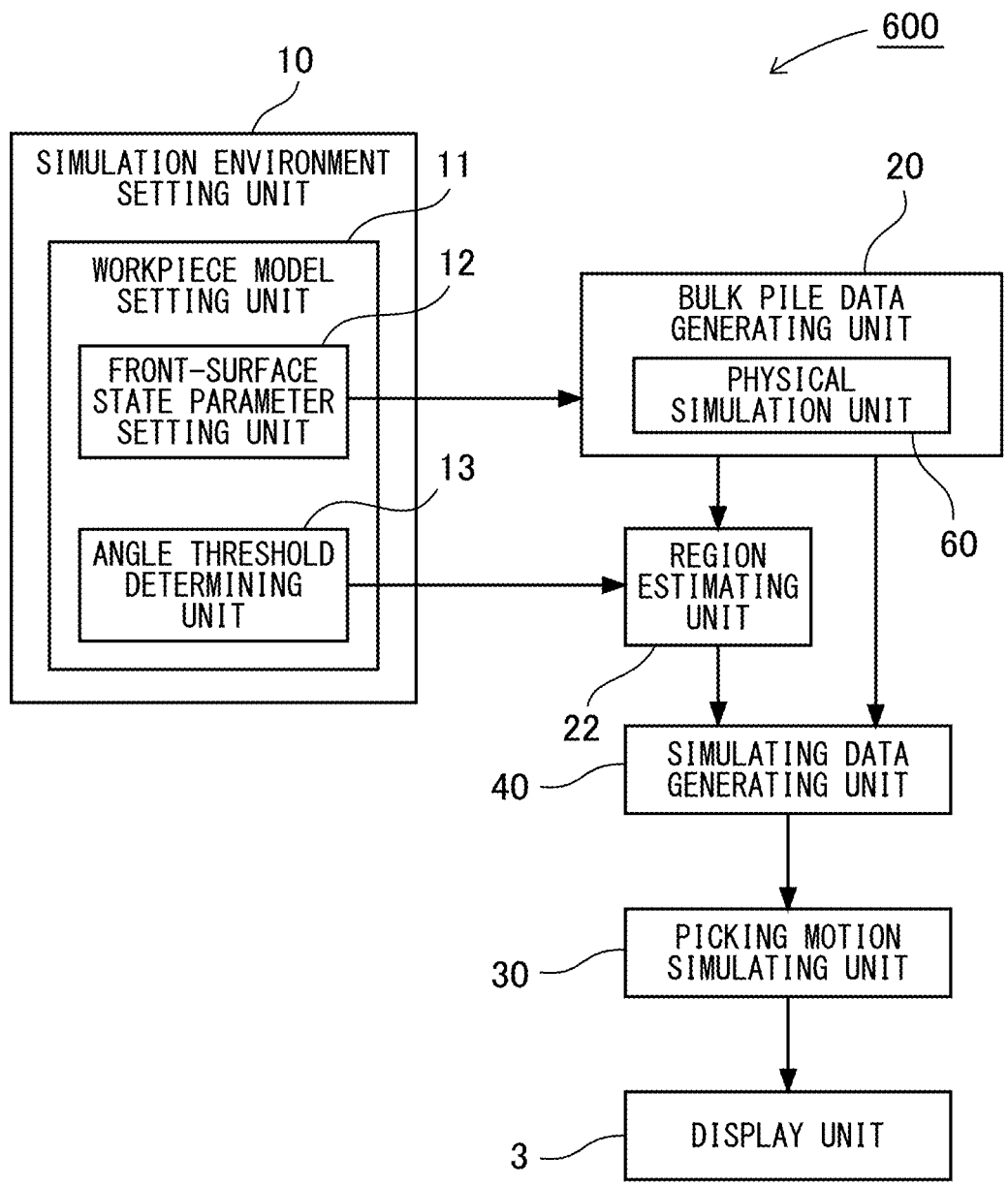
FIG. 13 is a block diagram illustrating a robot simulation apparatus according to Embodiment 7.

In the examples described above, the region estimating unit estimates whether or not the sensor unit is capable of performing the three-dimensional measurement so as to identify the estimated region, based on the position and the posture of each workpiece model in the bulk pile data. However, the present invention is not limited to such a configuration, and it is possible to employ a configuration in which whether or not the three-dimensional measurement can be performed is estimated depending on the front-surface state of the workpiece model. Such an example is described as a robot simulation apparatus according to Embodiment 7 with reference to FIG. 13. A robot simulation apparatus 600 illustrated in FIG. 13 includes the simulation environment setting unit 10, the bulk pile data generating unit 20, the region estimating unit 22, the simulating data generating unit 40, the picking motion simulating unit 30, and the display unit 3. The bulk pile data generating unit 20 includes the physical simulation unit 60. Also in Embodiment 7, the same reference signs are assigned to the same members as those in Embodiment 1 described above, and the detailed description thereof is appropriately omitted.

The simulation environment setting unit 10 includes the workpiece model setting unit 11 and the posture condition setting unit 16. The workpiece model setting unit 11 includes the front-surface state parameter setting unit 12 and an angle threshold determining unit 13. The front-surface state parameter setting unit 12 is a member that sets a front-surface state parameter related to the front-surface state of the workpiece model. The angle threshold determining unit 13 determines an angle threshold of the front surface of the workpiece model with respect to a measurement axis of the sensor unit, at which the sensor unit is difficult to perform the three-dimensional measurement, based on the front-surface state parameter set by the front-surface state parameter setting unit 12. The region estimating unit identifies a region in the bulk pile data, which has an inclination angle larger than the angle threshold determined by the angle threshold determining unit 13, as the estimated region that is estimated to be difficult to be three-dimensionally measured. As a result, the simulating data generating unit generates, as data for simulation, bulk pile data that does not include data of the estimated region estimated by the region estimating unit, and the picking motion simulating unit 30 executes the picking motion simulation by using the data for simulation. In this manner, it is possible to estimate the result of the three-dimensional measurement depending on the front-surface state of the workpiece, and thus it is possible to simulate the picking motion with higher accuracy. In other words, it is possible to determine the angle threshold at which whether or not the three-dimensional measurement data is obtained is determined, from the information of the front-surface state of the workpiece, which is designated by a user. Therefore, it is advantageous to easily perform flexible adjustment depending on a workpiece to be used.

In particular, the picking motion simulation in the related art is just executed such that the workpiece model is simply read, the physical simulation is performed such that the bulk pile data is generated, a position or a posture, at which each workpiece model is stable, is obtained, and then the workpiece model is disposed at the position or the posture. Therefore, when the workpiece is three-dimensionally measured in the work space in the real world, data is also obtained from a region that is not measurable, in which occlusion occurs or the front surface of the workpiece is approximate to a specular surface and no data is obtained. As a result, although the three-dimensional search can be performed in the picking motion simulation, the search fails during the actual operation, or the like, and a difference between the simulation result and the actual obtained result is likely to be large.

By comparison, in Embodiment 7, a user can designate the front-surface state parameter indicating the front-surface state of the workpiece, and thereby it is easy to accurately presume whether the camera can appropriately receive reflected light from the projector as the sensor unit. Thus, it is possible to improve the accuracy of determination of whether or not the three-dimensional measurement can be performed at positions on the workpiece.

Procedure of Setting Simulation Environment According to Embodiment 7

Here, a procedure of setting a simulation environment according to Embodiment 7 is described with reference to the flowchart in FIG. 14.

First, in Step S1401, the front-surface state of the workpiece model is designated. Here, the front-surface state parameter setting unit 12 designates the front-surface state parameter corresponding to the workpiece which is the target, as the front-surface state of the workpiece model.

Next, in Step S1402, a predetermined number of items of CAD data of workpiece models, of which the front-surface state is designated, are piled in a bulk, and the three-dimensional bulk pile data is obtained. In this example, during generation of the height image using a Z-buffering method, processing is internally performed for each workpiece. After the entire data is written for one buffer, the height image is completed.

Then, in Step S1403, the height image is generated from the bulk pile data. Here, a method for generating the height image is described. First, a two-dimensional height image is drawn through rendering of removing shadows, based on the three-dimensional bulk pile data configured of the workpiece models which is the CAD data of the workpieces. It is possible to use a Z-buffering method, a Z-sorting method, a scanline method, a ray tracing method, or the like, as a rendering method. Here, the plurality of workpiece models are drawn on the height image by using the Z-buffering method. In the Z-buffering method, an image is realized as the height (=Z-buffering) image. In addition, initialization of the Z-buffering is not infinitely performed but is performed to the minimum initialization with respect to information of a floor or a box. In a process of the Z-buffering method, a normal line image in which normal line information of a surface of a workpiece model is stored for each pixel is generated at the same time. Here, normal line data is also updated with respect to a pixel on which the Z-buffering is overwritten. In the present specification, the Z-buffering method is described as a conversion method to the height image; however, the present invention is not limited to be realized through the Z-buffering method and, as described above, it is also possible to appropriately use another method.

As described above, the three-dimensional bulk pile data is again drawn as the height image. Next, in Step S1404, it is determined whether all of the workpiece models are drawn. In a case where the drawing is not completed, the procedure returns to Step S1403 and the process is repeatedly performed. As a result, in a case where the drawing of all of the workpiece models is ended, the procedure proceeds to Step S1405.

In Step S1405, the angle threshold, at which data is removed, is determined for each pixel, based on the designated front-surface state. The angle threshold is determined by the angle threshold determining unit 13 and is described below in detail. In Step S1406, an angle of a normal line on the pixel which is larger than a determined threshold is removed. For example, this process is also performed by the angle threshold determining unit 13 of the workpiece model setting unit 11. Further, in Step S1407, it is determined whether or not the process is performed on all of the pixels. In a case where the process is not performed on all of the pixels, the procedure returns to Step S1406 and the process is repeatedly performed. When it is determined that the process is performed on all of the pixels, the process is ended. As described above, setting of an environment of the picking motion simulation is performed.

Front-Surface State Parameter

Here, a procedure of designating the front-surface state of the workpiece model in Step S1401 is described in detail. Examples of the front-surface state parameters for designating the front-surface state include a material of a workpiece, front-surface roughness, a machining method, color, reflectance, and the like. The parameters may be used individually or in a combination of a plurality of parameters.

Examples of parameter values indicating the material of the workpiece include values indicating metal, resin, ceramic, and the like. In addition, examples of parameter values indicating the front-surface roughness include a numerical value such as Ra, a triangle symbol, a name (rough finish, mirror finish, or the like) of a finished surface, and the like. Further, examples of parameters indicating the machining method include grinding, milling, wrapping, and the like. Furthermore, examples of parameters indicating the color include black, white, silver, glossy, matt, and the like.

Figure 15A:
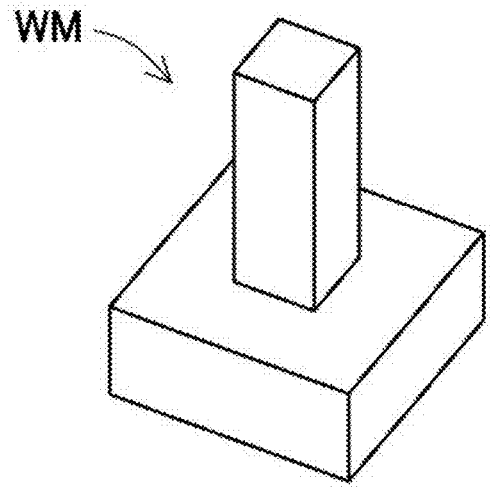
FIG. 15A is a perspective view illustrating a workpiece model.
Figure 15B:
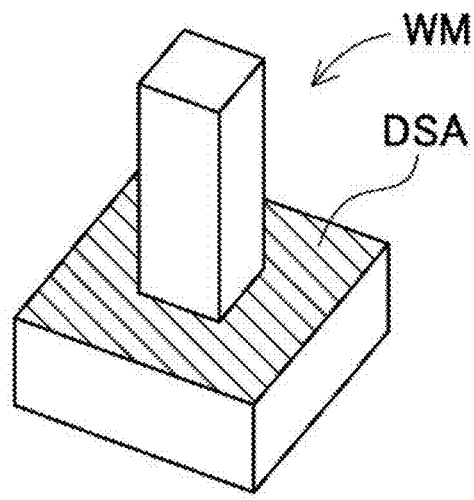
FIG. 15B is a perspective view illustrating a state of designating a region on the workpiece model in FIG. 15A.

In addition, as a method for designating states with respect to the workpieces, the same front-surface state may be designated with respect to all of the workpieces, or partially different front-surface states can be designated. The designation of a front surface of a workpiece is performed by displaying, on the display unit, workpiece models that virtually represent the workpieces. Here, as illustrated in FIGS. 15A and 15B, an example of the method for designating the partially different front-surface state includes a method of performing setting with respect to the workpiece models displayed in the three-dimensional shape on the display unit. For example, in a perspective view of the workpiece model WM illustrated in FIG. 15A, a user directly designates, with a pointing device such as a mouse, a surface, for which the user wants to set a front-surface state. It is preferable that a designated region DSA is changed to have a display mode such that the designated region is visually distinguished from the other region by coloring, highlighting, or the like of the designated region as illustrated in FIG. 15B.

Figure 16A:
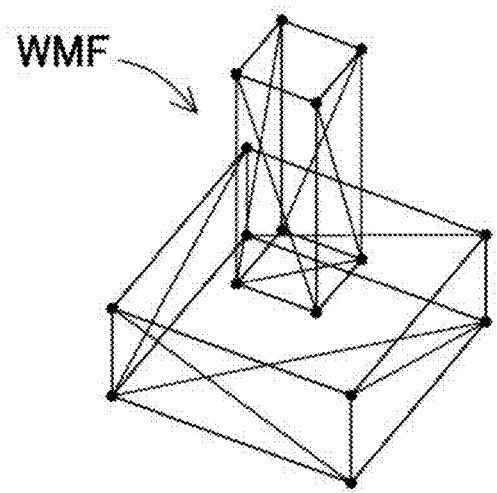
FIG. 16A is a perspective view of displaying the workpiece model in FIG. 15A as a wire frame.
Figure 16B:
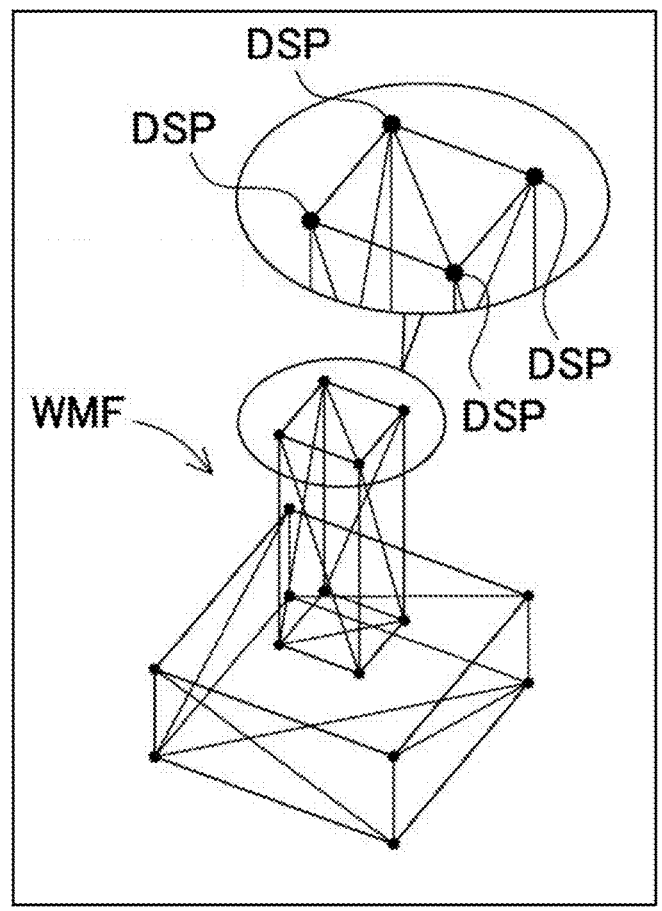
FIG. 16B is a perspective view illustrating a state of designating a region on the workpiece model in FIG. 16A.

Otherwise, in a state in which the workpiece model is displayed in a wire frame shape WMF as illustrated in FIG. 16A, vertexes DSP that configure the surface, for which the user wants to designate the front-surface state, may be designated or selected individually as illustrated in FIG. 16B. In this case, a region defined with the selected vertexes is identified as a region for which the front-surface state is designated.

Figure 17:
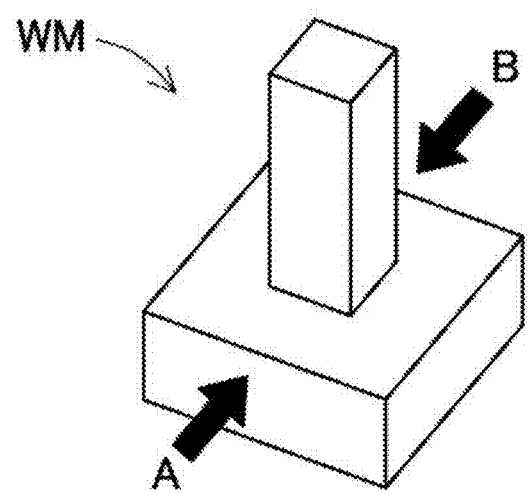
FIG. 17 is a perspective view illustrating an example of a workpiece model.
Figure 18:
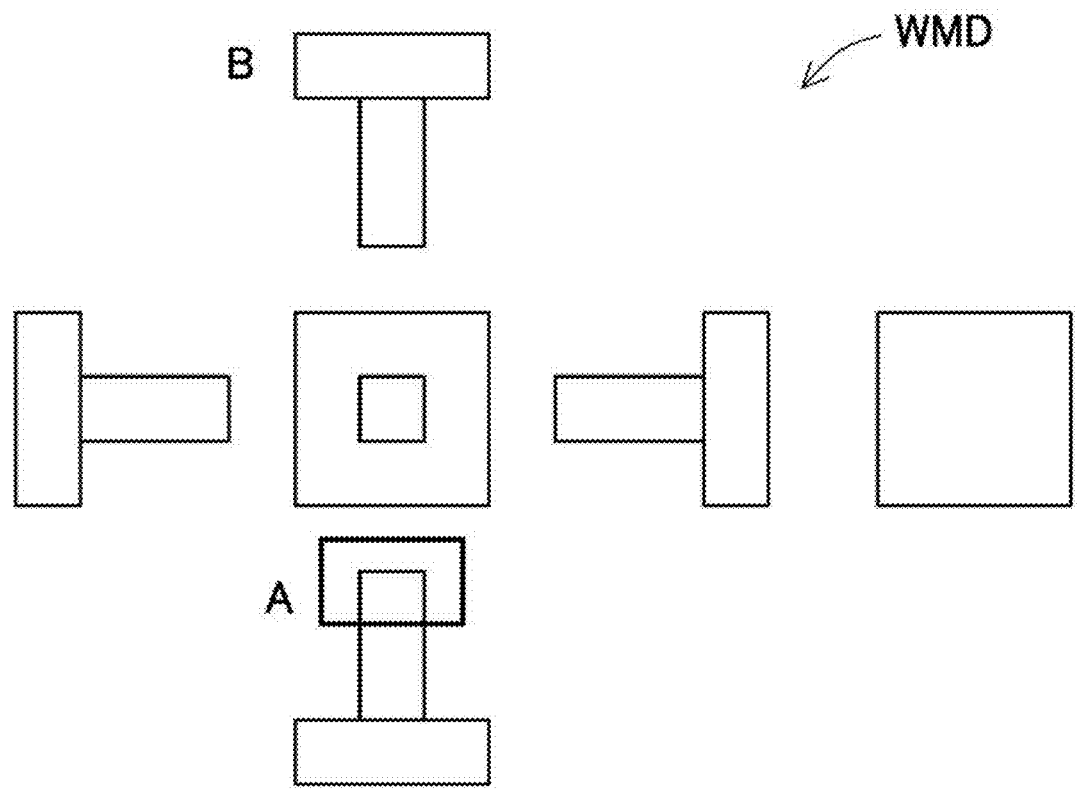
FIG. 18 is a development view of the workpiece model in FIG. 17.

In addition, the configuration is not limited to the method for performing setting in a 3D display state, a method for performing setting in a 2D display state may be employed. For example, plan views of the workpiece illustrated in FIG. 17 when viewed from each of directions of A and B are displayed as illustrated in FIG. 18. As described above, a development view WMD of the workpiece model may be generated so as to be displayed on the display unit, and then the designation may be performed on the development view WMD.

Method for Determining Angle Threshold

Figure 14:
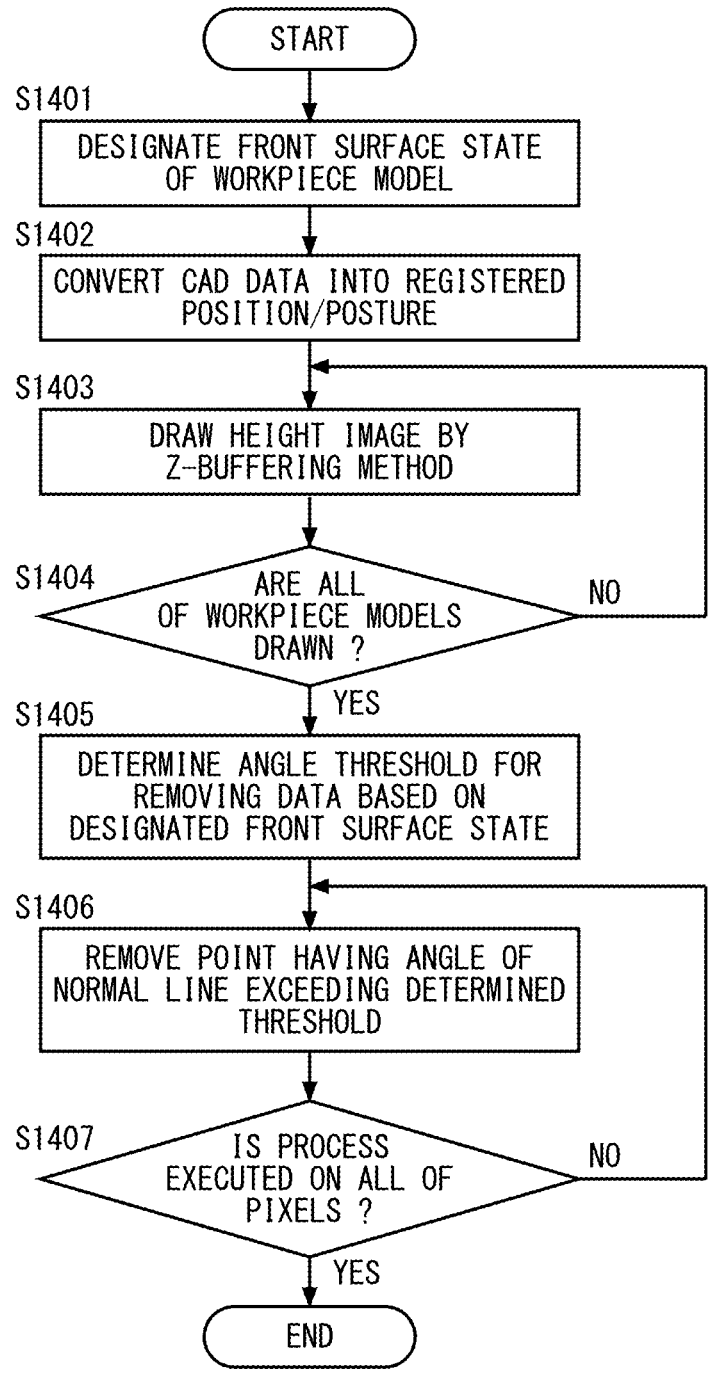
FIG. 14 is a flowchart illustrating a procedure of setting a simulation environment.

Next, the method for determining the angle threshold in Step S1405 in FIG. 14 from the state in which the front-surface state of the workpiece model is designated as described above is described. Here, a ratio of light at an observation point and incident light is calculated for each workpiece angle and the threshold is set with respect to the ratio, based on an expression of a position and a reflection model of a light source of the projector model. It is determined that the measurement is not performed at the workpiece angle out of the set threshold and data obtained at the workpiece angle is removed from the three-dimensional measurement data. Hereinafter, a specific method will be described.

A model of reflection in the simulation has been mainly much studied and proposed in the field of computer graphics. Here, for simplicity, a specific procedure is described by using a Phong reflection model. In the present invention, the reflection model is not limited to the Phong reflection model, and another reflection model may be used.

According to the Phong reflection model, reflected light from the front surface is expressed as in the following expression.

$$I+I_d+I_s+I_a \qquad \text{Expression (1)}$$

Terms in the above expression are as follows. I: Reflected light, Id: Diffused reflection component, Is: Specular reflection component, Ia: Ambient light component Here, calculation of how much of light rays emitted from a light source reach the observation point is aimed, and thus Ia=0, for simplicity. In a case where there is intense ambient light, the ambient light has an influence on whether or not it is possible to perform the measurement. Therefore, it is possible to perform computation by setting as Ia≠0. As a result of assuming Ia=0, Expression (1) can be expressed as the following expression.

$$I=I_d+I_s \qquad \text{Expression (2)}$$

Next, components of light will be described. Here, an expression of reflection components is obtained by assuming a case where the incident light is parallel light rays. In a case where the light source is another aspect, a model expression suitable for the light source may be used.

Diffuse Reflection Component

Figure 19A:
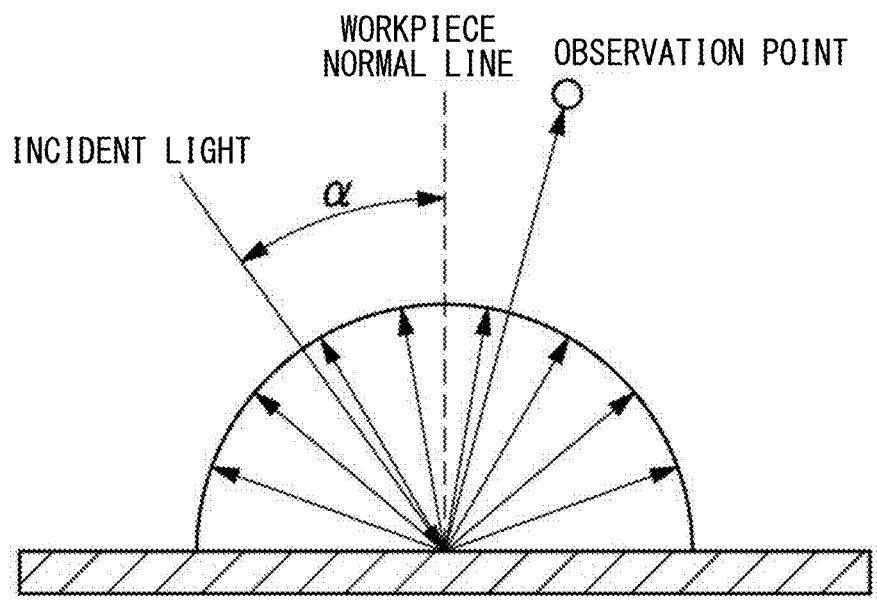
FIG. 19A is schematic diagram illustrating a Lambert reflection model.

First, it is possible to use a Lambert reflection model as a model of diffuse reflection. The Lambert reflection model is a property of an ideal diffusing reflective surface and is a reflection model in which luminance is constant when viewed in any direction. The state is illustrated in FIG. 19A. Here, when I represents the luminance of the incident light, α represents an incident angle, kd represents a rate of the diffused reflection component, and rd represents the reflectance of diffuse reflected light, the luminance Id of the diffuse reflected light is expressed in the following expression.

$$I_d=k_d r_d I \cos \alpha$$

In the above expression, a represents an angle between a workpiece normal line and the incident light. Here, although the description is provided using the Lambert reflection model, the reflection model is not limited to the Lambert reflection model in the present invention, and another diffuse reflection model may be used.

Specular Reflection Component

Next, examples of a specular reflection models include the Phong specular reflection model, a Blinn-Phong specular reflection model, a Torrance-sparrow specular reflection model, a Blinn specular reflection model, and the like. The Phong specular reflection model is described in the present specification; however, the present invention is not limited thereto, and it is possible to use another specular reflection model, including the models described above.

Figure 19B:
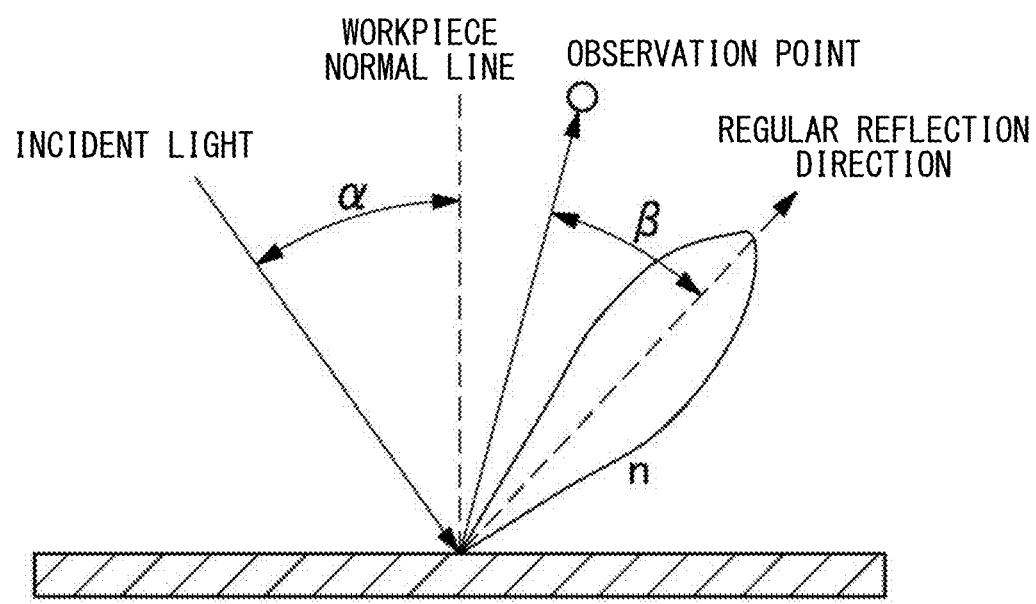
FIG. 19B is a schematic diagram illustrating a Phong specular reflection model.

FIG. 19B illustrates a schematic view of the Phong specular reflection model. In FIG. 19B, α represents an angle between incident light and the normal line to the workpiece front surface, β represents an angle between a regular reflection direction and the observation point, and n represents a parameter indicating a degree of spread of light. As illustrated in FIG. 19B, in a case of the specular reflection, reflection is performed with a slight spread with the regular reflection direction as the center. In addition, when the observation point is separated from the regular reflection direction, the luminance is reduced. Here, when I represents the luminance of the incident light, β represents an angle between the regular reflection direction and the observation point, ks represents a rate of the diffused reflection component, and rs represents the reflectance of specular reflected light, the luminance Is of the diffuse reflected light is expressed in the following expression.

$$I_s = k_s r_s I \cos^n \beta$$

In the above expression, n is a coefficient representing a degree of the specular reflection. As n increases, the reflection is performed with the slight spread. In addition, computation is performed in a state in which not only the ambient light is not present, but also there is neither self-emission nor absorption of light by an object. The luminance Ir of the reflected light is expressed in the following expression.

$$I_r = I(k_d r_d \cos \alpha + k_s r_s \cos^n \beta)$$

Figure 20:
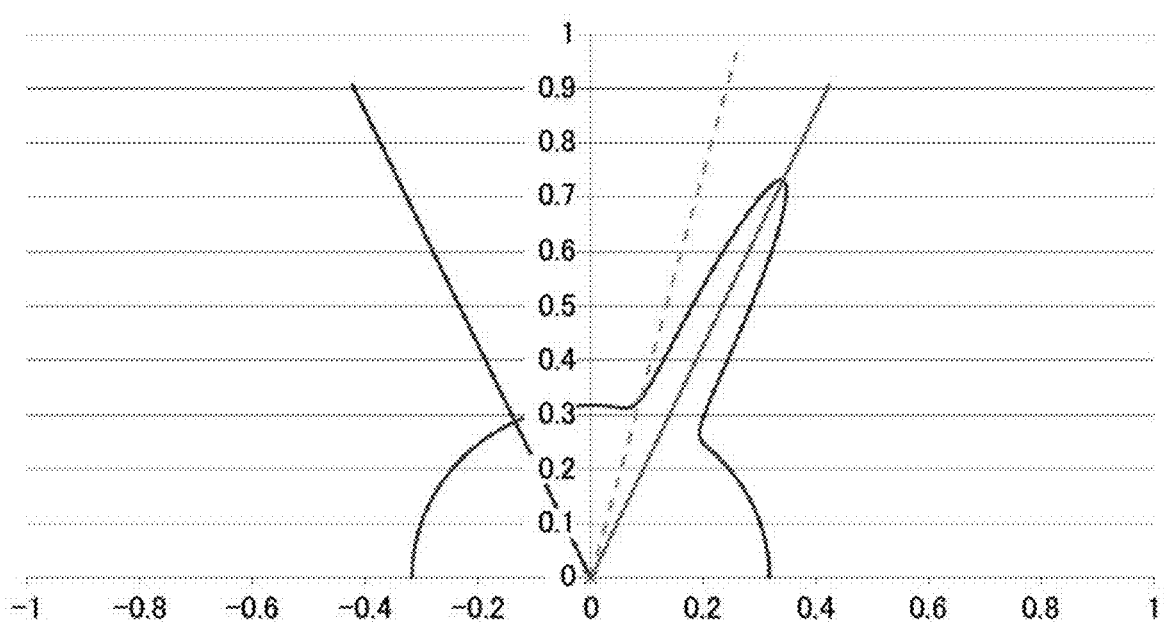
FIG. 20 is a graph illustrating an example of distribution of reflected light.

Coefficients in the above expression may be set as values measured by a measuring instrument using an integrating sphere in advance. Otherwise, the coefficients may be simply obtained by providing the illuminations in a plurality of directions, or the user may input the coefficients. Here, the coefficients are as follows. kd=0.5, ks=0.5, rd=0.7, rs=0.98, Incident angle (α)=25°, Degree of spread of specular reflected light (n)=200, Observation point angle=15°. Distribution of reflected light with the coefficients is illustrated in FIG. 20.

As described above, intensity of light changes depending on a direction in which observation is performed. Since observed light having low intensity means that a difference in intensity between a region having the low intensity and a region without light reaching there is small, it is not possible to perform the three-dimensional measurement. Here, when the workpiece is considered to be irradiated with light (structured light) having a pattern structured from the projector, whether contrast with the portion without light reaching there is obtained is determined depending on a degree of reflected light from a portion with light reaching there which reaches the observation point. Therefore, whether or not the measurement can be performed is determined depending on the degree. For example, Examples are considered to be as follows.

Example 1

Diffuse reflection to specular reflection=9 to 1, Grade of workpiece=40°, Intensity of incident light=I, kd=0.9I, ks=0.1I, rd=0.70, rs=0.98, α=40°, β=50°, n=100

In this case, luminance of light reaching a certain point, which is observed from an observation point, is expressed in the following expression.

$$I = 0.7 \cdot 0.9 I_i \cdot \cos 40 + 0.98 \cdot 0.1 I_i \cdot \cos^{100} 50 = 0.48 I_i$$

Example 2

Diffuse reflection to specular reflection=1 to 9, Grade of workpiece=40°, Intensity of incident light=I, kd=0.1I, ks=0.9I, rd=0.70, rs=0.98, α=40°, β=50°, n=100

In this case, luminance of light reaching a certain point, which is observed from an observation point, is expressed in the following expression.

$$I = 0.7 \cdot 0.1 I_i \cdot \cos 40 + 0.98 \cdot 0.9 I_i \cdot \cos^{100} 50 = 0.05 I_i$$

Figure 21A:
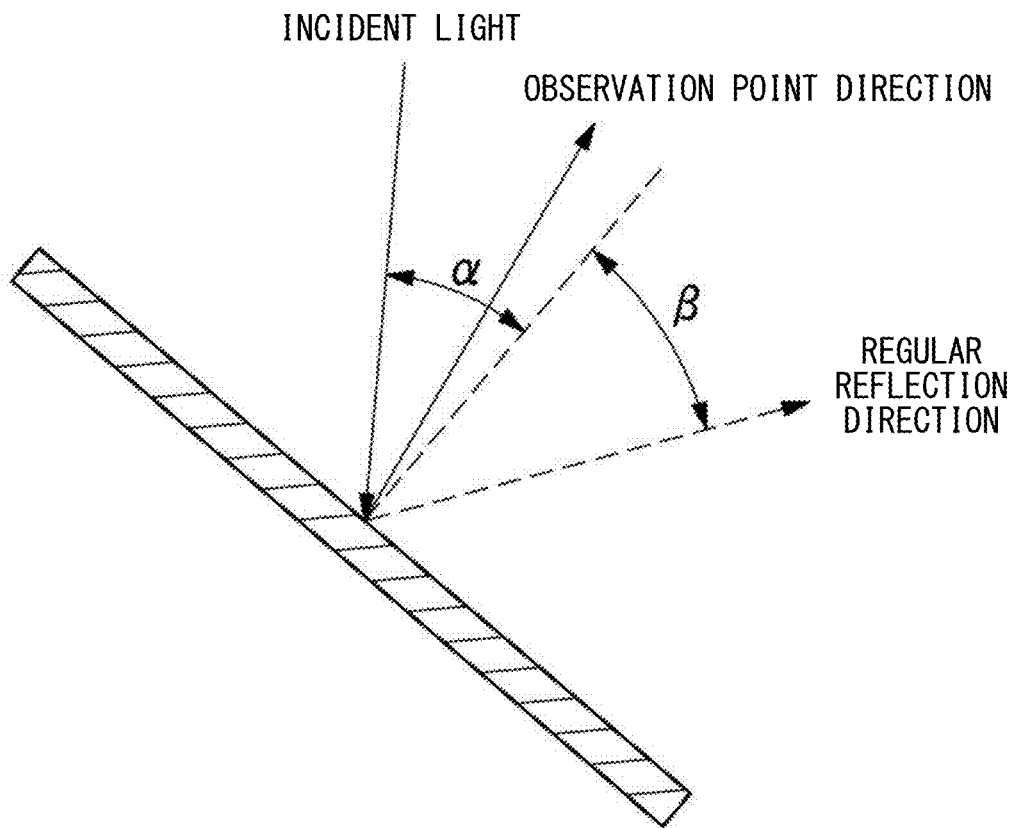
FIG. 21A is a schematic diagram illustrating a relationship between incident light, an observation point direction, and a regular reflection direction.
Figure 21B:
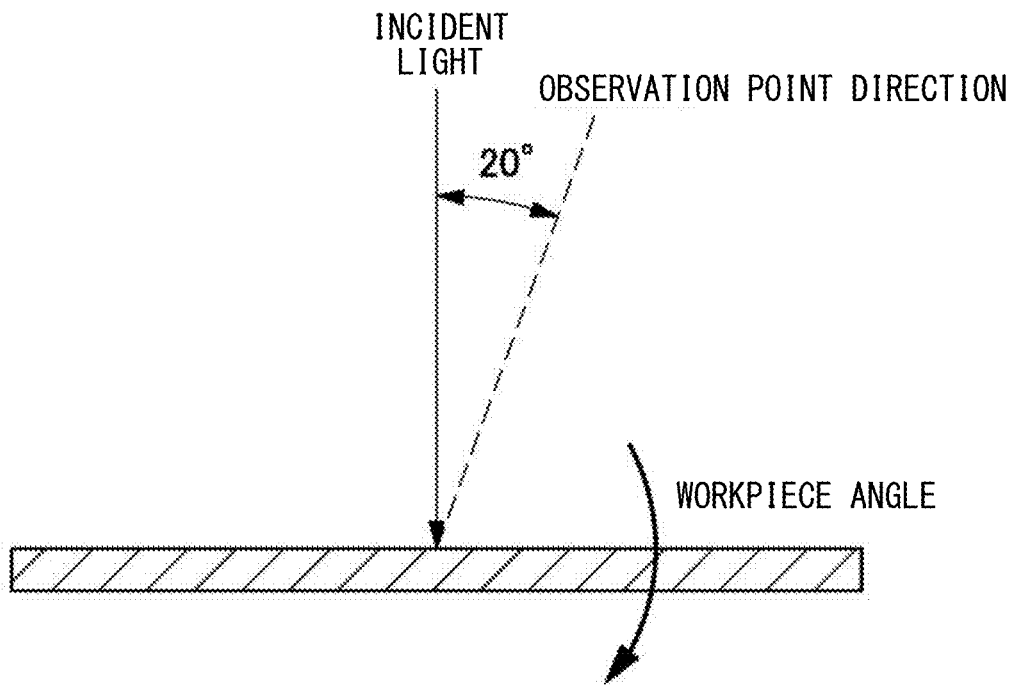
FIG. 21B is a schematic diagram illustrating a state in which an angle of a workpiece is changed with respect to the incident light and the direction of an observation point.
Figure 22:
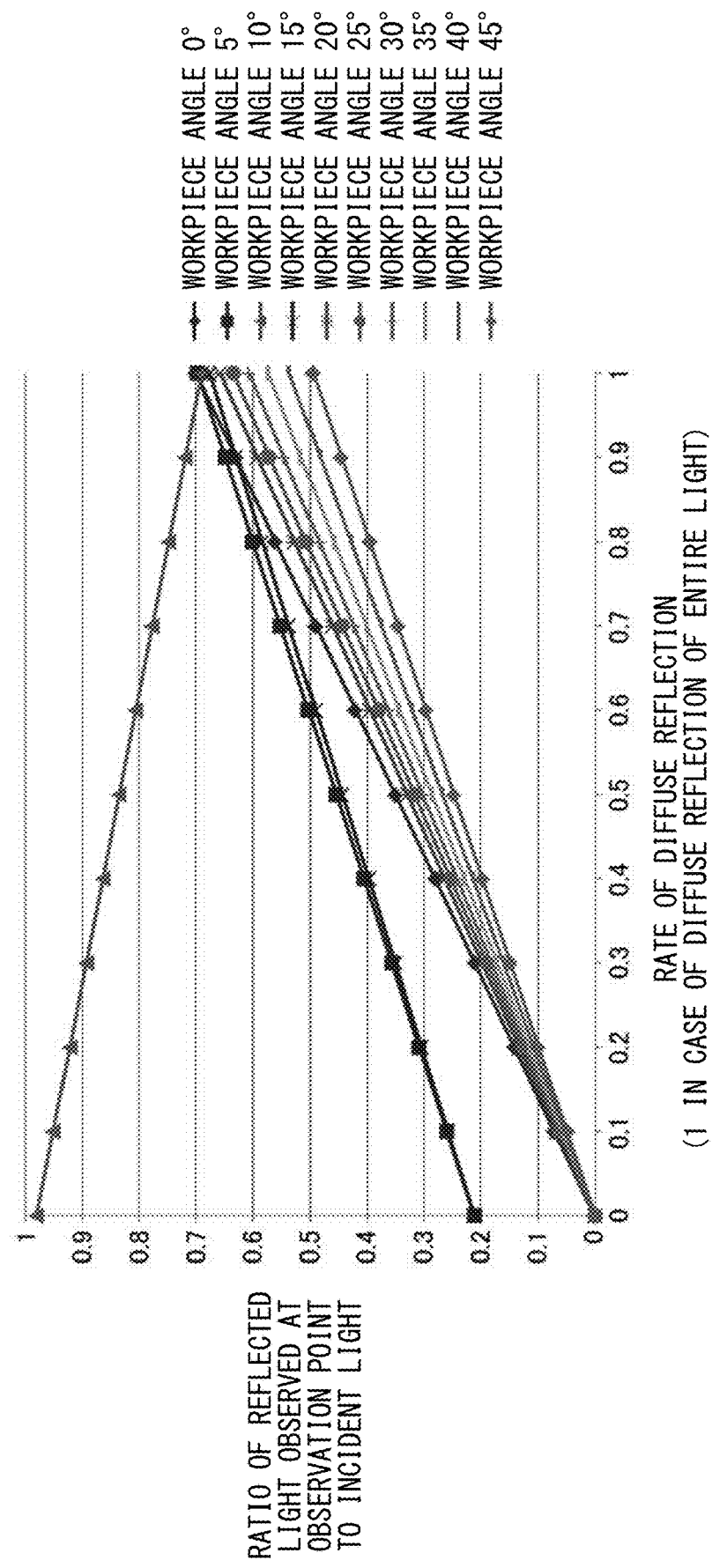
FIG. 22 is a graph illustrating a ratio of reflected light to the incident light when an inclination angle on the workpiece in FIG. 21B is changed.

As described above, when an incident direction, an observation direction, or an angle of the workpiece is the same, but a rate of the diffuse reflection to specular reflection is different with respect to the incident light, an observation point direction, and the regular reflection direction as illustrated in FIG. 21A, a large difference in observed luminance is found. Here, a situation as illustrated in FIG. 21B is considered. Here, when intensity of incident light=I, kd=0.1I, ks=0.9I, rd=0.70, rs=0.98, and n=100, a ratio of the reflected light to the incident light, which is obtained when the workpiece in FIG. 21B is inclined, is illustrated in a graph in FIG. 22.

A low ratio of the reflected light to the incident light means that light does not return to the observation point even when light reaches a certain portion of the workpiece and, thus, the portion is not distinguished from a portion without light reaching there. In other words, the ratio is considered to be approximate to a value of contrast obtained when the workpiece surface is observed. A threshold is set with respect to the ratio and is an angle threshold used when a measurement result is computed. For example, when the threshold of the ratio is 0.4, it is possible to measure a workpiece having a diffuse reflection rate that is larger than 0.6 when the workpiece has a workpiece angle of 20°.

In addition, the threshold may be one fixed value as described above, may be any function, or may be designated by a user.

When the observation point is present right in the regular reflection direction in a case where the specular reflection component is large, quite intense light is likely to travel in the observation point direction (for example, a case of the workpiece angle of 10° in FIG. 21B). Therefore, in a case where a camera or the like receives the light, pixels are saturated and it is not possible to perform the measurement. In order to determine such a position, the threshold may be set to a large value.

Figure 23A:
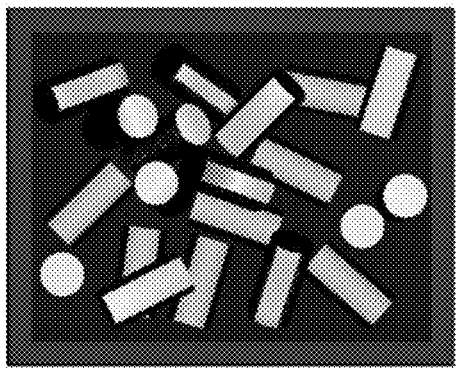
FIG. 23A is an image view illustrating an example in which a height image having a high diffuse reflection rate is two-dimensionally displayed.
Figure 23C:
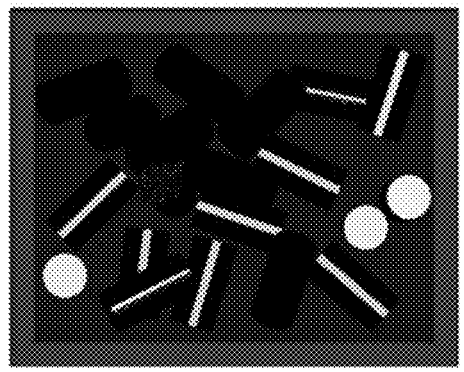
FIG. 23C is an image view illustrating an example of a height image having a high specular reflection rate.
Figure 23B:
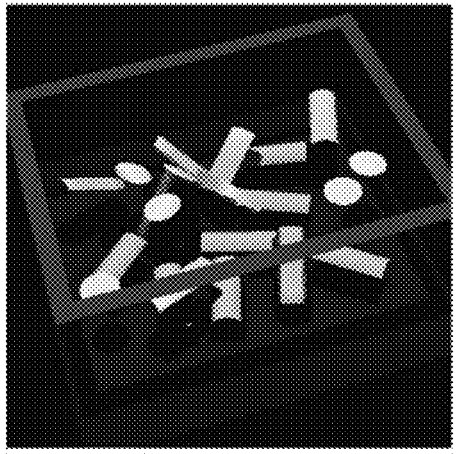
FIG. 23B is a perspective view of a three-dimensional display of FIG. 23A.
Figure 23D:
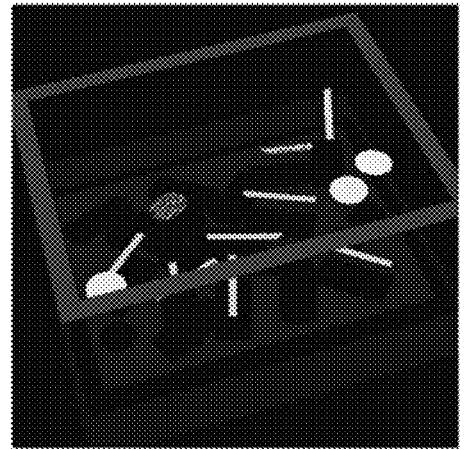
FIG. 23D is a perspective view of FIG. 23C.

FIGS. 23A to 23D illustrate schematic views obtained when the measurement is performed by using the threshold determined as described above. The figures are as follows. FIG. 23A is an image view illustrating an example in which a height image having a high diffuse reflection rate is two-dimensionally displayed, FIG. 23B is a perspective view of a three-dimensional display of FIG. 23A, FIG. 23C is an image view illustrating an example of the height image having a high specular reflection rate, and FIG. 23D is a perspective view of FIG. 23C.

By using such a method, it is possible to execute a simulation that is more approximate to the actual operation. In addition, since a user can set a setting method for the process with a keyword such as "material" or "front-surface roughness" which is easy to understand, it is possible to perform the setting in a more simplified manner.

Embodiment 8

Figure 24:
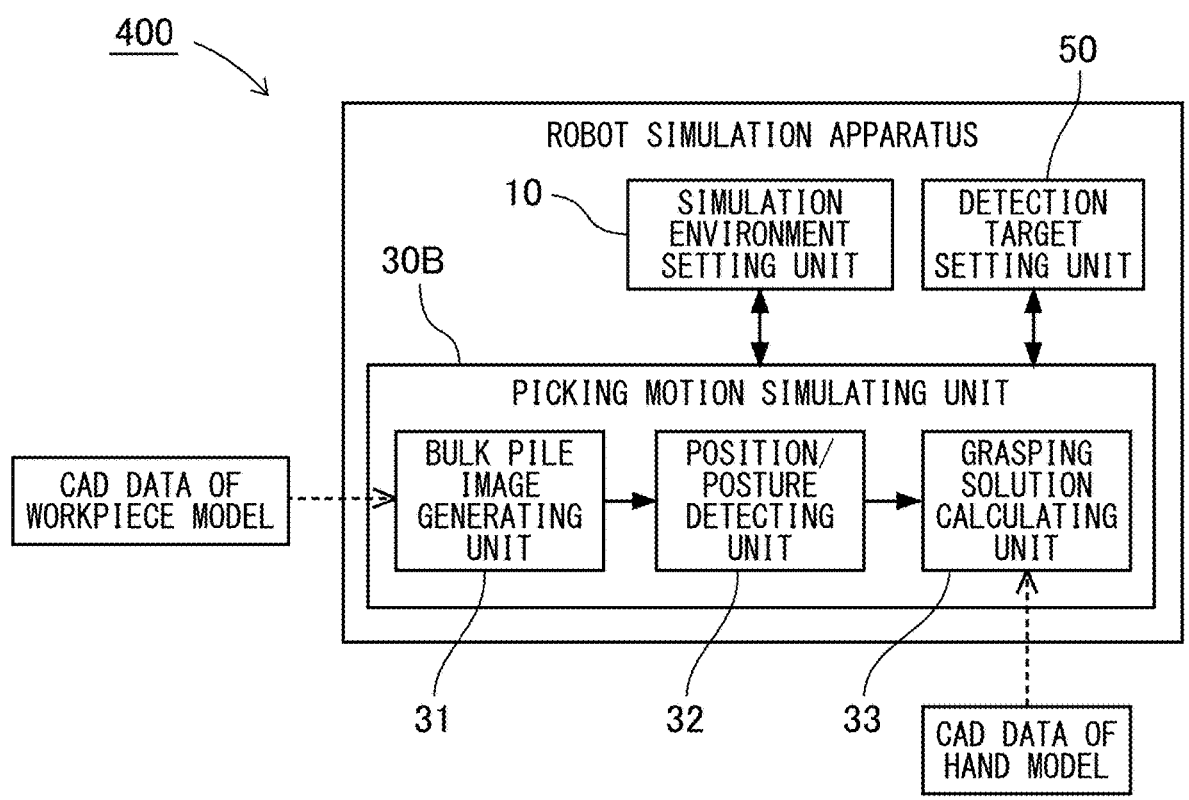
FIG. 24 is a functional block diagram illustrating a robot simulation apparatus according to Embodiment 8.

In the examples described above, the example in which the bulk pile data generating unit 20 or the region estimating unit 22 is provided separately from the picking motion simulating unit 30. However, the present invention is not limited to such a configuration, and the picking motion simulating unit may have a function of generating the bulk pile data or the bulk pile image. FIG. 24 illustrates a functional block diagram of such an example as a robot simulation apparatus 400 according to Embodiment 8. The robot simulation apparatus 400 illustrated in FIG. 24 includes a picking motion simulating unit 30B, the simulation environment setting unit 10, the detection target setting unit 50, and the bulk pile data storing unit 23. In Embodiment 8, the same reference signs are assigned to the same members as those in Embodiment 1 described above, and the detailed description thereof is appropriately omitted.

The picking motion simulating unit 30B includes a bulk pile image generating unit 31, a position/posture detecting unit 32, and a grasping solution calculating unit 33. The bulk pile image generating unit 31 generates a bulk pile image as a two-dimensional height image indicating a bulk pile state based on the three-dimensional bulk pile data of a bulk pile of a plurality of workpiece models. The bulk pile image can be a plan view from the sensor unit. The position/posture detecting unit 32 is a member that detects positions and postures of workpiece models on the bulk pile image. Further, the grasping solution calculating unit 33 performs interference determination between the workpiece models based on the positions and the postures of the workpiece models and, further, calculates a posture of an end effector model for grasping the workpiece model in a case where the end effector model obtained by simulating the end effector is capable of performing the grasping.

Procedure of Picking Motion Simulation

Figure 25:
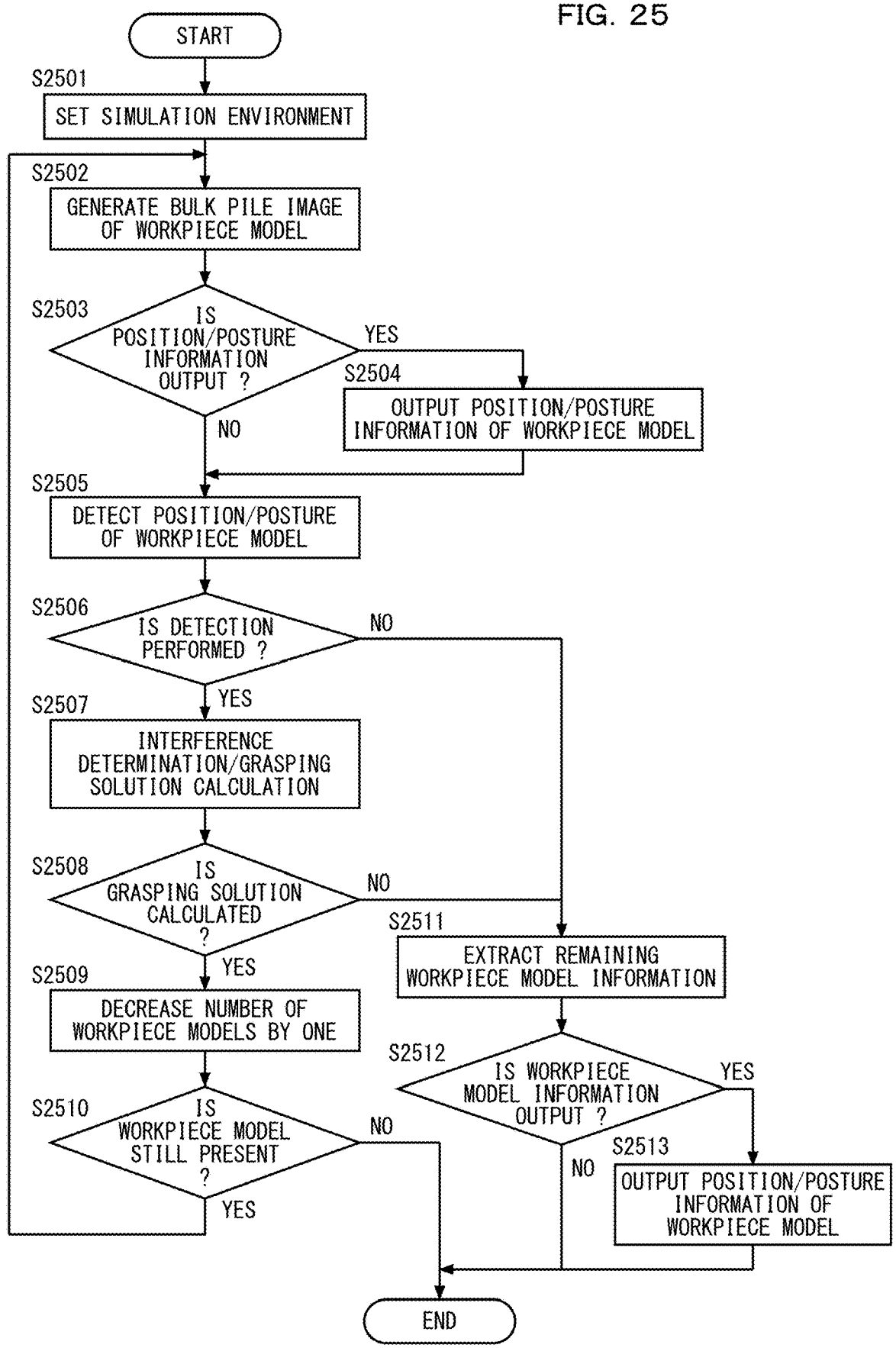
FIG. 25 is a flowchart illustrating a procedure of a picking motion simulation.

Next, the procedure of the picking motion simulation is described based on the flowchart in FIG. 25. First, in Step S2501, a simulation environment is set. For example, setting for generating the bulk pile image is performed by a user by using the simulation environment setting unit 10 in FIG. 24.

Next, in Step S2502, the bulk pile image of the workpiece model is generated. Here, in order to virtually reproduce a state in which the workpieces are piled up in the work space, the physical simulation is executed. In the physical simulation, a motion of causing the workpiece models to fall one by one into the virtual work space is repeatedly performed such that the bulk pile data of a plurality of randomly piled-up workpiece models is generated (to be described below in detail).

As described above, when the bulk pile image is obtained in Step S2502, it is determined whether or not position/posture information indicating the position and posture of the workpiece model is output in Step S2503. In a case where the information is being output, the procedure proceeds to Step S2504. After the position/posture information of the workpiece model is output, the procedure proceeds to Step S2505. On the other hand, in a case where the position/posture information is not output, the procedure proceeds to Step S2505 by skipping Step S2504.

In Step S2505, detection of the positions and the postures of the workpiece models is tried. Further, in Step S2506, it is determined whether or not the positions and the postures of the workpiece models can be detected. In a case where it is possible to perform the detection, the procedure proceeds to Step S2507.

On the other hand, in a case where it is not possible to perform the detection, the procedure jumps to Step S2511, and information of the remaining workpiece models is extracted. Here, the information of the remaining workpiece models includes the number of workpiece models that are not correctly recognized and, thus, remain without being picked or position/posture information corresponding to the workpiece models for which it is possible to detect the position/posture information.

Subsequently, in Step S2512, it is determined whether or not the extracted position/posture information of the workpiece model is output. In a case where the information is being output, the procedure proceeds to Step S2513 and the position/posture information of the workpiece model is output, the process is then ended. On the other hand, in a case where the information is not output, the process is ended as it is.

In a case where it is possible to detect the position and the posture of the workpiece models in Step S2506, interference determination between the end effector model and periphery data and calculation of a grasping solution are tried in Step S2507. In a case where it is determined whether or not it is possible to calculate the grasping solution and it is possible to perform the calculation in Step S2508, the procedure proceeds to Step S2509. In a case where it is not possible to perform the calculation, the procedure jumps to Step S2511, the position/posture information of the remaining workpiece models is extracted as described above, and the process is ended after the output is determined in Step S2512.

In a case where it is possible to calculate the grasping solution in Step S2508, the procedure proceeds to Step S2509, and the number of workpiece models that configure the bulk pile data is decreased by one. In a case where it is determined whether or not an unprocessed workpiece model remains in Step S2510 and an unprocessed workpiece model remains, the procedure returns to Step S2502 and the processes described above from the generation of the bulk pile image are repeatedly performed. On the other hand, in a case where no unprocessed workpiece model remains, the process is ended.

As described above, the picking motion simulating unit executes the picking motion simulation. Results of the execution can be displayed on the display unit as necessary. A user can determine suitability of current setting based on the results. In addition, various types of setting are modified as necessary. For example, an installation position of the robot main body, a mounting position of the accommodation container, a posture of the sensor unit, or the like is adjusted. The modified setting is input to the simulation environment setting unit, the picking motion simulation is re-executed, work of checking the suitability thereof is repeatedly performed, and it is possible to determine a setting condition suitable for an environment of the user.

Procedure of Generating Bulk Pile Image

Figure 26:
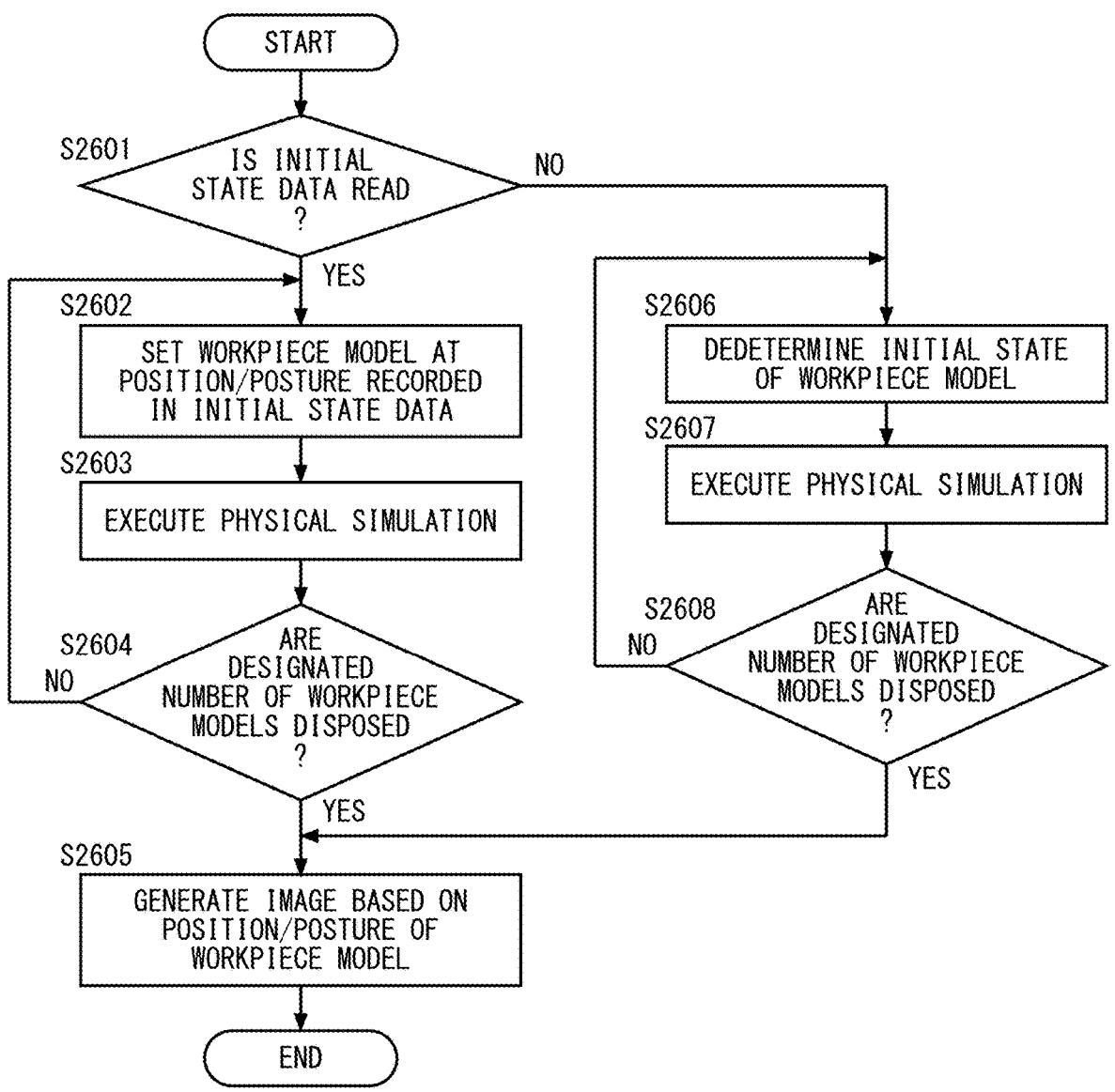
FIG. 26 is a flowchart illustrating a procedure of generating a bulk pile state of workpiece models in a physical simulation.

Next, the procedure of generating the bulk pile image of the workpiece models in Step S2502 in the flowchart in FIG. 25 above will be described in detail by using the flowchart in FIG. 26.

First, in Step S2601, it is determined whether or not initial state data is read. The determination urges the user to determine whether or not the initial state data is read. The initial state data is saved in the bulk pile data storing unit 23 or the like in advance.

In a case where the initial state data is read, the procedure proceeds to Step S2602, and the workpiece model is set at the position and posture recorded in the saved initial state data. Subsequently, in Step S2603, the physical simulation is executed. For example, the workpiece model is caused to fall from a predetermined height (to be described below in detail). Further, in Step S2604, it is determined whether or not all of the workpiece models designated by the simulation environment setting unit are disposed, based on the simulation parameters. In a case where the disposition is not completed, the procedure returns to Step S2602 and the process is repeatedly performed. When it is determined that the designated number of workpiece models are dropped, the procedure proceeds to Step S2608, the bulk pile image is generated, based on the position and posture of the workpiece models, and the process is ended.

On the other hand, in a case where it is determined that the initial state data is not read in Step S2601, the procedure proceeds to Step S2605, and the initial state of the workpiece model is set. In the initial state, the workpiece model includes a start position and posture at which the physical simulation is performed. For example, in a case where a user wants to pile the workpiece models in bulk at desired positions such as a case where the user wants to dispose the workpiece model at a position on a wall of the accommodation container, such a position and a posture are determined. In other words, the position and the posture of the workpiece model are determined based on a random number.

Next, in Step S2606, the physical simulation with respect to the workpiece model is executed. Further, in Step S2607, it is determined whether or not the designated number of workpiece models are disposed. In a case where the designated number of workpiece models are not all disposed, the procedure returns to Step S2605 and the process is repeatedly performed. When it is determined that the designated number of workpiece models are dropped, the procedure proceeds to Step S2608 similarly to the above description, the bulk pile image is generated, based on the positions and the postures of the workpiece models, and the process is ended. As described above, the bulk pile image is generated.

Physical Simulation

When the physical simulation is performed, it is not absolutely necessary to cause the workpiece models to fall. For example, the physical simulation may start from a state in which the workpiece models are disposed on the floor or another workpiece model is disposed on a workpiece model disposed in advance so as to be in contact with each other. In other words, the motion of falling of the workpiece models is not necessarily required in the physical simulation. However, in a case where a workpiece is actually mounted on a floor or on other workpieces piled in a bulk, a possibility that an actual workpiece moves by receiving naturally applied stress or resistance such as the gravity, friction, or the like when the actual workpiece falls, tilts, or slides, is considered. In addition, in consideration of not only a state immediately after the workpiece is disposed, but also movement of the workpieces piled in bulk which loses balance and move further after another workpiece is picked up after the disposition of the workpiece, virtual movement of the workpiece models is simulated. In other words, in the present specification, meaning that a workpiece or a workpiece model "receives the influence of the gravity" is not limited to a state in which the workpiece or the like falls, and includes a state in which mounted workpiece or the like tilts, collapses, or slides, or does not slide due to friction, and movement from a stable state to an unstable state due to the stress or resistance acting in the field such as a change in a movement amount due to a coefficient of restitution of the workpiece.

Reproduction of Initial State of Simulation

Figure 27:
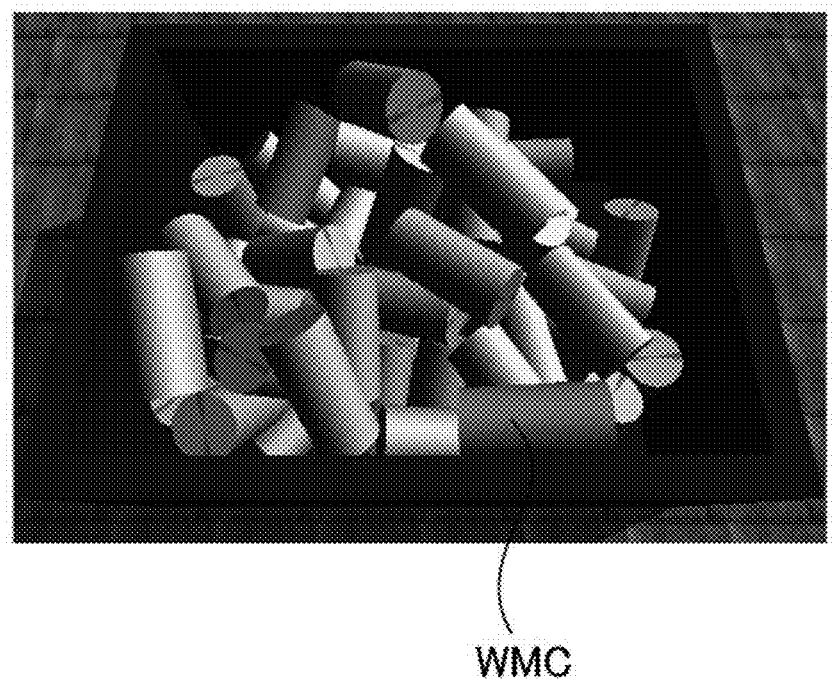
FIG. 27 is an image view illustrating bulk pile data of cylindrical workpiece models piled in bulk.
Figure 28A:
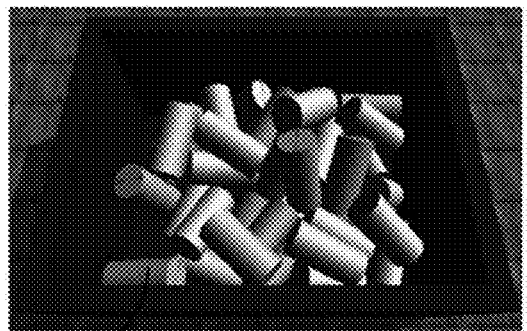
FIG. 28A is an image view illustrating an initial state of the cylindrical workpiece models piled in bulk.
Figure 28B:
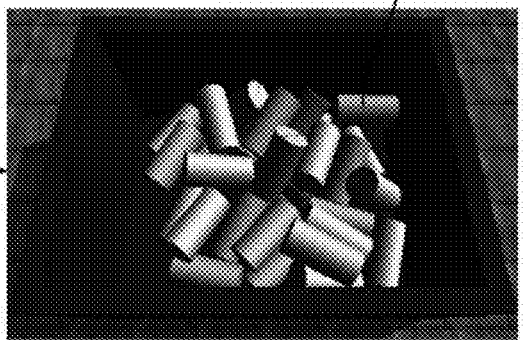
FIG. 28B is an image view illustrating a state of returning 20 times from an end state.
Figure 28C:
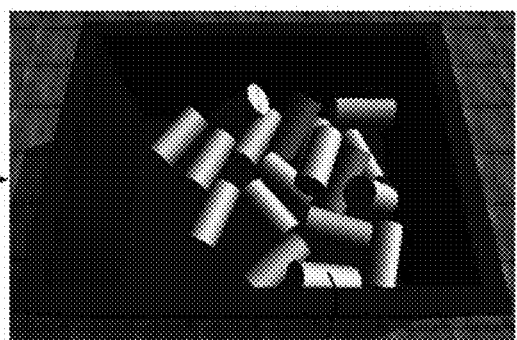
FIG. 28C is an image view illustrating a state of returning 10 times from the end state.
Figure 28D:
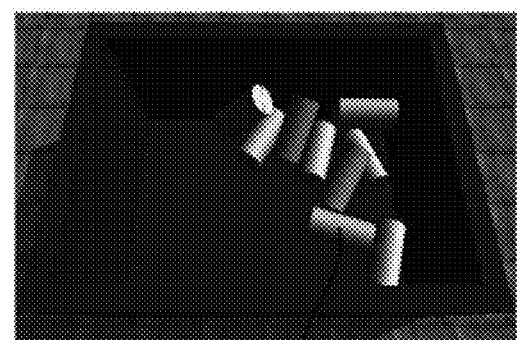
FIG. 28D is an image view illustrating the end state.

Here, cylindrical workpiece models WMC are piled in bulk as illustrated in FIG. 27, and an example of performing the picking motion simulation is described. Here, the picking motion simulation is performed with respect to an initial state of the bulk pile data of the workpiece models WMC piled in bulk illustrated in FIG. 28A. Then, in a state illustrated in FIG. 28D illustrating a result of performing a process of removing the workpiece models one by one, a case where the picking motion simulation is ended is considered.

Here, in a case where an initial state of the bulk pile data is randomly set, it is not possible to achieve the same state as the state obtained in the previous physical simulation. In other words, since random bulk pile data is generated whenever the physical simulation is performed, the initial state illustrated in FIG. 28A is temporary, and there is no reproducibility.

On the other hand, in a case where a user reviews the setting of the picking motion parameters and checks effects thereof, it is most efficient to reproduce a state in which the previous picking motion simulation is not smoothly performed and to check the bulk pile data. For example, in a case where the workpiece models are not all picked up without finding a grasping solution of the end effector model with respect to a certain workpiece model, the user considers a case of increasing instruction positions of grasping as a countermeasure. In this case, in order for the user to determine whether or not the modified setting is effective against a previous problem, it is most effective to reproduce the previous problematic state or a state approximate to the previous state and to perform checking.

Additionally, the checking may start from not only the state having the problem, but also states in a process to the occurrence of the problem. For example, in a case of a configuration in which the workpiece models are sequentially added, whether or not it is possible to prepare a countermeasure take action against the bulk pile data, in which a problem occurs, is considered to be checked in a state in which the number of workpiece models is reduced by several times back to a stage before several times in which the problem occurs.

In order to realize such state, in the embodiment, data of a state, which a user wants to reuse, such as the initial state or an end state of the bulk pile data, or an intermediate state is saved, and thus it is possible to call such saved bulk pile data and to perform verification after adjusting the picking motion parameters.

For example, the end state in FIG. 28D is saved in the bulk pile data storing unit 23, and thereby the user can estimate a cause of failure of the picking motion, re-execute the picking motion simulation in a state in which a presumed simulation parameter is reset by the simulation parameter setting unit, and check whether or not it is possible to perform the picking. Otherwise, in order to verify not only the state in which the picking motion simulation fails and is ended, but also the picking motion from the previous stage, it is possible to save bulk pile data of a state during the picking in the bulk pile data storing unit 23. For example, FIG. 28C illustrates bulk pile data of a state obtained by returning 10 times from the end state in FIG. 28D, and it is possible to verify the picking motion by resetting a simulation parameter from the stage. Otherwise, as illustrated in FIG. 28B, by returning to older data, the bulk pile data of the state obtained by returning 20 times from the end state in FIG. 28D is saved, and thus it is possible to read the data so as to re-execute the picking motion simulation.

In addition, the bulk pile data may be automatically saved at predetermined timing in the configuration, as well as saving performed by the user at predetermined timing as described above. For example, the saving may be performed regularly, as the predetermined timing, in the initial state before the picking motion simulation is executed, in the end state after the picking motion simulation is completed, in a state in which there is no pickable workpiece model, or whenever the workpiece model is picked up in an intermediate period.

In addition, as another predetermined timing, for example, the storing may be performed every certain number of workpieces piled in bulk, such as every five workpieces or every ten workpieces, or every five minutes, every ten minutes, or the like in elapsed time to generate the bulk pile data. In addition, a restriction may be set to a volume or the number of items of the bulk pile data which is automatically saved. For example, it is possible to set a rule as follows. When the items of the automatically saved bulk pile data exceed 500 items, old data is overwritten. Otherwise, in a case where a total volume of the automatically saved data exceeds 500 MB, old data is overwritten in order and is removed.

Further, it is possible to dispose general button types of fast forward or rewind in a VTR or the like as a user interface screen used when old data saved automatically or manually is read, or to prepare an operating unit that includes a rotary member such as a jog shuttle or a jog dial and can smoothly switch directions of a forward direction and a rewind direction. Otherwise, the operating unit may be configured to include a linear member such as a scroll or a slider so as to designate a past position.

In addition, instead of reading such saved bulk pile data, it is possible to randomly generate new bulk pile data. For example, such a configuration may be provided such that the user selects whether to use past bulk pile data or to use new bulk pile data during the picking motion simulation.

Saving Data in Process of Physical Simulation

Figure 29A:
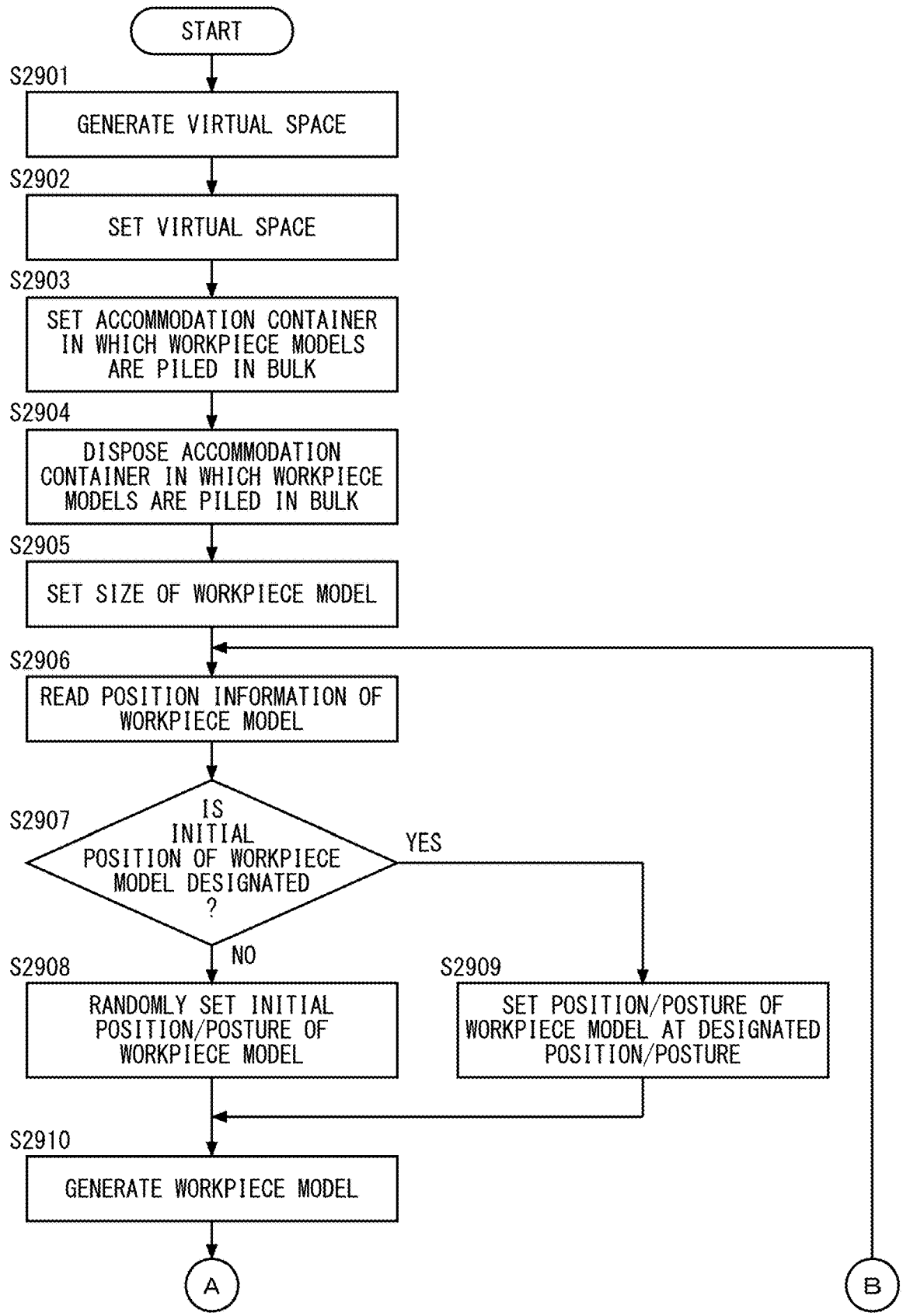
FIG. 29A is a flowchart illustrating a part of a procedure of the physical simulation performed in consideration of saving data.
Figure 29B:
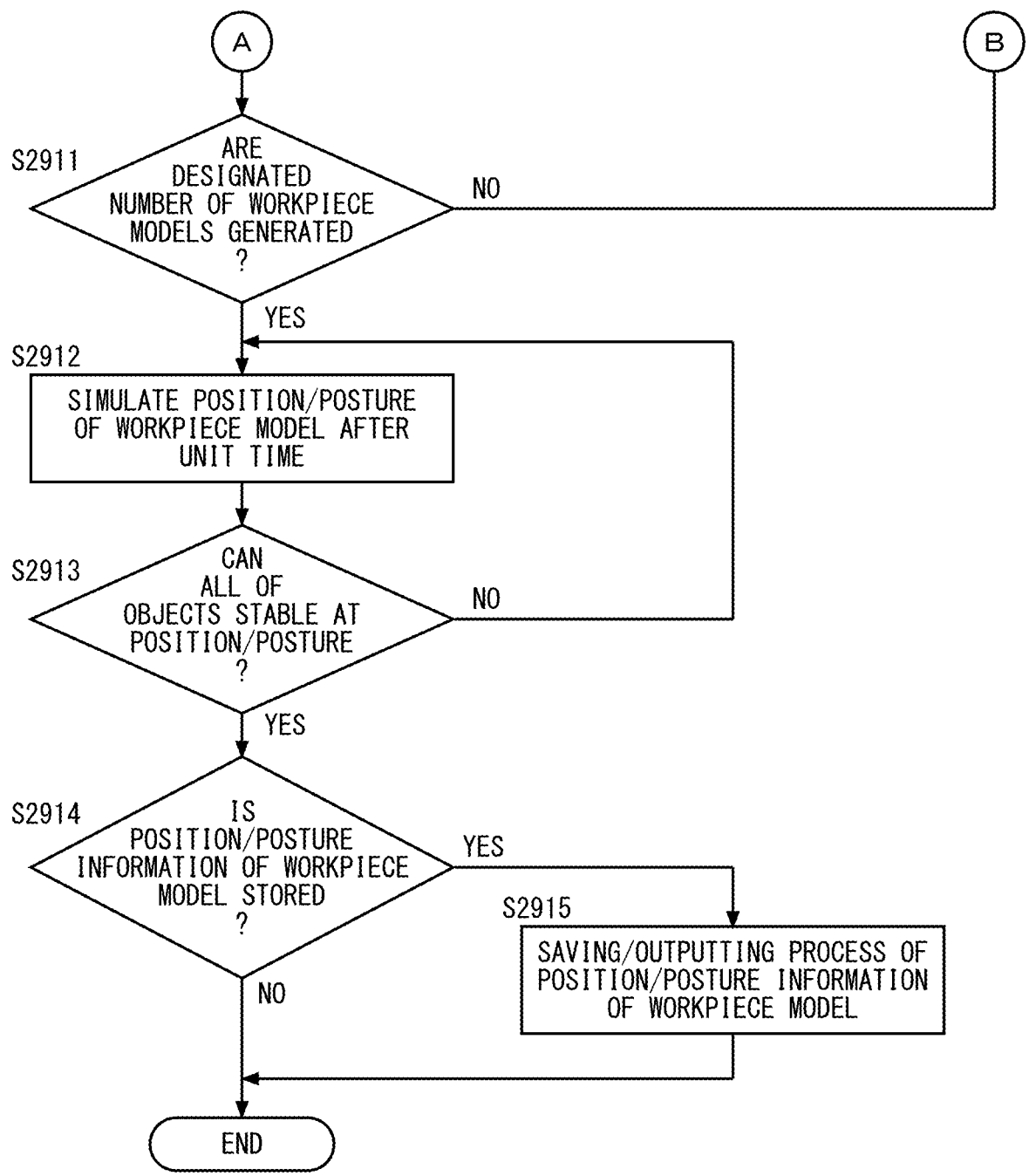
FIG. 29B is a flowchart continued from FIG. 29A illustrating a procedure of the physical simulation performed in consideration of saving data.

In general, in order to perform a simulation with the bulk pile data, the physical simulation is used. In the physical simulation, movement of an object such as a workpiece having mass in a virtual work space in which the gravity is set is dynamically simulated. In a case where objects collide with each other, movement of the object after the collision is obtained in consideration of a preset coefficient of restitution or coefficient of friction. A procedure of such a physical simulation is described below based on the flowchart in FIGS. 29A and 29B.

First, in Step S2901, a virtual space is generated. Next, in Step S2902, setting of the generated virtual space is performed. Here, parameters such as the gravity in the virtual space which are related to the entire physical simulation are set. The generation and the setting of the virtual space may be performed at the same time.

Further, in Step S2903, the accommodation container, in which the workpiece models are piled in bulk, is set. For example, vertical and horizontal lengths, the length of height, and the like of the accommodation container are set. Next, in Step S2904, disposition of the accommodation container, in which the workpiece models are piled in bulk, is set. In the physical simulation for generating the bulk pile data, the accommodation container is disposed as a stationary object in many cases.

In Step S2905, a size of the workpiece model is set. For example, specific setting such as a size, a shape, density, weight of the workpiece model is performed for the workpiece model. Next, in Step S2906, positional information of the workpiece model is read.

Further, in Step S2907, it is determined whether or not the initial position of the workpiece model is designated. In a case where the designation is not performed, the initial position and posture of the workpiece model are randomly set in Step S2908, and the procedure proceeds to Step S2910. On the other hand, in a case where the initial position of the workpiece model is set, the position and posture of the workpiece model are set as the designated position and posture in Step S2909, and the procedure proceeds to Step S2910. For example, the initial position of the workpiece model may be set by reading a setting file such as text data or the like, or it may be possible for the user to perform the designation by using the GUI or the like.

Next, in Step S2910, the workpiece model is generated. In Step S2911, it is determined whether or not the designated number of workpiece models are generated. In a case where the designated number of workpiece models are not all generated, the procedure returns to Step S2906 and the process is repeatedly performed. On the other hand, in a case where the designated number of workpiece models are generated, the procedure proceeds to Step S2912, and the position/posture of the workpiece model after unit time is simulated. Here, the simulation is not limited to the workpiece model, and the position/posture of the workpiece model after unit time is calculated also in consideration of collision with another workpiece model for all objects. In Step S2913, it is determined whether or not all of the workpiece models are stable at the position and the posture. In a case where the workpiece models are not all stable, the procedure returns to Step S2912 and the process described above is repeatedly performed. On the other hand, in a case where it is determined that all of the workpiece models are stable, the procedure proceeds to Step S2914, and it is determined whether or not the position/posture information of the workpiece model is saved. The user determines whether or not to save the information. The user saves the information in a case where the user thinks that it is necessary to save data such as a case where there is a possibility that the setting is reviewed or the simulation is redone later. In a case where the data is saved, the procedure proceeds to Step S2915. After saving or performing an output process of the position/posture information of the workpiece model, the process is ended. Here, whether to perform an output may be designated by the user every time. Otherwise, a log may be kept all the time inside the physical simulation unit. Further, the saved data may be designated by the number of times. It is possible to designate an arbitrary timing or number such as every N times or by 10 times. On the other hand, in a case where it is determined that it is not necessary to perform the saving, the process is ended as it is.

As described above, the physical simulation is performed in consideration of the position or posture of the workpiece model. According to such a method, a state in which the user thinks that it is necessary to review the setting is saved in Step S2914, and it is possible to call data later. As a result, it is possible to clearly determine whether or not it is effective to review the setting performed by the user when the user encounters a problem. Therefore, when the user causes a robot to motion, it is possible to perform correct setting in a shorter time, thereby achieving shortening of motioning time and stability of the actual operation.

Restriction on Posture of Workpiece Model

Figure 30:
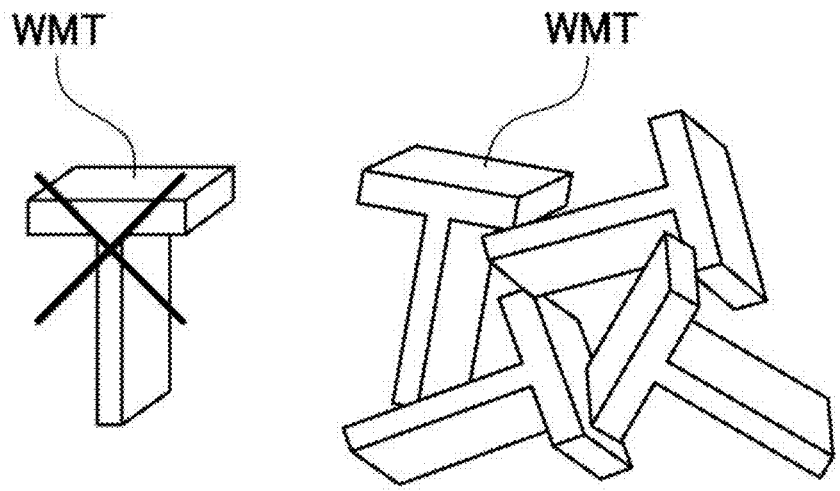
FIG. 30 is a schematic view illustrating a state in which T-shaped workpieces are present in unstable postures.

In addition, in the generation of the three-dimensional bulk pile data or bulk pile image, a restriction may be applied on the posture of the workpiece model that is disposed in the virtual work space. In other words, during the simulation of the picking from a bulk pile in the related art, the workpiece models are randomly disposed in the virtual work space. As a result, the simulation is performed in a state in which the environment is different from the actual operation in some cases. For example, as illustrated in FIG. 30, a state in which a T-shaped workpiece model WMT is present in an unstable posture such as an upright posture occurs. During the actual operation, it is difficult to encounter a state in which the workpiece is present in such an unstable posture.

In addition, an aspect in which the workpiece as a picking target is actually provided is not limited to a randomly piled-up state. A case of a layer stack state or a case where workpieces are piled in a state in which orientations of the workpieces are fixed also often occurs, and there is a state in which setting adjustment or verification suitable for the state of the workpiece used during the actual operation cannot be performed.

In the embodiment, the bulk pile data is prepared in a state in which the workpieces do not have completely random postures, but a certain restriction is applied on the postures, and thereby the simulation result is obtained in accordance with the environment or condition during the actual operation. In other words, the bulk pile data is generated in a customized manner depending on a use by the user, the shape of the workpiece, or the like, and thus it is possible to perform individual setting in the generation of the bulk pile data.

It is possible to apply the restriction on the posture of the workpiece during the execution of the physical simulation. As an example, (I) when the physical simulation is performed, the workpiece models are not dropped into the virtual work space in random postures but is dropped in a state in which the posture restriction is applied thereon. In addition, a posture out of the posture restriction is excluded in the process of the physical simulation, and thereby the posture restriction can be applied.

Otherwise, (II) when the physical simulation is performed, the workpiece models are not dropped one by one into the virtual work space in random postures but may fall at the same time in specified postures in a state in which the plurality of workpieces are disposed at constant intervals.

As described above, since it is possible to generate the bulk pile data in accordance with the state obtained during the actual operation, it is possible to execute the picking motion simulation in a state approximate to the state obtained during the actual operation, and thus more accurate simulation results are obtained. In this manner, it is possible to perform suitable setting adjustment or verification in advance in a state approximate to the state of the actual operation without actually preparing the workpieces. Hereinafter, a procedure used when the bulk pile data generating unit 20 performs generation after the posture condition setting unit 16 applies the posture restriction on a bulk pile state of the workpiece models in Step S2502 in FIG. 25.

I: Posture Restriction in Physical Simulation of Dropping Workpiece Models One by One First, the posture restriction applied when the workpiece models are dropped one by one in the physical simulation is described. Here, a method of applying the restriction on only the posture of the workpiece models is described. Here, the position of the workpiece model is not restricted but is random. There are three patterns of methods of applying the posture restriction. 1. The posture restriction is applied during the dropping of the workpiece models in the physical simulation. 2. After the execution of the physical simulation, workpiece models having a posture out of a posture restriction range are excluded. 3. Both of 1. and 2. above are performed.

1. Posture Restriction during Dropping of Workpiece Models

Figure 31:
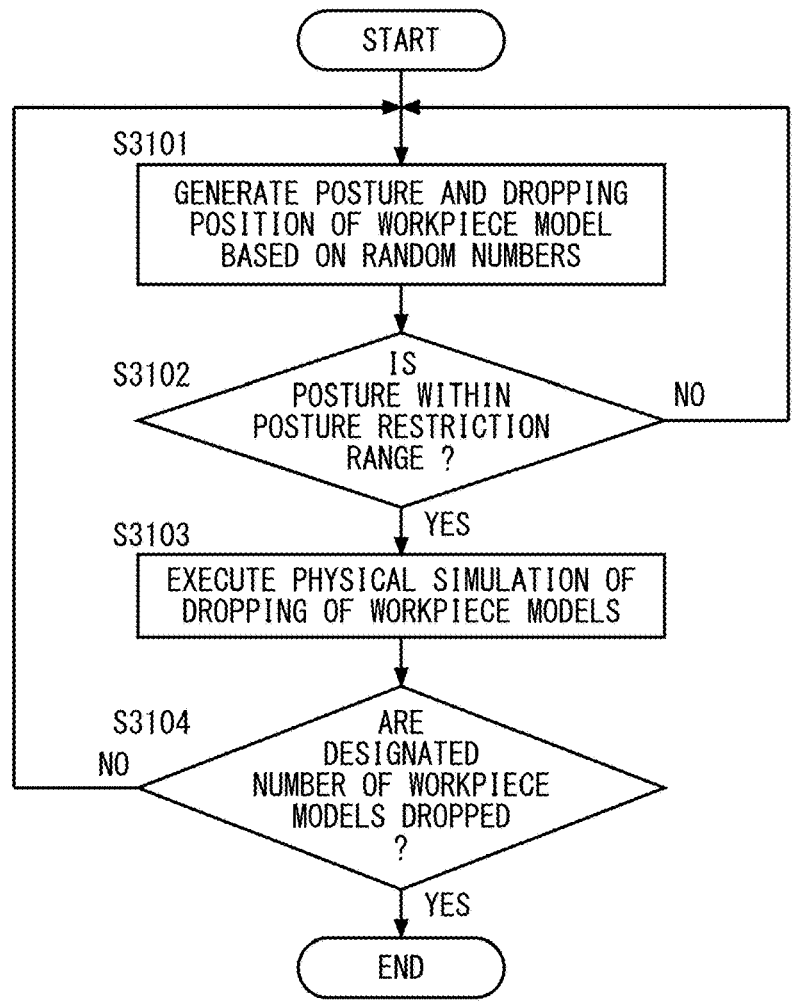
FIG. 31 is a flowchart illustrating a procedure of generating a bulk pile state by applying a restriction on the posture obtained during dropping of the workpiece models.

First, a procedure of applying the posture restriction during the dropping of the workpiece models in the physical simulation of 1. is described based on the flowchart in FIG. 31. Here, a posture, which is allowed for the workpiece model, is set as a posture condition by the posture condition setting unit 16. For example, an angle range of the posture that is allowed for the workpiece models is defined as the posture restriction range. Otherwise, it is possible to set an allowable rotation angle or an inclination angle from a reference posture of the workpiece model, as the posture condition.

In a state in which such a posture condition is set, first, in Step S3101, the posture and the dropping position of the workpiece models are generated based on random numbers. Next, in Step S3102, it is determined whether or not the generated posture of the workpiece model is included within the posture restriction range set by the posture condition setting unit. The determination is performed by the bulk pile data generating unit. In a case where the posture is determined not to be included within the posture restriction range, the procedure returns to Step S3101 and a new posture and dropping position of the workpiece model is regenerated. It is possible to generate the posture and the dropping position and to drop the workpiece models one by one, or postures and dropping positions may be generated collectively for the plurality of workpieces and the workpiece models may fall at the same time.

On the other hand, in a case where it is determined that the posture is included within the posture restriction range, the procedure proceeds to Step S3103, and the physical simulation of dropping the workpiece models is executed. In Step S3104, it is determined whether or not the designated number of workpiece models are all dropped. In a case where the designated number of workpiece models are not all dropped, the procedure returns to Step S3101 and the process is repeatedly performed. As described above, in a case where it is determined that the designated number of workpiece models are all dropped, the process is ended. As described above, it is determined whether the posture of the workpiece model before the dropping is included within the posture restriction range, and the workpiece model having a posture out of the restriction range is excluded. In this manner, it is possible to exclude presence of unnatural workpiece models. According to the method, since the physical simulation of falling itself is not performed with respect to the workpiece models having a posture out of the restriction range, it is possible to obtain advantages of simplification of the process related to the simulation.

2. Posture Restriction after Dropping of Workpiece Models

Figure 32:
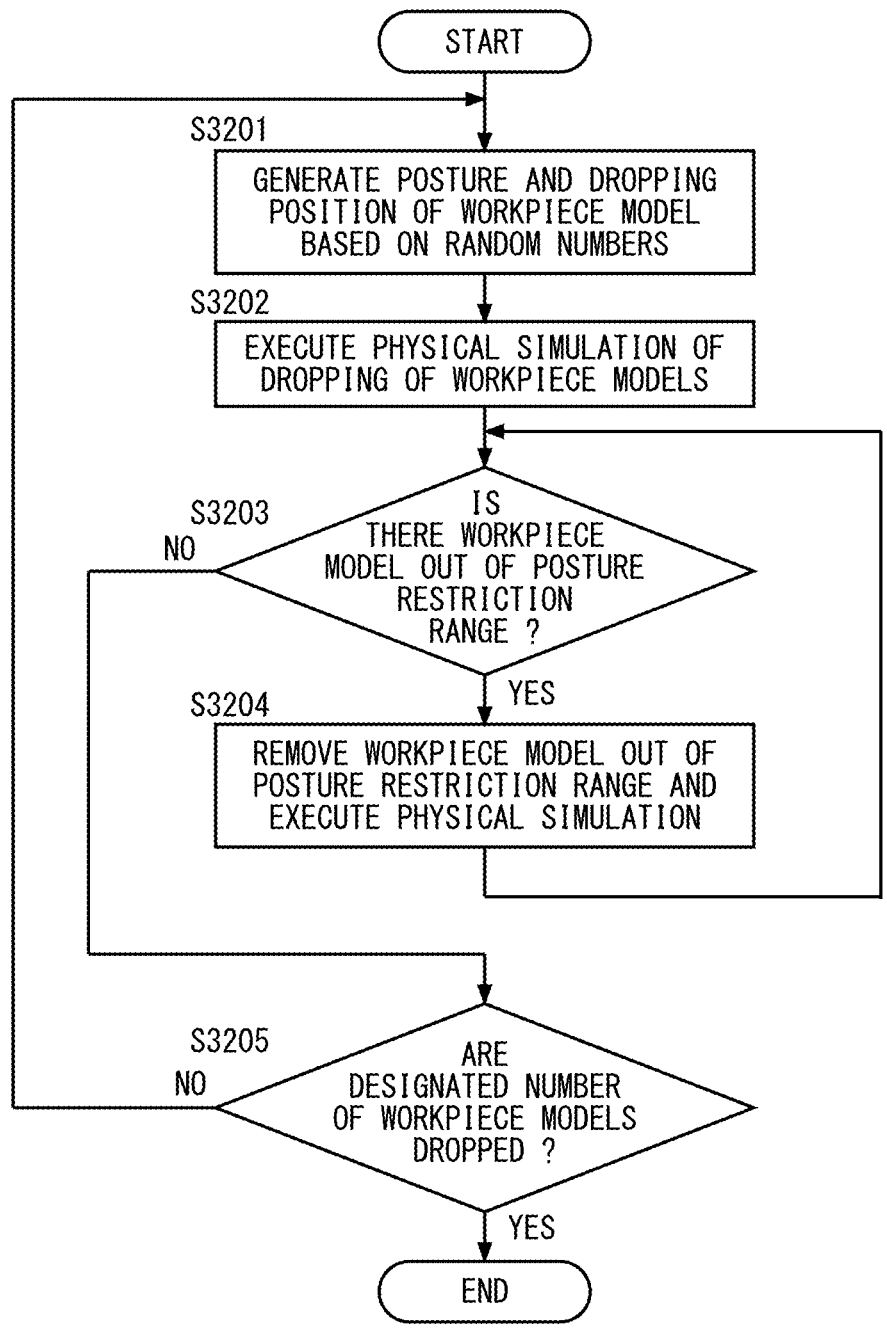
FIG. 32 is a flowchart illustrating a procedure of generating a bulk pile state by applying a restriction on a posture obtained after the dropping of the workpiece models.

On the other hand, it is determined whether or not the posture after the dropping of the workpiece models is included within the restriction range, and thereby it is also possible to exclude unnatural workpiece models. Hereinafter, a procedure of generating the bulk pile data by excluding the workpiece model having the posture out of the posture restriction range after the execution of the physical simulation of 2. is described based on the flowchart in FIG. 32.

First, in Step S3201, the posture and the dropping position of the workpiece models are generated based on random numbers. Next, in Step S3202, the physical simulation of dropping the workpiece models is executed. Here, it is also possible to generate the posture and the dropping position and to drop the workpiece models one by one, or postures and dropping positions may be generated collectively for the plurality of workpieces and the workpiece models may fall at the same time.

In Step S3203, it is determined whether or not, among the falling workpiece models, there is a workpiece model having a posture out of the posture restriction range set by the posture condition setting unit. In a case where it is determined that there is a workpiece having a posture out of the posture restriction range, the procedure proceeds to Step S3204, and the workpiece models having the posture out of the posture restriction range are excluded, and the physical simulation of falling again is executed. Then, the procedure returns to Step S3203, and the determination is repeatedly performed.

On the other hand, in a case where it is determined that there is no workpiece model having the posture out of the posture restriction range, the procedure proceeds to Step S3205, and it is determined whether or not the designated number of workpiece models are all dropped. In a case where the designated number of workpiece models are not all dropped, the procedure returns to Step S3201, and the process is repeatedly performed. As described above, in a case where it is determined that the designated number of workpiece models are all dropped, the process is ended. As described above, it is determined whether the posture of the workpiece model after the dropping is included within the posture restriction range, and the workpiece model having a posture out of the restriction range is excluded. In this manner, it is possible to exclude presence of unnatural workpiece models. According to the method, since the posture of the falling workpiece model is determined, an advantage is obtained in that it is possible to reliably exclude an unnatural workpiece model.

3. Posture Restriction before and after Dropping of Workpiece Models

Figure 33:
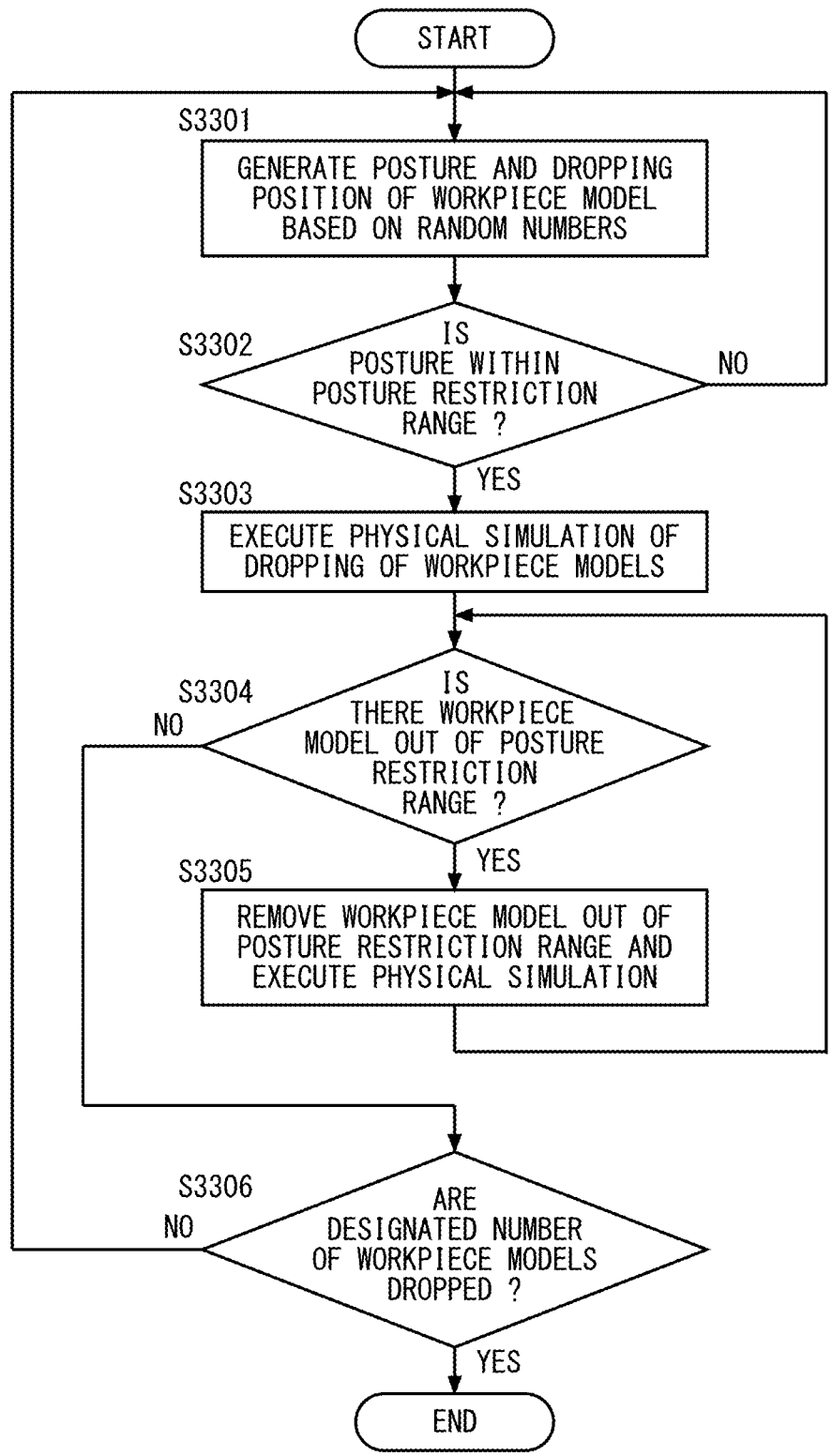
FIG. 33 is a flowchart illustrating a procedure of generating a bulk pile state by applying a restriction on the postures obtained during and after the dropping of the workpiece models.

Further, it is determined whether or not both of the posture before the dropping of the workpiece models and the posture after the dropping are included within the restriction range, and thereby it is also possible to exclude unnatural workpiece models. Here, the posture during the dropping, which is allowed for the workpiece model, and the posture after the dropping are set in advance by the posture condition setting unit. It is possible to set the postures as the same posture; however, it is preferable that the posture of the workpiece model during the dropping and the posture of the workpiece model after the dropping are separately set. Hereinafter, a procedure of generating the bulk pile data by excluding the workpiece model having the posture out of the posture restriction range before and after the execution of the physical simulation of 3, is described based on the flowchart in FIG. 33.

First, in Step S3301, the posture and the dropping position of the workpiece models are generated based on random numbers. Next, in Step S3302, it is determined whether or not the generated posture of the workpiece model is included within the posture restriction range set by the posture condition setting unit. In a case where it is determined that the posture is not included within the posture restriction range, the procedure returns to Step S3301 and a new posture and dropping position of the workpiece model is regenerated. Here, it is also possible to generate the posture and the dropping position and to drop the workpiece models one by one, or postures and dropping positions may be generated collectively for the plurality of workpieces and the workpiece models may fall at the same time.

On the other hand, in a case where it is determined that the posture is included within the posture restriction range, the procedure proceeds to Step S3303, and the physical simulation of dropping the workpiece models is executed. In Step S3304, it is determined whether or not, among the falling workpiece models, there is a workpiece model having a posture out of the posture restriction range set by the posture condition setting unit. In a case where it is determined that there is a workpiece having a posture out of the posture restriction range, the procedure proceeds to Step S3305, and the workpiece models having the posture out of the posture restriction range are excluded, and the physical simulation of falling again is executed. Then, the procedure returns to Step S3304, and the determination is repeatedly performed.

On the other hand, in a case where it is determined that there is no workpiece model having the posture out of the posture restriction range, the procedure proceeds to Step S3306, and it is determined whether or not the designated number of workpiece models are all dropped. In a case where the designated number of workpiece models are not all dropped, the procedure returns to Step S3301, and the process is repeatedly performed. As described above, in a case where it is determined that the designated number of workpiece models are all dropped, the process is ended. As described above, it is determined whether the posture of the workpiece model after the dropping is included within the posture restriction range, and the workpiece model having a posture out of the restriction range is excluded. In this manner, it is possible to exclude presence of unnatural workpiece models. According to the method, since the posture of the workpiece model before and after the falling is checked, it is possible to most reliably exclude an unnatural workpiece model.

Figure 34A:
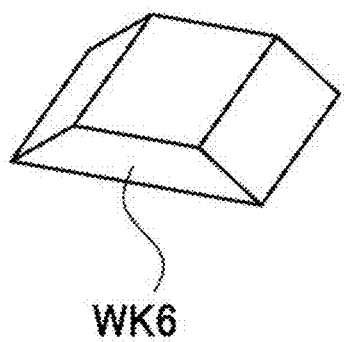
FIG. 34A is a perspective view illustrating a front surface of a workpiece.
Figure 34B:
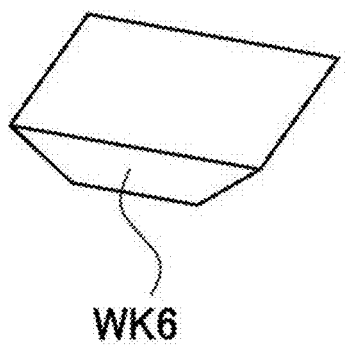
FIG. 34B is a perspective view illustrating a back surface of the workpiece.
Figure 35:
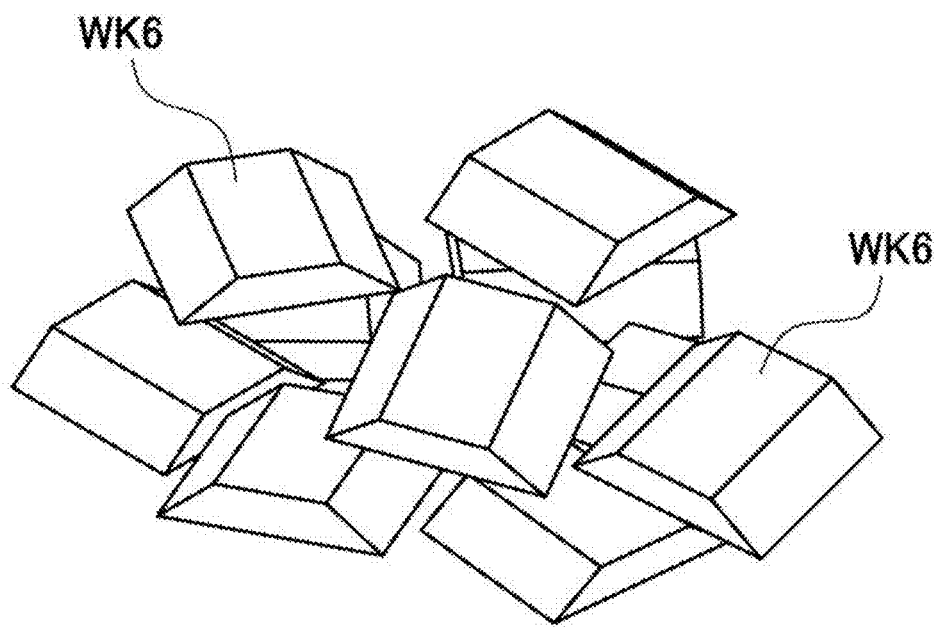
FIG. 35 is a perspective view illustrating a state in which workpieces in FIGS. 34A and 34B are piled in bulk.

As described above, a restriction is applied to the posture of the workpiece before the dropping or after the dropping of the workpiece models or at both of the timing, and thereby it is possible to avoid a situation in which the picking motion simulation is executed with respect to the workpiece such as an upright workpiece that is present in an unnatural form. In addition, it is possible to realize a bulk pile state in which only one surface is viewed according to the shape of the workpiece. For example, even in a case where only the side of the front surface of workpiece WK6 is viewed in the bulk pile state as illustrated in FIG. 35 with respect to the workpiece WK6 having a difference in area between the front surface and the back surface as illustrated in FIGS. 34A and 34B, it is possible to generate a bulk pile state in accordance with the actual operation and to virtually reproduce the state. For example, the posture condition setting unit performs setting such that a specific surface of the workpiece model is the bottom surface, as an allowed posture condition. In this manner, it is possible to perform time consuming work of adjusting or verifying the setting in the picking motion simulation in advance in a state approximate to the state of the actual operation without actually preparing workpieces. In addition, the setting is changed to be the optimal setting depending on a bulk pile formed by the workpieces which are targets and the restriction is applied on the posture condition, and thereby it is possible to obtain suitable setting before the execution of the picking motion simulation.

Embodiment 9

Figure 36A:
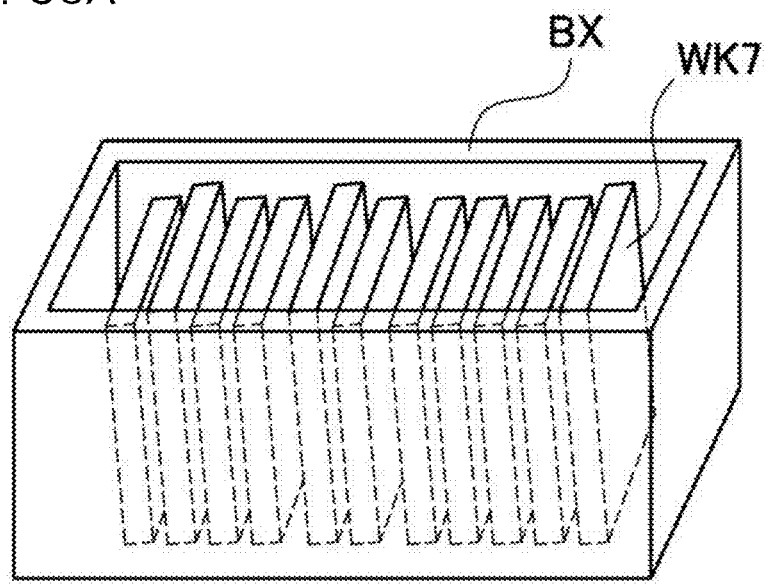
FIG. 36A is a perspective view illustrating a state in which workpieces are aligned and packed in an accommodation container.
Figure 36B:
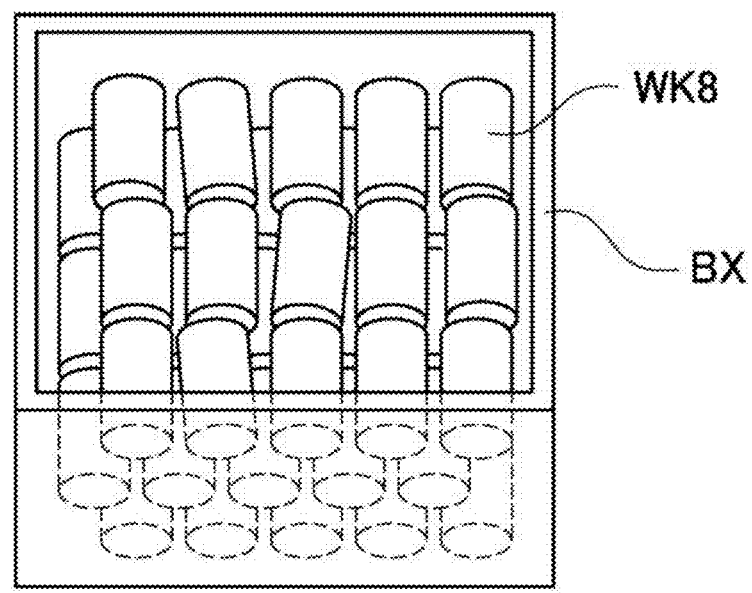
FIG. 36B is a perspective view illustrating a state in which workpieces are piled in layers in an accommodation container.
Figure 37:
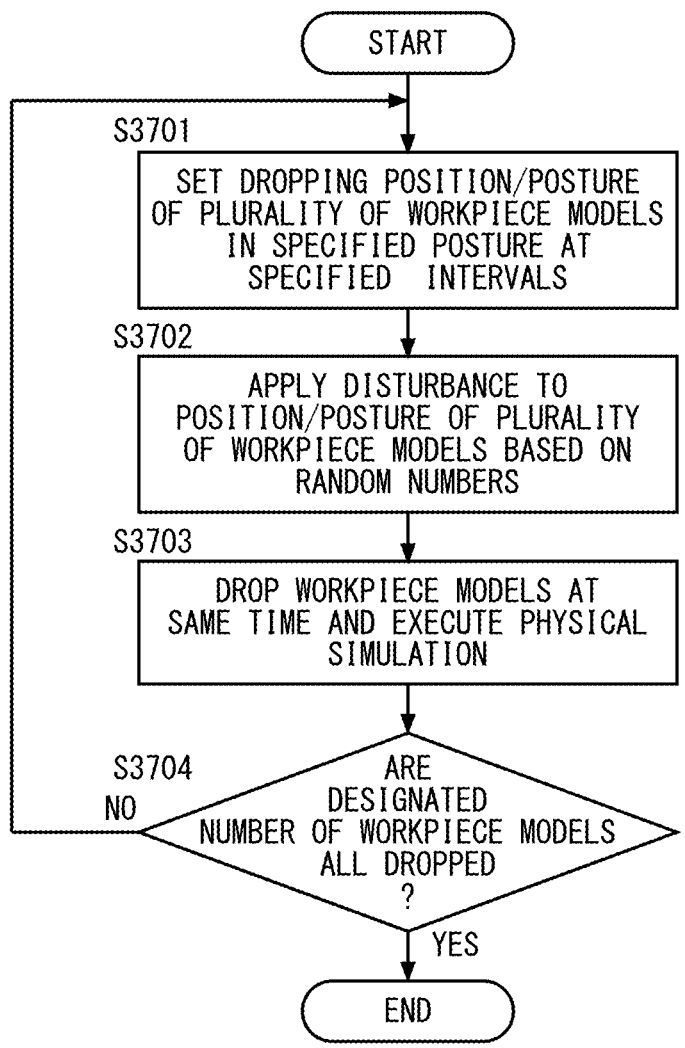
FIG. 37 is a flowchart illustrating a procedure of generating a bulk pile state by applying a restriction on positions and postures of the workpiece models according to Embodiment 9.

In the methods described above, an example in which the restriction is applied on only the posture of the workpiece model during the generation of the bulk pile data is described. However, the present invention is not limited to the example, and it is possible to apply the restriction on both of the posture and the position of the workpiece model. For example, a state in which plate-shaped workpieces WK7 are aligned and packed in an accommodation container is considered as illustrated in FIG. 36A, and a state in which cylindrical workpieces WK8 are piled in layers in an accommodation container is considered as illustrated in FIG. 36B. The workpieces in such a bulk pile state are not randomly present in the accommodation container but receive the restriction so as to be present in a substantially constant posture or position. Therefore, in a method of generating workpieces in a completely random manner as in the physical simulation of the related art, it is not possible to reproduce such a bulk pile state. Restrictions are applied on not only the posture but also the position of the workpiece as a condition of generating the bulk pile state such that it is possible to execute an accurate picking motion simulation even with respect to the workpiece in such a bulk pile state. Hereinafter, such a method is described as Embodiment 9 based on the flowchart in FIG. 37.

First, in Step S3701, dropping positions and postures of a plurality of workpiece models are set in a specified posture at a specified interval. Here, the disposition condition of the posture, the position, the interval, or the like which is allowed to the workpiece model is set by the posture condition setting unit. For example, examples of the disposition conditions include a posture of a workpiece model, the number of disposed workpiece models and disposition intervals in an X direction, the number of disposed workpiece models and disposition intervals in a Y direction, or the number of layers of the workpiece models. For example, in order to execute the physical simulation of a bulk pile state of the workpieces WK7 in FIG. 36A, as the disposition conditions, the number of disposed workpiece models in the X direction is set to eight, the number of disposed workpiece models in the Y direction is set to one, and the number of layers is set to one. In addition, in order to execute the physical simulation of a bulk pile state of the workpieces WK8 in FIG. 36B, for example, as the disposition conditions, the number of disposed workpiece models in the X direction is set to five, the number of disposed workpiece models in the Y direction is set to three, and the number of layers is set to three.

Next, in Step S3702, a disturbance is applied to the positions and the postures of the plurality of workpiece models based on random numbers. Further, in Step S3703, the workpiece models are dropped at the same time and the physical simulation is executed. As described above, it is possible to drop the workpiece models at the same time and to execute the physical simulation in a state in which the workpiece models are prepared in the specified posture in the designated dispositional positions. In particular, before the workpiece models are dropped, the disturbance is applied to the position and the posture based on random numbers, and thereby it is possible to generate data of a state that is different every time.

In Step S3704, it is determined whether or not the designated number of layers of workpiece models are all dropped. In a case where the designated number of layers of workpiece models are not all dropped, the procedure returns to Step S3701 and the process is repeatedly performed. In a case where it is determined that all of the workpiece models are dropped, the process is ended. As described above, it is possible to produce bulk pile data for a simulation of reproducing the state in which the workpieces are aligned and packed in the accommodation container or the bulk pile state in the layer stack state. In particular, in a state in which a plurality of workpiece models are disposed in the specified posture at the constant intervals, the workpiece models are dropped at the same time, and thereby it is possible to apply the restriction on both of the position and the posture of the workpiece models. As a result, it is possible to perform the time consuming work of adjustment or verification of the setting in advance in a state approximate to the state of the actual operation without actually preparing the workpieces. In particular, the setting is changed to be the optimal setting depending on a bulk pile formed by the workpieces which are targets and it is possible to customize setting in advance.

Setting Screen of Posture Conditions

Figure 38:
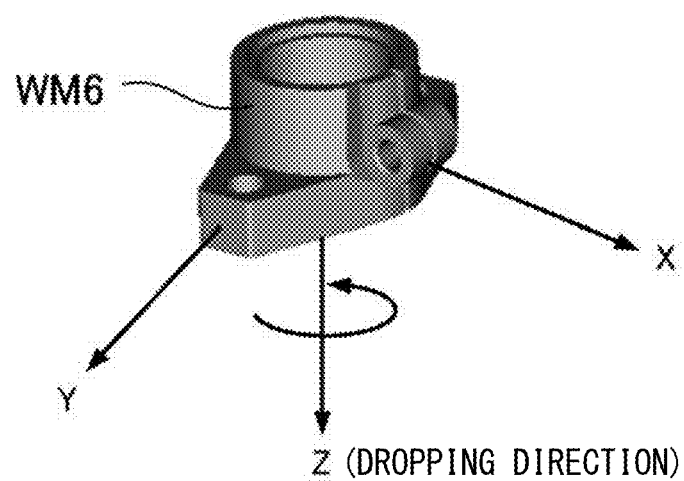
FIG. 38 is an image view illustrating an example of a basic posture setting screen of a workpiece model.
Figure 39:
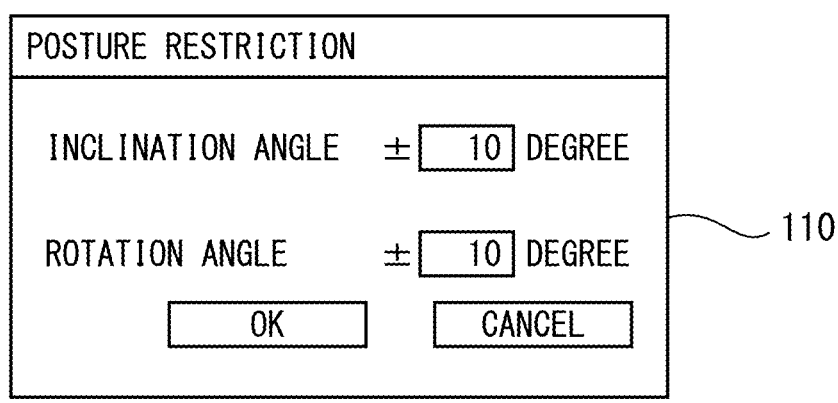
FIG. 39 is an image view illustrating an example of a posture condition setting screen.

Next, an example of a procedure of setting such posture conditions is described with reference to FIGS. 38 and 39. In the figures, FIG. 38 is an image view illustrating an example in which a basic posture of a workpiece model WM6 displayed on the display unit is defined on a user interface screen of a robot simulation program which is an aspect of the posture condition setting unit. FIG. 39 illustrates a posture condition setting screen 110 for setting the posture conditions.

Setting of Basic Posture

First, the basic posture during the dropping of the workpiece model is defined. For example, the posture of the workpiece model WM6 is adjusted with respect to a dropping direction on a basic posture setting screen illustrated in FIG. 38. In this example, a Z-axis direction is the dropping direction. For example, it is possible to drag the workpiece model WM6 on the screen and to freely change a drop posture.

Figure 40:
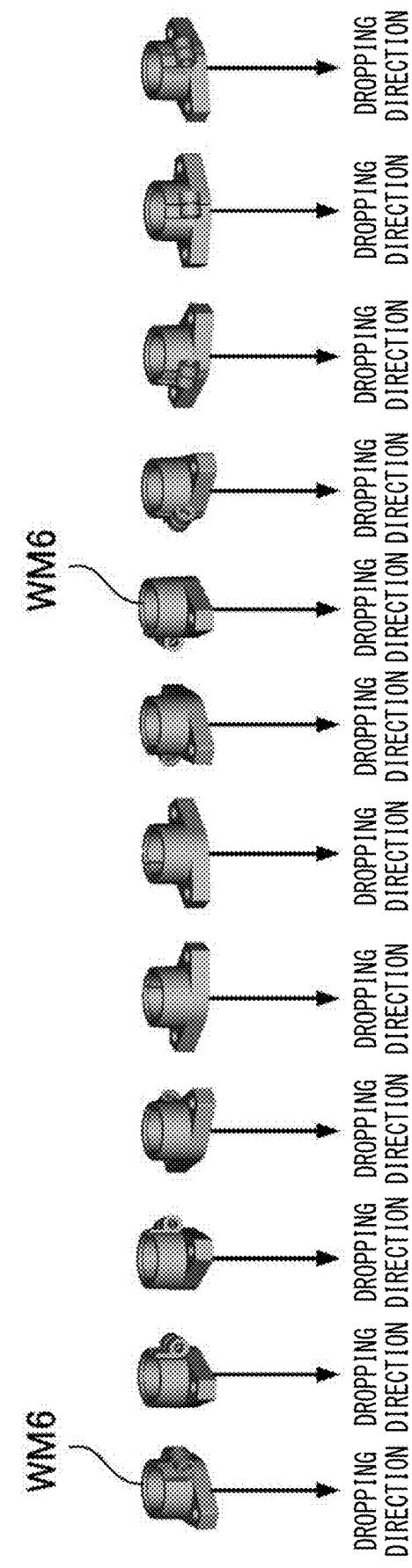
FIG. 40 is an image view illustrating an example of a posture of the workpiece model in a case where an inclination angle of the workpiece model is designated to 0° and a rotation angle thereof is designated to ±180°.
Figures 41, 42:
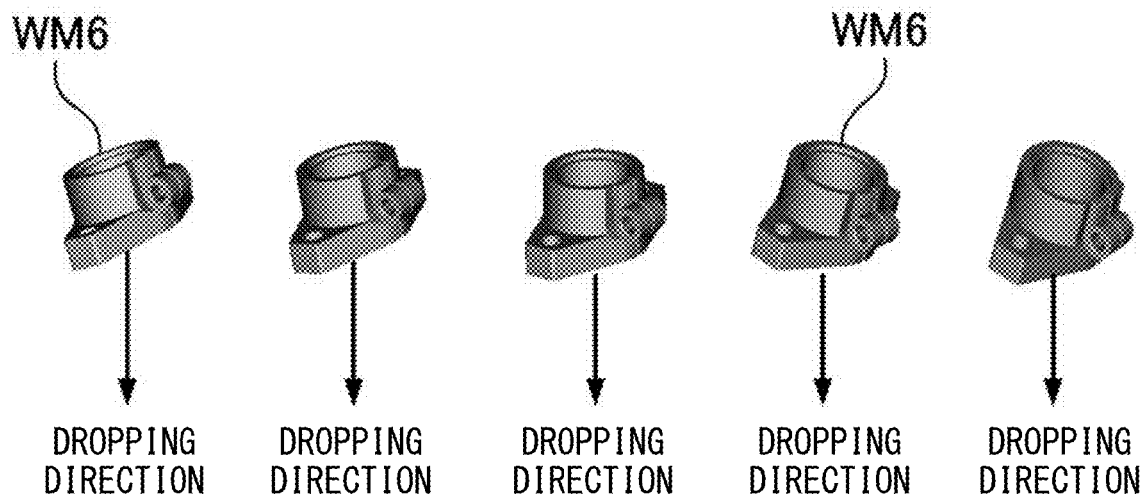
FIG. 41 is an image view illustrating an example of a posture of the workpiece model in a case where the inclination angle of the workpiece model is designated to 15° and the rotation angle thereof is designated to ±180°.
FIG. 42 is an image view illustrating an example of a disposition condition setting screen.

Next, an allowable angle is designated with respect to the state of the basic posture. In a designation method of an angle, two of an inclination angle with respect to an axis in the dropping direction and a rotation angle with respect to the axis in the dropping direction are designated in a range. For example, the inclination angle and the rotation angle are input as a numerical value on the posture condition setting screen 110 illustrated in FIG. 39. In this example, the range of the rotation angle is shown with ±; however, it may be possible to designate the lower limit value and the upper limit value separately from each other. For example, in a case where the inclination angle is designated to be 0° and the rotation angle is designated to be ±180°, the dropping is performed in a posture that is not inclined toward the dropping direction with respect to the basic posture as illustrated in FIG. 40. The rotation angle randomly changes with respect to the axis in the dropping direction. In addition, when the inclination angle is designated to be 15° and the rotation angle is designated to be 0°, the rotation angle does not change with respect to the axis in the dropping direction with respect to the basic posture as illustrated in FIG. 41; however, the workpiece models are dropped in a posture of which only the inclination angle receives the disturbance. In a case where both of the range of the inclination angle and the range of the rotation angle are not zero, the workpiece models are dropped in a posture of which the inclination angle and the rotation angle randomly change within the ranges thereof.

As described above, the ranges of the basic posture and the inclination angle and the rotation angle with respect to the basic posture are grouped as one set, and the ranges are set into a plurality of sets as necessary. For example, the bulk pile state in which only the front surface of the workpiece is viewed can be realized by setting only one set. On the other hand, a bulk pile in which side surfaces of a workpiece do not face the upper side and both surfaces of the front surface and the back surface face the upper side is defined as the bulk pile having two sets of a set that is "set in the basic posture of the state in which the front surface faces the upper side" and a set that is "set in the basic posture of the state in which the back surface faces the upper side", and which set is selected itself is randomly selected whenever the dropping is performed one time. In this manner, it is possible to realize a desired bulk pile state.

Disposition Condition Setting of Workpiece Model

Next, a method of setting the disposition conditions of the workpiece models described as Embodiment 9 will be described below. Examples of methods of setting not only the posture but also the position of the workpiece model include 1. A method of inputting the number of disposed workpiece models and disposition intervals in the X direction, the number of disposed workpiece models and disposition intervals in the Y direction, or the number of layers of the workpiece models, and 2. A method of selecting a disposition pattern at first and inputting disposition conditions required in response to the selection, and the like. First, the method of 1. is described. As another aspect of the posture condition setting unit, the number of disposed workpiece models and disposition intervals in the X direction, the number of disposed workpiece models and disposition intervals in the Y direction, or the number of layers of the workpiece models is individually input from a disposition condition setting screen 120 as illustrated in FIG. 42.

Disposition Pattern Selection

Figure 43A:
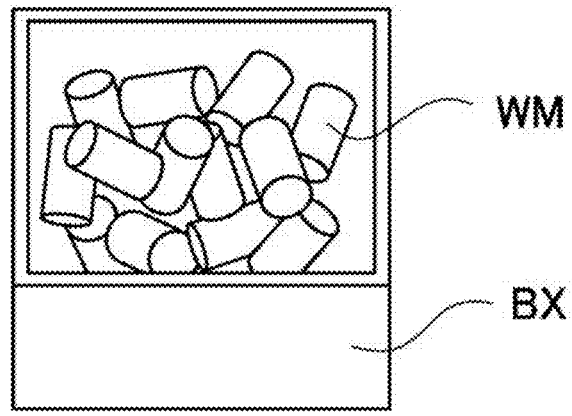
FIG. 43A is an image view illustrating an example in which workpiece models are completely randomly disposed in the accommodation container.
Figure 43B:
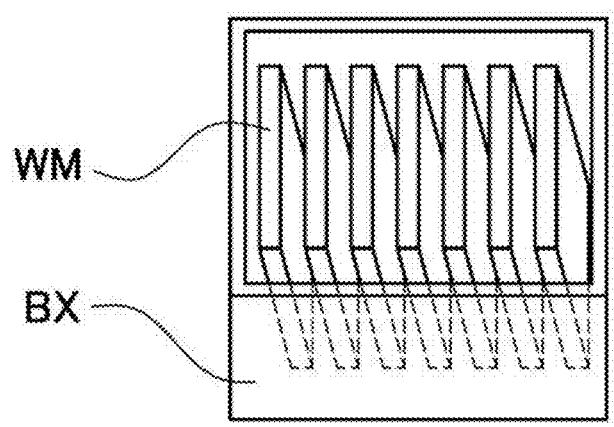
FIG. 43B is an image view illustrating an example in which workpiece models are disposed in one direction.
Figure 43C:
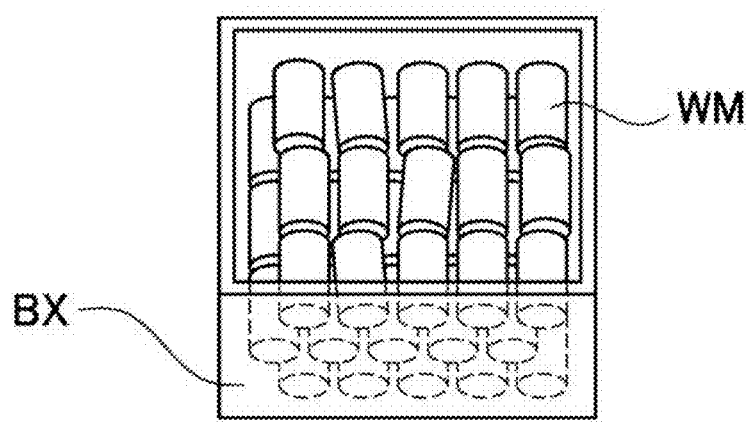
FIG. 43C is an image view illustrating an example in which workpiece models are arranged in a plurality of layers in a plurality of directions.

Next, the method of 2. will be described. In the method, first, the disposition pattern of the workpiece models is selected by the user, and, second, parameters required in response to the selection are input. For example, as a disposition pattern selecting screen of the workpiece models, as illustrated in FIGS. 43A, 43B, and 43C, three patterns of a case where the workpiece models are completely random in the accommodation container, a case where the workpiece models are disposed in one direction, and a case where the workpiece models are arranged in a plurality of layers in a plurality of directions are all displayed on the display unit. The display may be a list display or may be a display performed by switching the plurality of screens. When the user selects any disposition pattern, the disposition condition setting screen for setting parameters of detailed disposition conditions is displayed. For example, in a case where any completely random disposition pattern in FIG. 43A is selected, only the number of bulk piles is input as the disposition conditions. In addition, in a case where the disposition pattern of disposing in one direction in FIG. 43B is selected, all of the number of disposed workpiece models, the disposition direction (X or Y), or the disposition interval, are individually input. Otherwise, in a case where the disposition pattern of arranging in the plurality of layers in the plurality of directions in FIG. 43C is selected, the number of disposed workpiece models and disposition intervals in the X direction, the number of disposed workpiece models and disposition intervals in the Y direction, or the number of layers of the workpiece models in the Z direction is individually input. As described above, the user can sequentially perform necessary setting in accordance with a guidance displayed on the display unit.

Posture Stability Parameter Determining Unit 17

As described above, the user sets the posture conditions of allowed posture or the like of the workpiece model in advance and excludes the workpiece model that is not in conformity with the condition, and thereby it is possible for the workpiece model having the unnatural posture or unstable posture not to be included in the bulk pile data. However, the present invention may employ a configuration such that it is possible to determine whether or not the workpiece models are disposed in a stable posture and an unstable posture of the workpiece model is automatically detected. For example, when the workpiece model in an unstable posture is detected, the workpiece model is automatically excluded from the bulk pile data in the configuration. In this manner, it is possible to obtain the bulk pile data in a state approximate to the actual operation environment similarly and to expect that the accuracy of the picking motion simulation is increased. In addition, in this case, the workpiece models having poor posture stability are displayed on the display unit as candidates of the workpiece models as exclusion target such that the user is urged to exclude the workpiece models, or it is possible to provide the user with a guideline of selecting a workpiece model having such posture stability. Further, even when the user does not manually set the posture condition or the like, the robot simulation apparatus is capable of automatically excluding the workpiece model in the unnatural posture or unstable posture and executing the picking motion simulation in a state in which appropriate conditions are set. Thus, it is advantageous in respect of convenience of the user.

The posture stability parameter determining unit is capable of calculating such posture stability. For example, as illustrated in FIG. 12, the posture stability parameter determining unit 17 can be included in the posture condition setting unit 16. For example, when the posture condition setting unit 16 sets the posture condition, it is possible to provide the user with a favorable numerical value range, based on the posture stability calculated by the posture stability parameter determining unit 17. The user can set an angle in the posture range as the posture condition or can perform fine adjustment, with reference to provided numerical values. In addition, the posture stability parameter determining unit may be provided as a separate member, and there is no need to be incorporated in the posture condition setting unit.

Further, the posture stability parameter is defined in advance by the robot simulation apparatus, and a configuration in which the workpiece model having low posture stability is automatically excluded depending on the posture stability parameter as a preset value may be employed. In this case, there is no need for the user to set the posture condition including the posture stability parameter. As described above, an aspect in which the user does not set the posture condition is also included in the present invention. In other words, the posture condition setting unit 16 does not have to employ a configuration in which the setting of the posture condition is necessarily allowed by the user, and the setting of the posture conditions by the posture condition setting unit 16 means to include the designation by the user, and also the setting due to a preset value.

Method of Calculating Posture Stability

Figure 44:
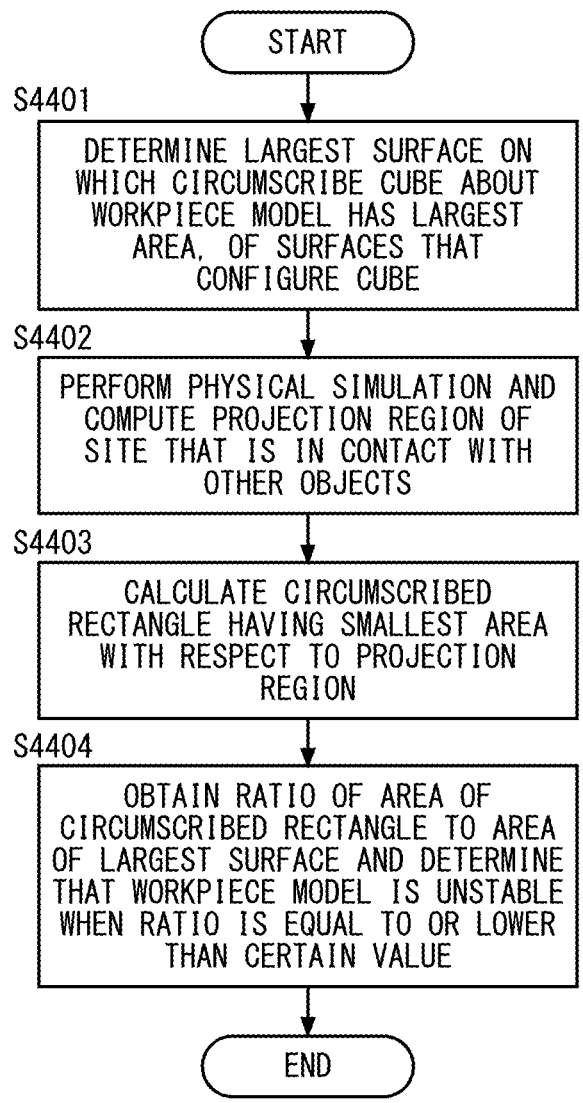
FIG. 44 is a flowchart illustrating a method for computing posture stability.
Figure 45A:
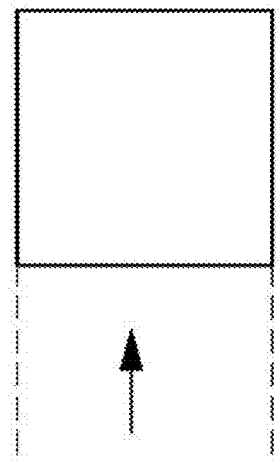
FIG. 45A is a perspective view illustrating a T-shaped workpiece.
Figure 45B:
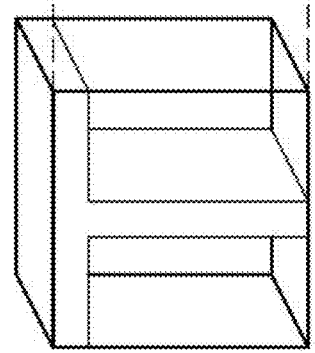
FIG. 45B is a perspective view illustrating a state of setting a circumscribed cube with respect to FIG. 45A.
Figure 45C:
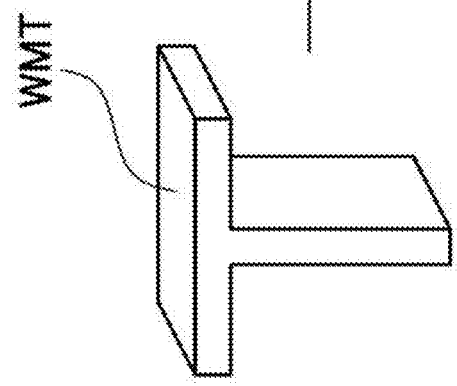
FIG. 45C is a plan view illustrating a surface having the largest area of FIG. 45B.

Here, a method of calculating the posture stability is described based on the flowchart in FIG. 44. Here, an example of the T-shaped workpiece model WMT illustrated in FIG. 30 is described. First, in Step S4401, a circumscribed cube about the shape of the workpiece model WMT is obtained. For example, when the circumscribed cube about the workpiece model WMT illustrated in FIG. 45A is obtained, the cube has the shape illustrated in FIG. 45B. Next, a surface having the largest area of six surfaces that configure the circumscribed cube is obtained. For example, in the example in FIG. 45B, the side surface as illustrated in FIG. 45C is set as the largest area.

Figure 46A:
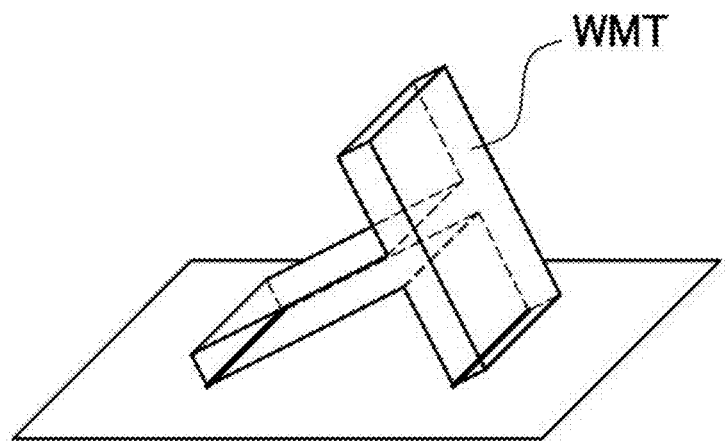
FIG. 46A is a perspective view illustrating a state in which the workpiece in FIG. 45A is placed in an inclined posture.
Figure 46B:
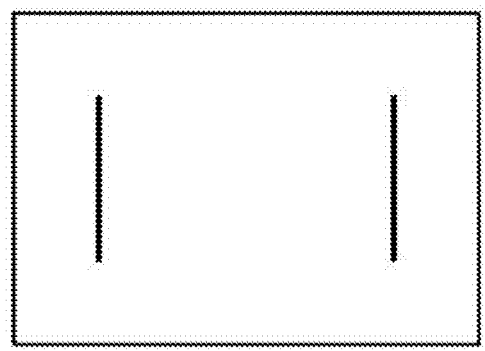
FIG. 46B is a plan view illustrating regions of contact portions in FIG. 46A.

Next, in Step S4402, the physical simulation is performed with respect to the workpiece model WMT, and a region formed by projecting a portion of the workpiece model WMT, which is in contact with another object, from directly above is obtained. For example, as a result of the physical simulation, in a case where the workpiece model WMT in FIG. 45A is placed in the virtual work space in a fallen posture as illustrated in FIG. 46A, a projection region of a portion of the workpiece model WMT which is in contact with the floor of the virtual work space is formed as illustrated in FIG. 46B, when the region is viewed from directly above.

Figure 47A:
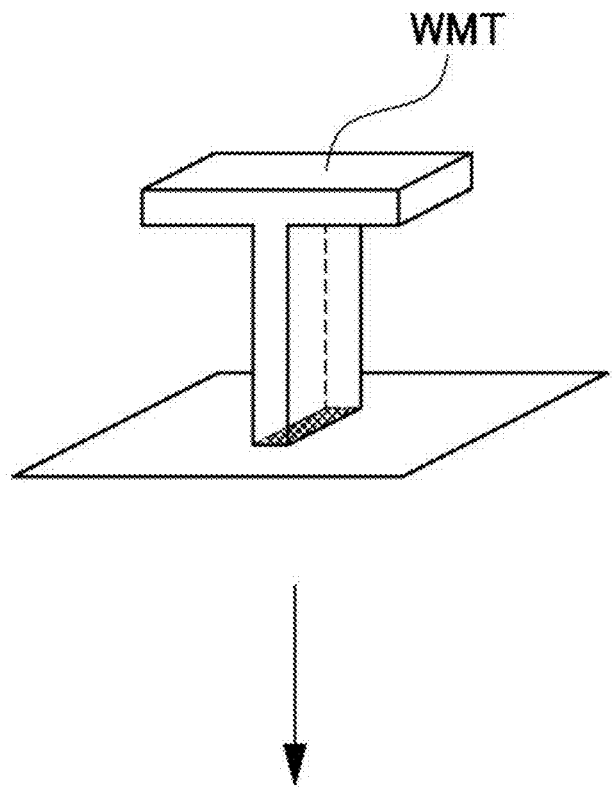
FIG. 47A is a perspective view illustrating a state in which the workpiece in FIG. 45A is placed in an upright posture.
Figure 47B:
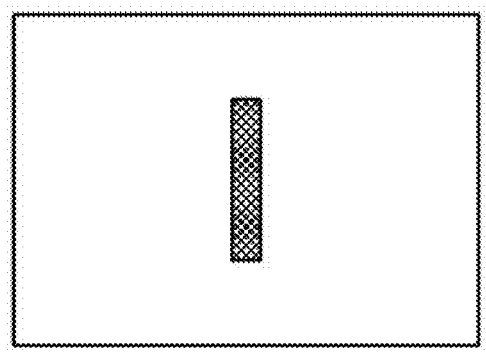
FIG. 47B is a plan view illustrating a region of a contact portion in FIG. 47A.

In addition, as a result of the physical simulation, in a case where the workpiece model WMT in FIG. 45A is placed in the virtual work space in an upright posture as illustrated in FIG. 47A, a projection region of a portion of the workpiece model WMT which is in contact with the floor of the virtual work space is formed as illustrated in FIG. 47B.

Figure 48A:
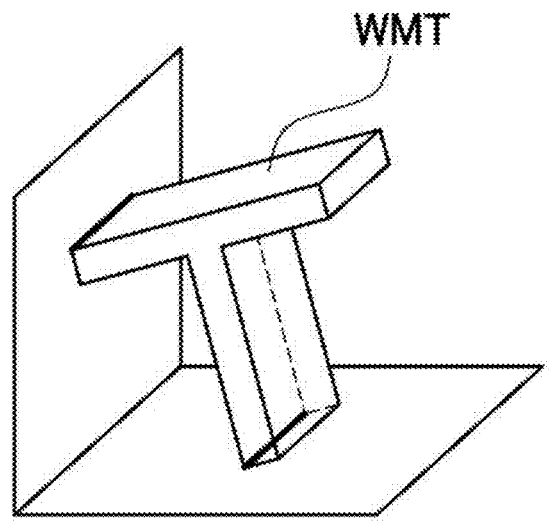
FIG. 48A is a perspective view illustrating a state in which the workpiece in FIG. 45A is placed in a posture leaning against a wall surface.
Figure 48A:
Figure 48B:
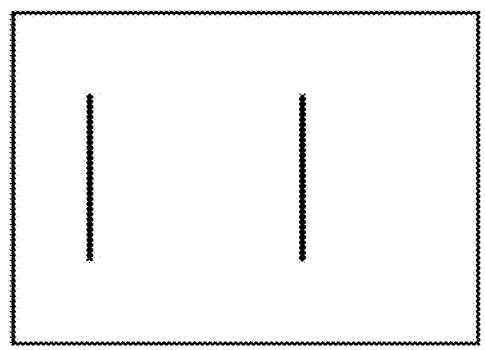
FIG. 48B is a plan view illustrating regions of contact portions in FIG. 48A.

Alternatively, as a result of the physical simulation, in a case where the workpiece model WMT in FIG. 45A is placed in a posture of leaning against a wall surface of the accommodation container as illustrated in FIG. 48A, a projection region of a portion of the workpiece model WMT which is in contact with the floor of the virtual work space is formed as illustrated in FIG. 48B.

Figure 49A:
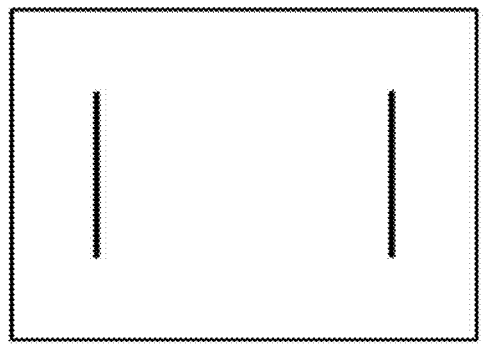
FIG. 49A is a plan view of FIG. 46B.
Figure 49A:
Figure 49B:
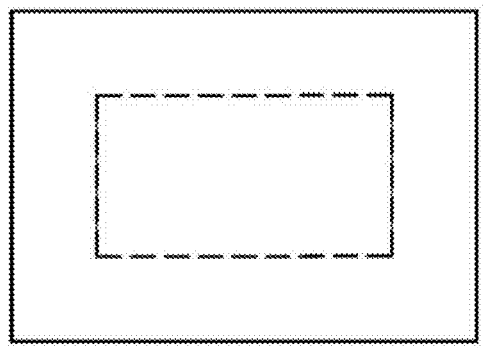
FIG. 49B is a plan view illustrating a state of obtaining a circumscribed rectangle having the smallest area from FIG. 49A.
Figure 50A:
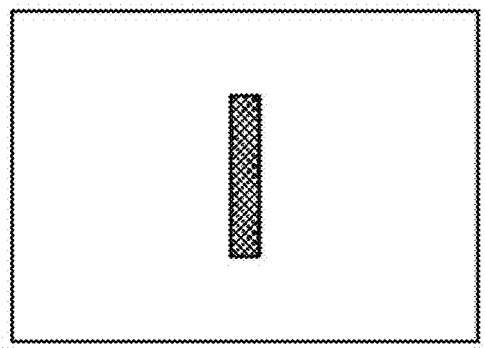
FIG. 50A is a plan view of FIG. 47B.
Figure 50A:
Figure 50B:
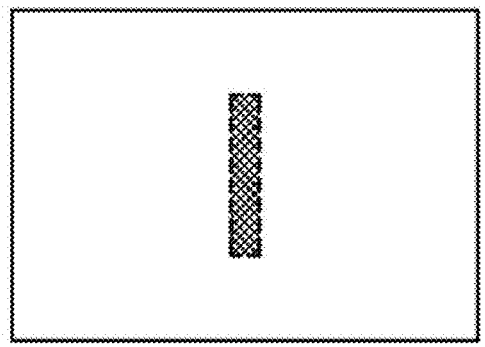
FIG. 50B is a plan view illustrating a state of obtaining a circumscribed rectangle having the smallest area from FIG. 50A.
Figure 51A:
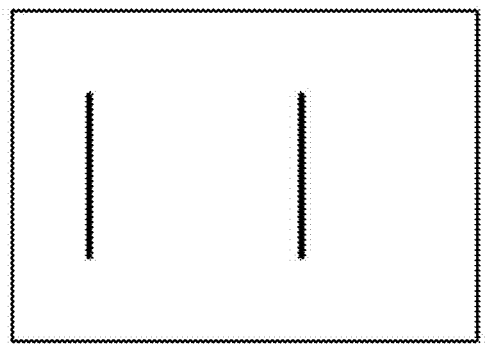
FIG. 51A is a plan view of FIG. 48B.
Figure 51A:
Figure 51B:
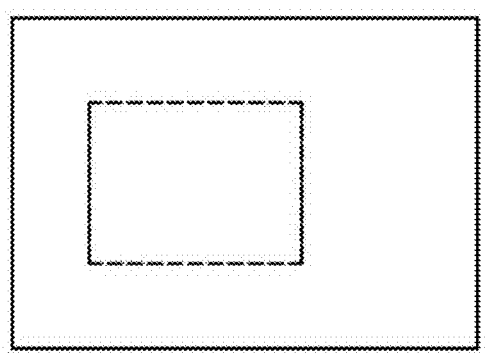
FIG. 51B is a plan view illustrating a state of obtaining a circumscribed rectangle having the smallest area from FIG. 51A.

In Step S4403, a circumscribed rectangle having the smallest area about the obtained projection region as described above is obtained. For example, the circumscribed rectangle having the smallest area about the projection region illustrated in FIG. 49A is formed as illustrated in FIG. 49B. In addition, the circumscribed rectangle having the smallest area about the projection region illustrated in FIG. 50A is formed as illustrated in FIG. 50B. Further, the circumscribed rectangle having the smallest area about the projection region illustrated in FIG. 51A is formed as illustrated in FIG. 51B.

Finally, in Step S4404, a ratio of the area of the circumscribed rectangle obtained in Step S4403 to an area of the largest surface obtained in Step S4401 is obtained, the ratio indicates the posture stability, and a posture having the ratio equal to or lower than a certain value is determined as the unstable posture. For example, in a case of FIGS. 46B and 49B, the ratio is obtained in a relationship of (area of circumscribed rectangle having smallest area÷largest area)=28/49≅about 57%. In addition, in a case of FIGS. 47B and 50B, the ratio is obtained in a relationship of (area of circumscribed rectangle having smallest area÷largest area)=4/49≅about 8%. Further, in a case of FIGS. 48B and 51B, the ratio is obtained in a relationship of (area of circumscribed rectangle having smallest area÷largest area)=20/49≅about 41%. From the results, it is possible to exclude the workpiece model WMT as an unstable workpiece model, because the workpiece model has the upright posture in FIG. 47A having low posture stability. Here, a threshold used for determining the unstable posture is set as a fixed value or may be adjusted by a user as necessary.

Embodiment 10

Figure 52:
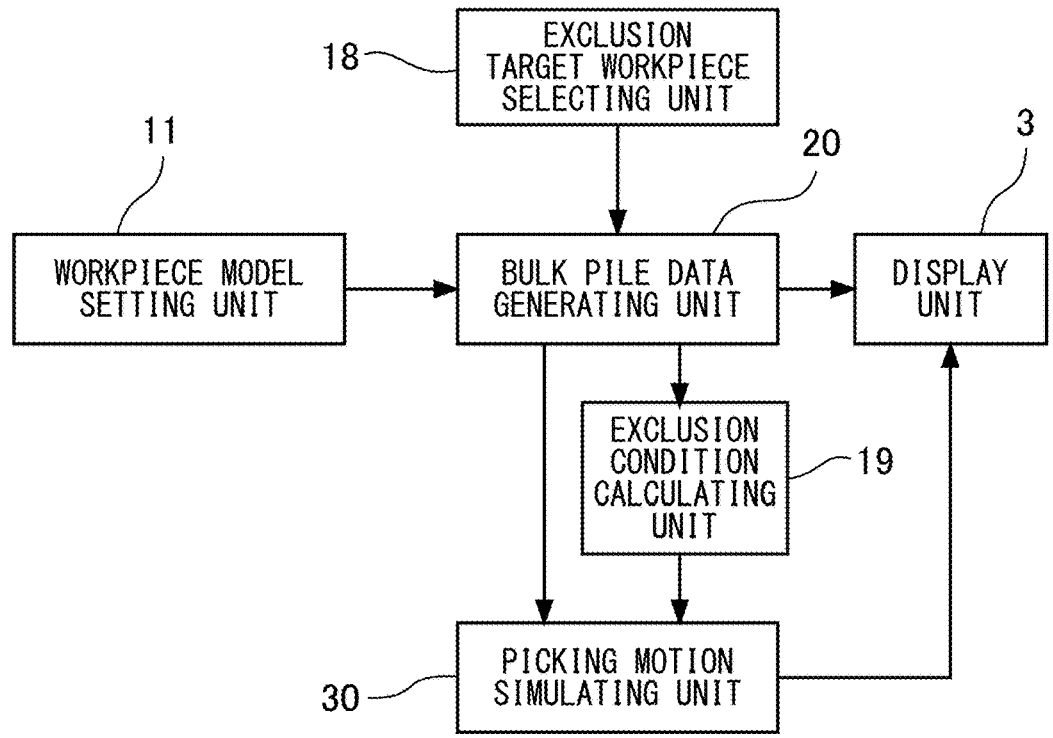
FIG. 52 is a block diagram illustrating a robot simulation apparatus according to Embodiment 10.

In the examples described above, the user sets the allowed posture or the like of the workpiece model in advance and sets a configuration in which the workpiece model that is not in conformity with the condition is excluded, that is, sets an exclusion condition for excluding the workpiece model from the bulk pile data in advance. In this manner, an example, in which the unnatural workpiece model is not included in the bulk pile data such that the accuracy or the reproducibility of the picking motion simulation is improved, is described. Here, the user applies the restriction on the posture and position of the workpiece model by using the posture condition setting unit, and thereby customized bulk pile data is generated. However, in the present invention, it is not absolutely necessary for the user to manually set the exclusion condition for excluding the workpiece model from the bulk pile data, and a configuration, in which the condition for excluding the workpiece model is automatically set, may be employed. Such an example as a robot simulation apparatus according to Embodiment 10 is illustrated in the block diagram in FIG. 52. The robot simulation apparatus illustrated in FIG. 52 includes the workpiece model setting unit 11, the bulk pile data generating unit 20, the display unit 3, an exclusion-target workpiece selecting unit 18, an exclusion condition calculating unit 19, and the picking motion simulating unit 30. In Embodiment 10, the same reference signs are assigned to the same members as those in Embodiment 1 described above, and the detailed description thereof is appropriately omitted.

The exclusion-target workpiece selecting unit 18 is a member that enables the user to select the workpiece model that the user wants to exclude from the picking motion simulation, among the workpiece models that configure the bulk pile data displayed on the display unit 3.

The exclusion condition calculating unit is a member that automatically calculates exclusion conditions for excluding a workpiece model which is an exclusion target selected by the exclusion-target workpiece selecting unit.

In this manner, a configuration in which the condition for excluding the workpiece model is automatically calculated from the position or posture of the workpiece model designated to be excluded such that the workpiece model in conformity with the exclusion condition is excluded from the bulk pile data, without the condition for excluding the workpiece model having an unnatural posture manually set by the user, can be employed. As a result, it is possible for the user to save time and effort to set the exclusion condition of the workpiece in detail. In addition, the user selects some workpiece models that the user wants to exclude, and thereby the exclusion condition is automatically calculated and another workpiece model to be excluded is automatically selected. In this respect, the convenience improves.

Embodiment 11

Figure 53:
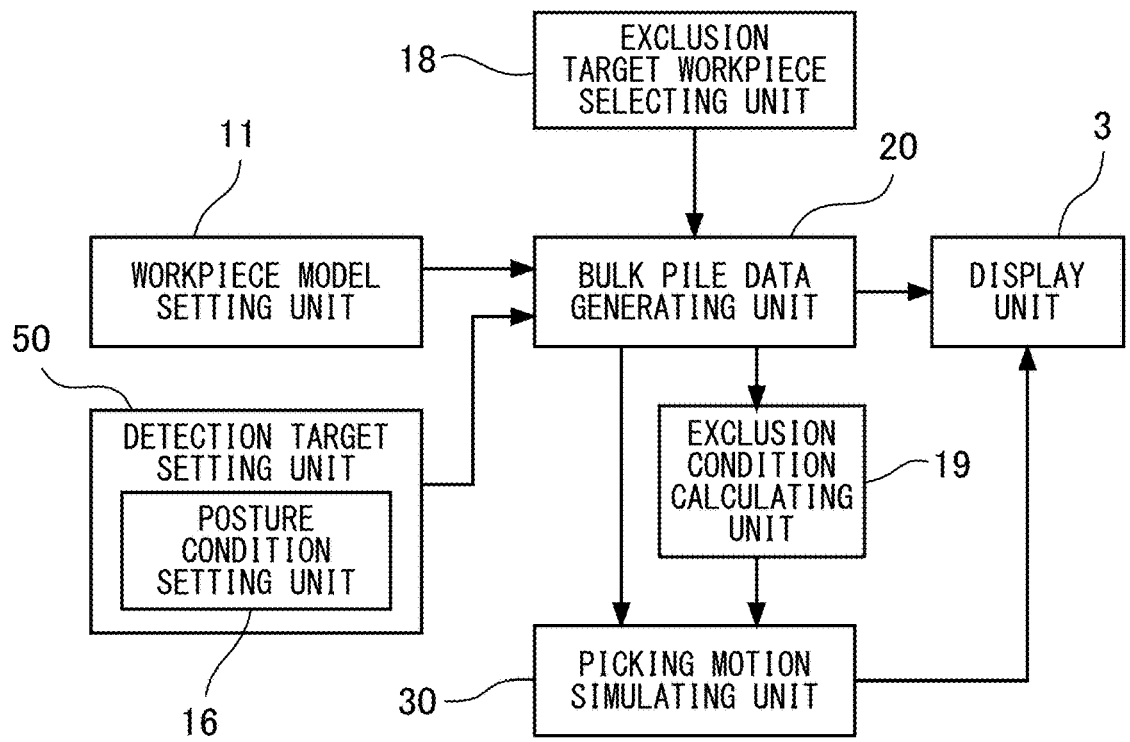
FIG. 53 is a block diagram illustrating a robot simulation apparatus according to Embodiment 11.

In addition, it is possible for the user to manually set the exclusion condition for excluding the workpiece model, and to also use automatic calculation of the exclusion condition by the robot simulation apparatus. Such an example as a robot simulation apparatus according to Embodiment 11 is illustrated in the block diagram in FIG. 53. The robot simulation apparatus illustrated in FIG. 53 includes the workpiece model setting unit 11, the detection target setting unit 50, the bulk pile data generating unit 20, the display unit 3, the exclusion-target workpiece selecting unit 18, the exclusion condition calculating unit 19, and the picking motion simulating unit 30. The detection target setting unit 50 includes the posture condition setting unit 16. Also in Embodiment 11, the same reference signs are assigned to the same members as those in Embodiment 1 described above, and the detailed description thereof is appropriately omitted. As described above, while the user manually sets the exclusion condition of the workpiece model, the robot simulation apparatus also automatically calculates the exclusion condition. Modification of the exclusion condition or a preferable angle range is proposed as necessary, and thus it is possible to support setting work of the exclusion condition such as the posture condition performed by the user.

The method of restricting the posture of the workpiece model is not limited to the method in FIG. 38 or the like described above, and it is also possible to appropriately employ another method. For example, in a case where the posture of the workpiece model is described with a ZYX Euler angle, it is possible to restrict the posture within the defined range with respect to an angle Rx with respect to an X axis, an angle Ry with respect to a Y axis, and an angle Rz with respect to a Z axis. In addition, a configuration in which the restriction is performed such that the posture is included within the defined range with respect to each of a first rotation angle R1 with respect to the Z axis, a second rotation angle R2 with respect to the Y axis, and a third rotation angle R3 with respect to the Z axis.

Figure 54:
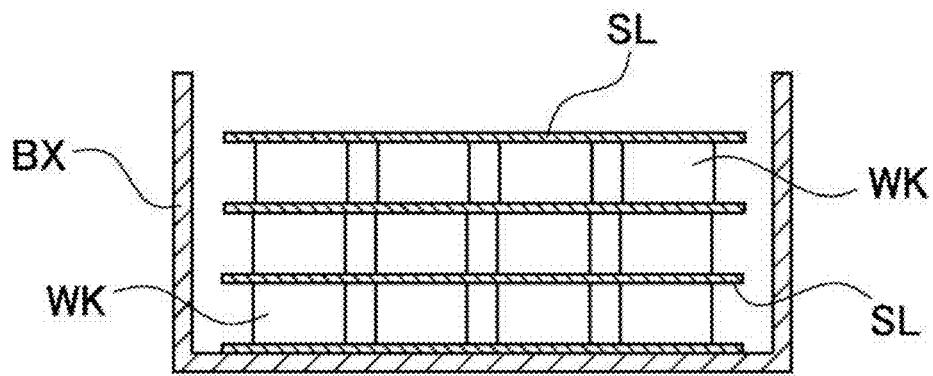
FIG. 54 is a schematic sectional view illustrating an example in which workpieces are arranged in a plurality of layers via liners in the accommodation container.
Figure 55:
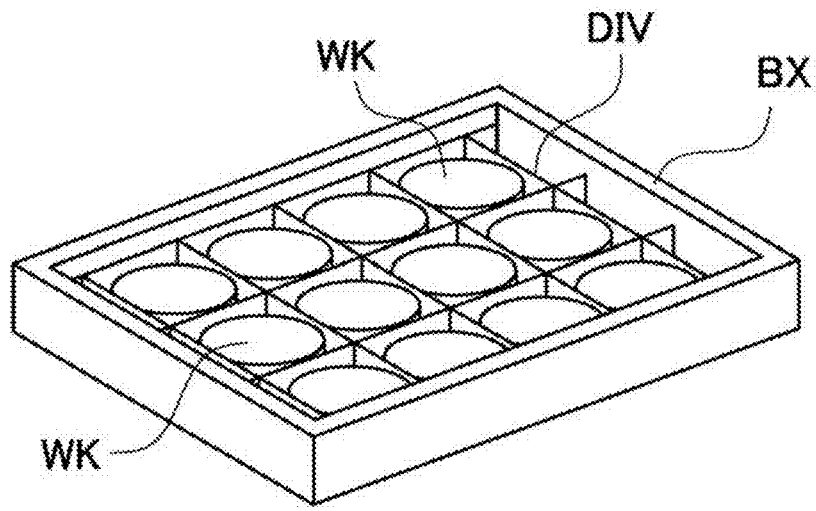
FIG. 55 is a schematic perspective view illustrating an example in which workpieces are arranged via partitions in the accommodation container.

Further, in an aspect in which the workpieces are piled in layers and are accommodated in the accommodation container, there are liners as illustrated in FIG. 54 or partitions as illustrated in FIG. 55 in some cases. In such a case, the physical simulation is executed by allowing data obtained by forming a model of the liner or the partition to intervene between the layers, and thereby it is possible to generate a layer stack state in consideration of such a liner or a partition. It is also possible to form a model of the liner or the partition with the CAD data or the like. In addition, it is also possible to perform the picking motion simulation of a case of picking the liner or the partition by a robot. In this case, the liner or the partition is excluded in the case of the suction type end effector, or it is possible to provide an opening, a slit, or the like in a part of the liner or the partition in advance such that it is easy for a grasping type or inserting type end effector to performing the grasping.

Change in Remaining Workpiece Model Group by Picking up One Workpiece Model

Figure 56:
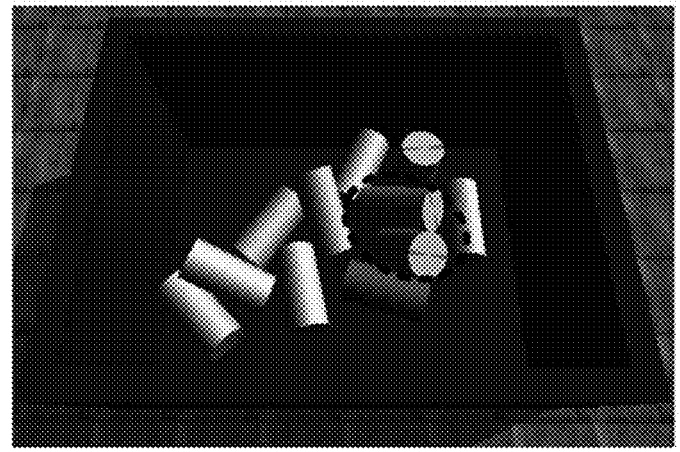
FIG. 56 is an image view illustrating a bulk-piled workpiece model group.

Here, a change in a workpiece model group after one workpiece model is picked up from the workpiece model group is described in detail. In the related art, any one of the workpiece models piled in a bulk is determined to be graspable by the end effector model, and a state of the bulk-piled workpiece model group during the picking-up or after the picking-up is not considered in a case where the picking-up is performed through the picking motion simulation. For example, the workpiece models surrounded in a dashed-line circle are supported by a hatched workpiece model present at a lower position below the workpiece models in the bulk-piled workpiece model group illustrated in FIG. 56. Therefore, when the hatched workpiece model is removed, the workpiece models are to fall to the floor naturally.

Figure 57:
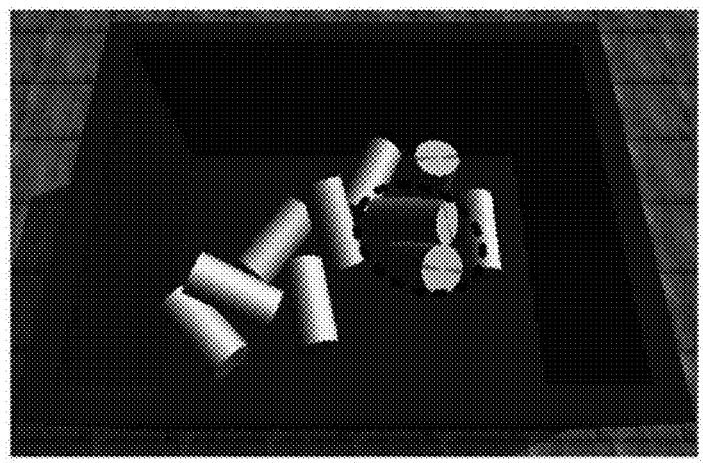
FIG. 57 is an image view illustrating a state in which a hatched workpiece model in FIG. 56 is removed.

However, in the physical simulation in the related art, even when the hatched workpiece model is absent, there is no change in position or posture of the other workpiece models as illustrated in FIG. 57. This is considered to occur because the operation of the physical simulation itself is a heavy process, thus, the execution performed only one time is considered to be sufficient, and re-execution is not considered at all. However, it is not possible to stop in a posture floating in the air without a support in the real world unlike the workpiece models surrounded in the dashed line in FIG. 57. Even when the picking motion simulation is performed in such a state, the position or posture thereof does not match the position or posture of the workpiece in the real world. In addition, even when the picking motion simulation is successful, a problem arises in the reproducibility or accuracy of the picking motion simulation such as failure during the actual operation. In addition, when not only the workpiece positioned on a lower side of the workpiece but also the workpiece that is in contact with the periphery is picked up, there is an influence on the vicinity of the workpiece model, and the position of the workpiece model is considered to be changed due to losing of a balance or the like. In the related art, the change in the remaining workpiece group due to the picking-up of the workpiece is not considered; however, the present inventors found that the change influences the accuracy of the picking motion simulation.

Figure 58:
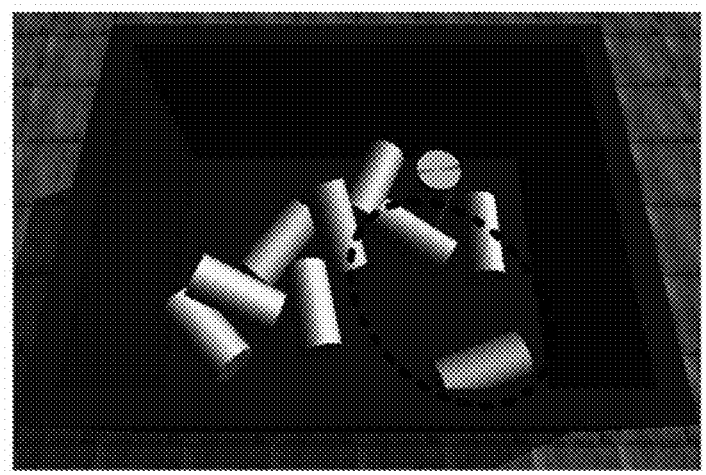
FIG. 58 is an image view illustrating a result obtained by re-executing the physical simulation in a state in which hatched workpiece models in FIG. 56 are removed.

As a result of picking-up of the workpiece, an occurrence of a change in position or posture of the remaining workpiece group is also presumed, and thereby the present invention is made so as to realize the picking motion simulation with high accuracy with which a state more approximate to the bulk pile state of the workpieces during the actual operation is achieved. Specifically, the physical simulation is allowed to be re-executed. As a result, after the workpiece models at positions like the workpiece models surrounded in a dashed-line circle illustrated in FIG. 58 are removed, it is possible to reproduce an example in which a state in which the workpiece model group receives the influence of the gravity is changed. Therefore, it is also possible to execute the picking motion simulation in a state approximate to the actual operation based on the reception of the influence of the gravity.

Range of Re-execution of Physical Simulation

For example, the range of the re-execution of the physical simulation can be set in a configuration for the re-execution, with respect to all of the remaining workpiece models included in the bulk pile data after one workpiece model is picked up by the picking motion simulating unit. Otherwise, a configuration in which, after one workpiece model is picked up, the physical simulation is re-executed with respect to the workpiece models present on the periphery of the picked-up workpiece model among the remaining workpiece models included in the bulk pile data may be employed. Alternatively, a configuration in which, after one workpiece model is picked up, the physical simulation is re-executed with respect to the workpiece models that are in contact with the picked-up workpiece model or the workpiece models interfering with a robot or a workpiece model grasped by the robot in the process of the picking-up, among the remaining workpiece models included in the bulk pile data may be employed.

Timing for Re-executing Physical Simulation

In addition, timing for re-executing the physical simulation is typically timing for picking up the workpiece model during the picking motion simulation. In other words, the timing is timing for reducing the number of workpiece models by one as in Step S2509 in FIG. 25. For example, it is possible to employ a configuration in which the physical simulation is re-executed whenever one workpiece model is picked up in the picking motion simulation. However, timing for re-executing the physical simulation is not limited to the timing for picking up the workpiece model. For example, a configuration in which the physical simulation is re-executed at a predetermined frequency at timing during the execution of the picking motion simulation may be employed. Otherwise, it may be determined whether or not the physical simulation is re-executed whenever the workpiece model is picked up. In this case, the physical simulation is not re-executed in a case where it is determined that there is no need to perform the execution.

Further, when one workpiece model is picked up, it may be determined that there is no need to re-execute the physical simulation in a case where workpiece models which are in contact with the picked-up workpiece model are not present.

Display User Interface

Further, on the display unit, updated bulk pile data is updated in real time such that it is possible to visually show the user a state of a change in the bulk pile data. In particular, by increasing an update frequency of the content of display on the display unit, it is possible to display, as a moving image, the bulk pile data, that is, an example of movement or collapse of the bulk-piled workpiece model group due to the picking-up of the workpiece model, or the like, and thus it is possible to provide a display mode by which it is easy for the user to understand visually.

Procedure of Reducing Number of Workpiece Models by One

Figure 59:
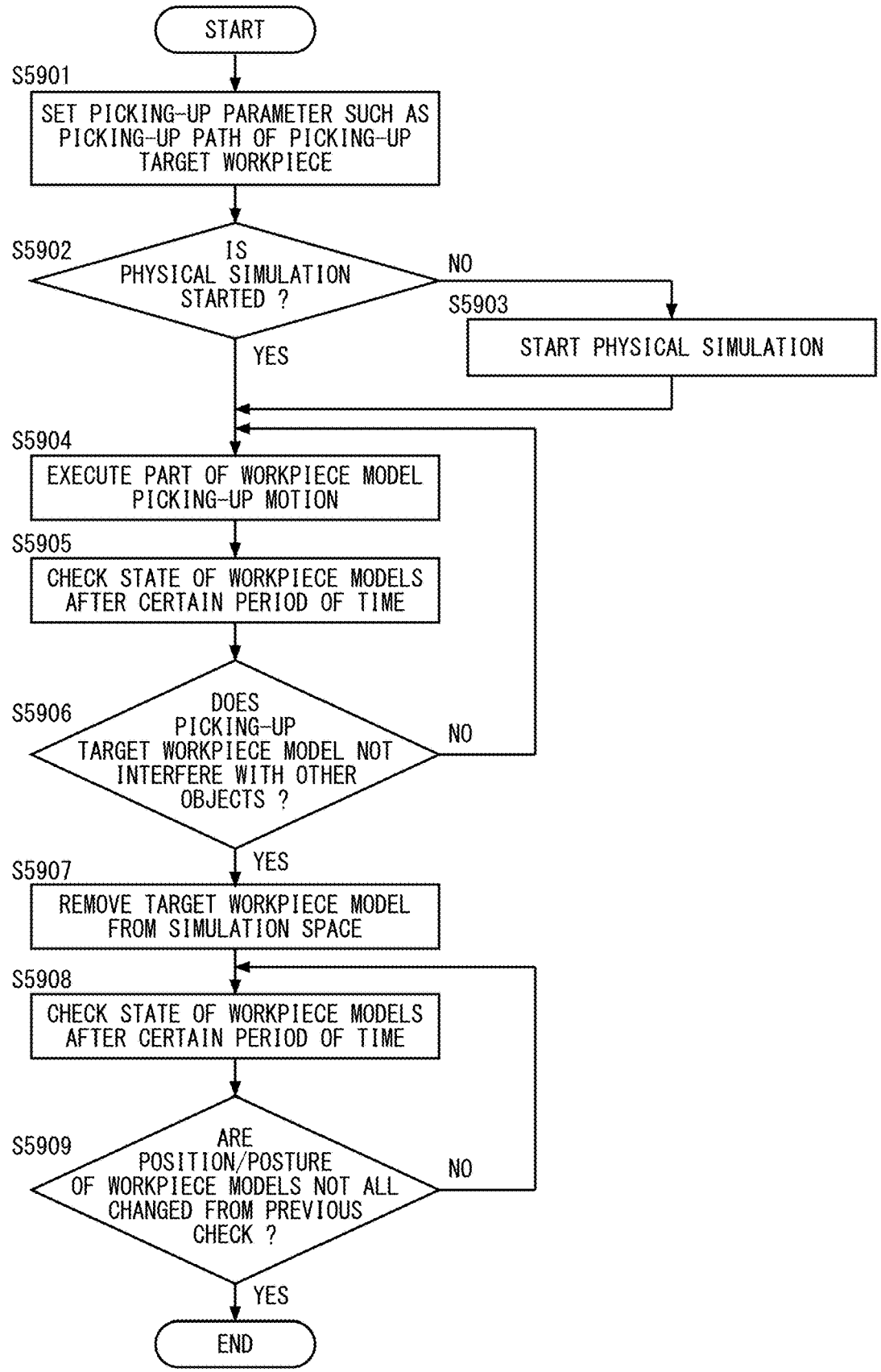
FIG. 59 is a flowchart illustrating details of a procedure of reducing the number of workpiece model one time in the picking motion simulation.

Here, in Step S2509 in FIG. 25 above, a procedure of reducing the number of workpiece models by one is described in detail based on the flowchart in FIG. 59.

First, in Step S5901, picking-up parameters such as a picking-up path or the like of the workpiece model which is a picking-up target by the picking motion are set. Examples of the picking-up parameters include a workpiece, a position at which grasping is performed, a direction or a speed of the picking-up, characteristics of the workpiece (for example, a coefficient of restitution), and the like.

Next, in Step S5902, it is determined whether or not the physical simulation unit operates. In a case where the physical simulation unit operates, the procedure proceeds to Step S5904, and the physical simulation unit operates. On the other hand, in a case where the physical simulation unit does not operate, the procedure proceeds to Step S5903. After the physical simulation unit is made to operate, the procedure proceeds to Step S5904.

In Step S5904, a picking-up motion of the workpiece model is executed. In this stage, it may be determined whether or not the physical simulation is re-executed, depending on the state of the workpiece model. For example, as described above, the user is urged to select whether or not the physical simulation is re-executed on the user interface screen of the display unit. Otherwise, in a case where the workpiece model to be picked up is not in contact with the other workpiece models, the physical simulation is determined not to be re-executed.

In a case where the physical simulation is re-executed, such as the re-execution of the physical simulation is designated by the user, the states of the workpiece models are checked after a certain period of time in Step S5905. In other words, in a case where the workpiece model is picked up and any movement such as collapsing, sliding, or tilting of the other workpiece models occurs, a static state is displayed after waiting until the movement is ended to become the static state. Movement of the workpiece model group is displayed on the display unit in real time, or the movement may be performed internally in the robot simulation apparatus in a non-display manner. In this case, since a state obtained after the physical simulation is generated through calculation, it is not absolutely necessary to physically measure the elapse of a certain period of time.

Next, in Step S5906, it is determined whether or not the workpiece model as the picking-up target does not interfere with another workpiece model. In a case where there is interference with the other workpiece model, the procedure returns to Step S5904 and the process is repeatedly performed. In a case where there is no interference with the other workpiece model, the procedure proceeds to Step S5907. The workpiece model which is the picking-up target is picked up and is removed from the virtual work space.

Further, in Step S5908, the states of the workpiece models are checked after a certain period of time. Then, the procedure proceeds to Step S5909, and it is determined whether or not the positions and the postures of all of the workpiece models are changed after the time of the previous checking. In a case where a change occurs, the procedure returns to Step S5908 and the process is repeatedly performed. In a case where no change occurs, the process is ended. As described above, in the picking motion simulation, the physical simulation is re-executed at a necessary timing and in a necessary range, and thereby it is also possible to reproduce the change to occur whenever the workpieces are sequentially picked up and to obtain more accurate simulation results. This contributes to appropriate condition setting with a small difference between the simulation and the actual operation.

In the examples described above, the example in which the simulation of picking-up of the workpiece model is performed in the picking motion simulation is described; however, the present invention is not limited to the example, and one workpiece model which is the picking-up target may be removed without performing the simulation of picking-up of the workpiece model and the physical simulation may be started with the state obtained after the removing as the initial state. According to the method, it is possible to simplify the process of the simulation. In addition, the physical simulation is not re-executed every time, but the physical simulation may be performed every predetermined time. Further, the range of the physical simulation may be restricted such that the physical simulation is performed with respect to only the workpiece model in the vicinity of the workpiece model which is the picking-up target. For example, the setting can be performed by the simulation environment setting unit to be described below. Otherwise, a situation around the workpiece model which is the picking-up target may be checked, and the physical simulation may be executed only when there is another workpiece model on the path through which the workpiece model is picked up.

As described above, it is possible to provide the user with the picking motion simulation of the state more approximate to the actual operation. In addition, it is possible to check all-encompassing functions by using the picking motion simulation. For example, there is provided a technology in which the workpiece model around the workpiece model that is previously picked up is not set as a next picking-up target in the picking motion. In the method, after a certain workpiece model is picked up, a workpiece model that is assumed not to have a change in the position or posture is not subjected to an imaging process again but is subjected to the picking motion. However, when the physical simulation of the state is not re-executed after any workpiece model is picked up, a site that is to collapse naturally is in a state in which the site does not collapse. Therefore, the site is likely to be in a state in which it is not possible to correctly verify the function of the site. The physical simulation is re-executed after the workpiece model is picked up as described above, and thereby it is possible to verify the function of which success or failure of the motion is changed due to the movement of the workpiece model.

As described above, in the picking motion simulation of sequentially picking up the workpiece models from the bulk pile data, after any one of the workpiece models is picked up by the robot, the physical simulation, to which the influence of the gravity is applied, is applied to the bulk-piled workpiece model group in a state obtained after the workpiece model is picked up, and it is possible to update the bulk pile data. In this manner, any one of the workpiece models is picked up, and it is possible to prevent the other workpiece model, which is in contact with the workpiece model that is picked up, from being in a physically unnatural state such as a state in which the workpiece model floats in the air.

Generation of Bulk Pile Image of Workpiece Model

Here, described above, generation of a bulk pile image of the workpiece models which is obtained through the physical simulation in Step S2502 in FIG. 25 is described. The three-dimensional bulk pile data (3D measurement data) is generated based on the position/posture data of the plurality of piled-up workpiece models which is obtained through the physical simulation illustrated in FIG. 26. In Step S2502, the height image is generated as the bulk pile image from the bulk pile data. The height image is an image in which a value indicating a height is stored in pixel values that configure the image. Typically, in the image, the height is represented by a luminance value. The Z-buffering method as described above can be suitably used as a method of generating the height image.

Invalid Pixel

After the height image is generated as described above, a pixel having a surface that has an inclination equal to or larger than a certain inclination is set as an invalid pixel with reference to a normal line image that is generated at the same time as the height image. The height image and the normal line image have pixels having a relationship of one-to-one correspondence. The invalid pixel is a pixel indicating a position at which it is not possible to perform the three-dimensional measurement. For example, when the pixel value is 0, the corresponding pixel can be determined as the invalid pixel.

For example, a site that is not viewed by both of the projector and the camera which configure the sensor unit, that is, the pixel, is the invalid pixel. Regarding invalidation of pixels, the pixels may be weighted depending on an angle range, as well as uniform invalidation with a certain threshold as a reference.

Figure 60C:
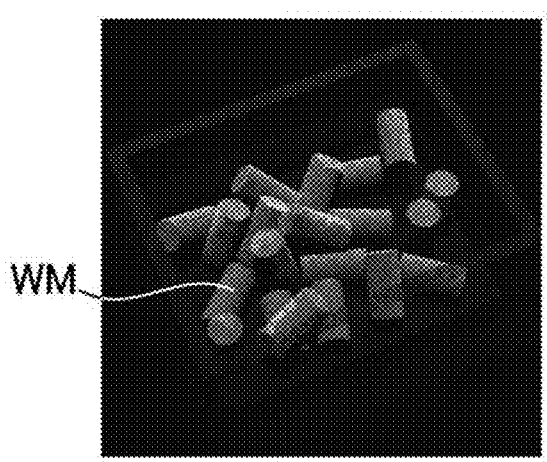
FIG. 60C is a perspective view in which the image in FIG. 60B is viewed as a point group.
Figure 60E:
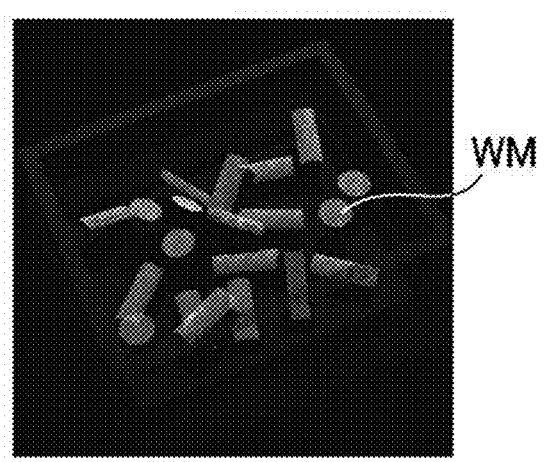
FIG. 60E is a perspective view in which the image in FIG. 60D is viewed as a point group.

According to the configuration described above, accurate bulk pile data can be generated in consideration of whether or not the three-dimensional measurement can be performed during the actual operation. When a workpiece such as a metal workpiece having high specular reflection has a surface that is inclined at an angle equal to or larger than a certain angle, a projection pattern from the projector that configures the sensor unit is not reflected from the surface, and thus it is not possible to perform the three-dimensional measurement. This is not considered in the picking motion simulation in the related art, and the simulation is performed on the premise that the three-dimensional shapes of all of the workpieces are measured. Therefore, there are a discrepancy and a difference between the simulation and the actual operation. For example, in a case in which the bulk pile data as illustrated in FIG. 60A is obtained as a result of the physical simulation, a plan view in FIG. 60B or a point group display image in FIG. 60C is obtained with the bulk pile image as the height image simply without considering inclinations or the like of the surfaces of the workpiece models WM. The bulk pile image is likely to have a result by which it is even possible to measure a surface having a steep inclination at which it is not possible to perform the three-dimensional measurement during the actual operation.

In this respect, according to the embodiment, the bulk pile data is not used as it is, and it is possible to generate data for simulation of reproducing a state of whether or not the three-dimensional shape of the workpiece is measured in the picking motion simulation. As a result, it is possible to generate the bulk pile image more approximate to the actual operation, in which the steep surface is displayed as invalid pixels in which it is not possible to perform the three-dimensional measurement, as illustrated in a plan view in FIG. 60D or a perspective view in FIG. 60E from the bulk pile data in FIG. 60A. In this manner, the picking motion simulation is approximate to the actual operation, and it is possible to perform setting work in advance, based on more accurate simulation.

As described above, when there is CAD data, it is possible to perform efficient verification in a state approximate to the actual operation without preparing the actual workpieces or forming a bulk pile. However, it is also possible to perform the picking motion simulation in a state in which the actual workpieces are prepared and piled in bulk.

Angle Threshold

Figure 61A:
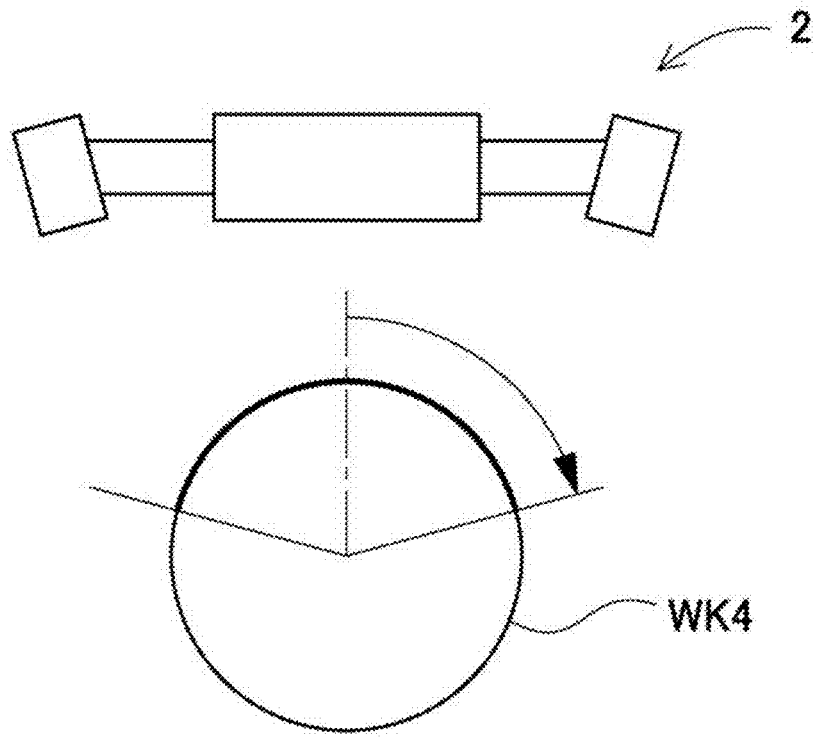
FIG. 61A is a schematic sectional view illustrating an angle range in which it is possible to acquire a three-dimensional shape of a workpiece having low specular reflection.
Figure 61B:
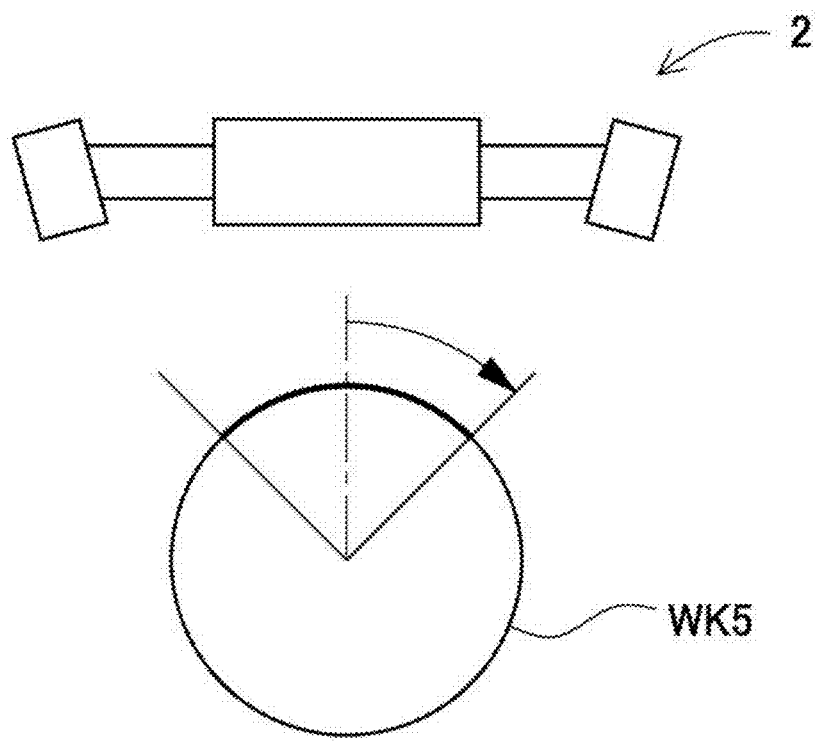
FIG. 61B is a schematic sectional view illustrating an angle range in which it is possible to acquire a three-dimensional shape of a workpiece having high specular reflection.

Next, a procedure of setting the threshold of an inclination angle of a surface that configures the workpiece model will be described. Here, by using the sensor unit 2 in FIG. 6, FIG. 61A illustrates an angle range in which it is possible to acquire a three-dimensional shape of a workpiece WK4 having low specular reflection, and FIG. 61B illustrates an angle range in which it is possible to acquire a three-dimensional shape of a workpiece WK5 having high specular reflection. As illustrated in the figures, in a case where a material of which the workpiece is made has weak specular reflection, that is, high diffuse reflection like a resin or the like, and in a case where a material has high specular reflection, that is, weak diffuse reflection like metal or the like, there is a difference in an angle range in which it is possible to perform the measurement. In other words, when the specular reflection is high, the projection pattern from the projector is difficult to be reflected from the front surface of the workpiece, and it is not possible to perform the measurement when the surface has a small inclination. For the resin workpiece WK4 illustrated in FIG. 61A, it is possible to perform the measurement on an inclined surface to a range of 75° from a perpendicular plane down from the sensor unit 2 to the workpiece. For the metal workpiece WK5 illustrated in FIG. 61B, it is possible to perform the measurement on an inclined surface to a range of 45° from a perpendicular plane. The angle threshold may be described as the inclination angle of the camera and the projector, as well as being described as the inclination angle from a perpendicular direction as described above.

In the embodiment, it is possible to set the angle threshold that indicates an angle to which it is possible to measure an inclined surface. It is possible to adjust the angle threshold depending on the material of the workpiece which is a target, and thereby the picking motion simulation suitable for the workpiece is realized.

Detection Target Setting Unit 50

It is possible to employ a configuration in which such an angle threshold described above is set from the detection target setting unit 50 in FIG. 24 as described above. The region estimating unit 22 estimates, as a region that is difficult to be three-dimensionally measured, a region having an inclination angle equal to and larger than a predetermined angle threshold with respect to a measurement axis extending from the three-dimensional virtual measurement light source of a sensor model set by the sensor model setting unit 15, based on the setting of the angle threshold performed by the detection target setting unit 50.

The angle threshold may be a predetermined fixed value. Otherwise, the angle threshold may be changed depending on the front-surface state parameter set by the front-surface state parameter setting unit 12. Further, the angle threshold may be changed, based on three-dimensional measurement data obtained by actual measurement performed by the sensor unit.

Figure 62D:
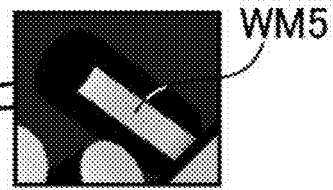
FIG. 62D is a partially enlarged view illustrating an enlarged metal workpiece in FIG. 62C.

It is possible to set the angle threshold as described above depending on the workpiece which is a target. For example, FIG. 62A illustrates an example of the bulk pile image obtained in a case where the resin workpiece is assumed, and the angle threshold, at which it is possible to perform measurement to an inclined surface by 75°, is set, and FIG. 62B is an enlarged view illustrating a resin workpiece model WM4 as a partially enlarged view. In addition, FIG. 62C illustrates an example of the bulk pile image obtained in a case where the metal workpiece is assumed, and the angle threshold, at which it is possible to perform measurement to an inclined surface by 45°, is set, and FIG. 62D is a partially enlarged view illustrating an enlarged metal workpiece model WM5 therein. As illustrated in the figures, since the metal workpiece has a limited site that can be measured with respect to the resin workpiece, it is possible to verify, in advance, whether or not it is possible to correctly detect the position and the posture of the workpiece despite such limited shape characteristics in a case where the target of the picking motion simulation is metal workpiece.

In addition, whether or not it is possible to perform the measurement is not determined by the angle threshold simply in a binarized manner, but it is possible to perform probabilistic determination by using random numbers. Here, since the front-surface state is not uniform, a boundary of whether or not it is possible to perform the measurement is not formed as a clear boundary in the measurement during the actual operation. As a result, easiness or difficulty in determination of the invalid pixels is probabilistically changed. Therefore, by using the random number, a probability of exclusion is decreased in a portion having small inclination angle, and a probability of exclusion is increased in a portion having large inclination angle. The invalidation is probabilistically determined by the random numbers, and thereby it is possible to realize a state more approximate to actual measurement.

According to such a robot simulation apparatus, it is possible to adjust or optimize the setting parameters by using an image obtained in a state approximate to the measurement result during the actual operation in the picking motion simulation. For example, in a case where it is determined that it is difficult to detect the workpiece as a result of the picking motion simulation, it is possible to consider that it is necessary to improve a transport method or a piling method of workpieces, as a countermeasure. As described above, it is possible to verify a proper countermeasure in advance without actually preparing the workpieces or without disposing the sensor unit.

Exclusion of Difficult Region Based on Position of Camera Embodiment 12

In addition, a method of estimating a difficult region by the region estimating unit is not limited to the inclination angle of the surface described above, and it is possible to determine the difficult region based on the position of the camera of the sensor unit. Such a robot simulation method is described below as Embodiment 12.

As described above, when the data for simulation is generated in the simulation of picking from a bulk pile, it is possible to generate a virtual image when viewed from above, that is, a bulk pile image by using the Z-buffering method or the like described above when there is data of the position and the posture of the workpiece models in a case where three-dimensional CAD models of workpieces are formed and the CAD models are piled as the workpiece models.

Figure 63:
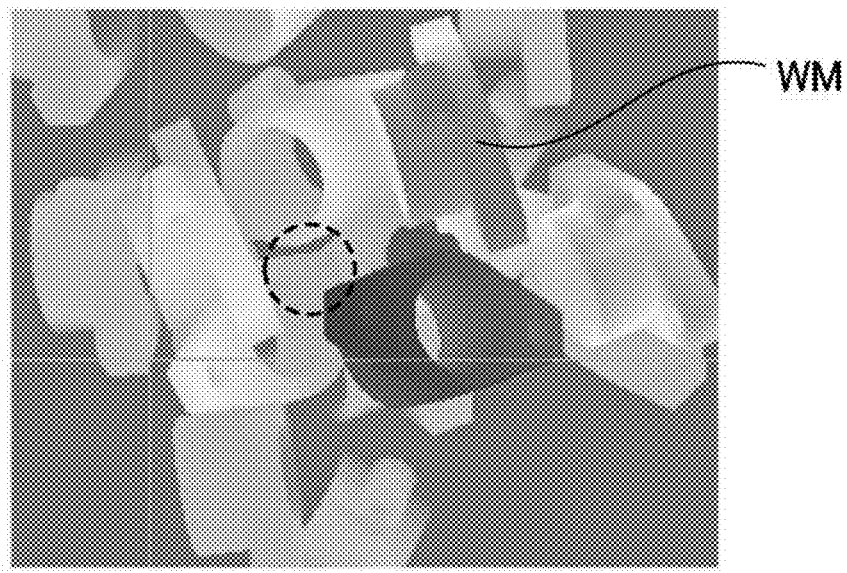
FIG. 63 is an image view illustrating a bulk pile image.
Figure 64:
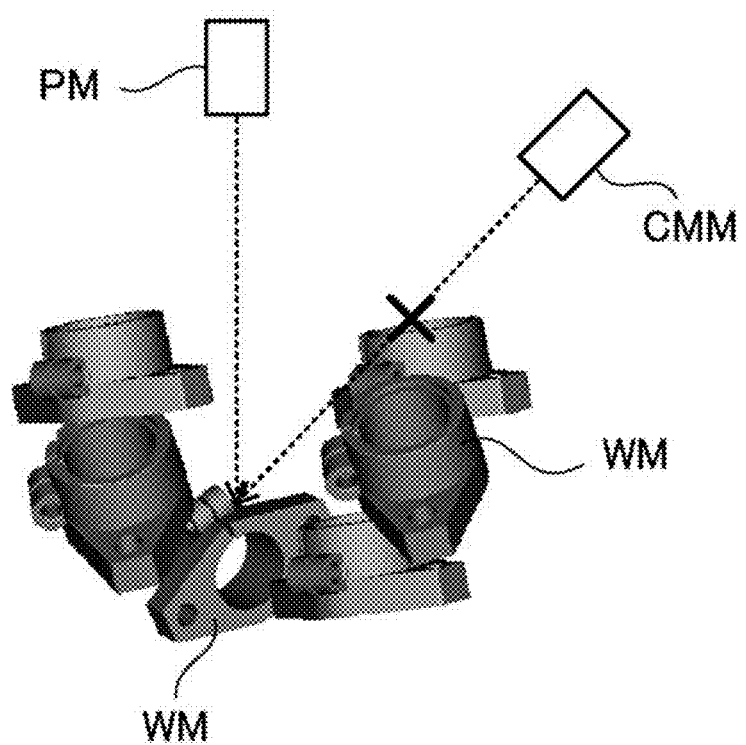
FIG. 64 is a schematic diagram illustrating a state in which a workpiece is not viewed from the side of a camera in a pattern projection method.

However, data of a portion viewed from above in the Z-buffering method is entirely drawn. As a result, even when the workpiece models are piled on the periphery, the portion is drawn as long as the portion is viewed from above. For example, an example represented by the bulk pile image in FIG. 63 is considered. Here, in a case where the sensor unit that performs the three-dimensional measurement is a TOF sensor by using the TOF method, such an image is actually obtained. However, in a case where a projection position and an imaging position are different from each other as in a pattern projection method as illustrated in FIG. 64, it is possible to perform measurement of the portion on a condition that the portion can be viewed from both positions. Therefore, as illustrated in FIG. 64, it is not possible to measure a recessed site at a position that is not viewed from a camera model CMM but can be viewed from a projector model PM. In order to obtain the result of the picking motion simulation approximate to the actual operation, it is desirable to remove such a state.

In Embodiment 12, after the height image is generated, it is determined whether or not the pixels that configure the height image are viewed from the camera model, and only the pixels viewed from the camera model are to remain. For example, the region estimating unit 22 in FIG. 3 or the like defines a line segment, as a virtual optical axis, which connects a three-dimensional virtual measurement light source used when the three-dimensional measurement is performed using the sensor model and each of points that configure the bulk pile data, to each other, and determines whether or not a point of another workpiece model is present on the virtual optical axis. In a case where the point of the other workpiece model is present, the region estimating unit estimates the point as a point that is difficult to be three-dimensionally measured and defines an estimated region with a set of points that is difficult to be three-dimensionally measured. In this manner, it is possible to estimate a difficulty in measurement based on whether or not interference occurs between the virtual optical axis and the workpiece models, and thus it is possible to increase the accuracy of the simulation.

As a specific method of determining a region as a blind spot due to the other workpiece model, a line segment connecting the point and the camera model is defined at points (voxels) that configure the three-dimensional bulk pile data. In a case where there are other voxel points on the line segment, the points are determined not to be viewed from the camera model.

Figure 65A:
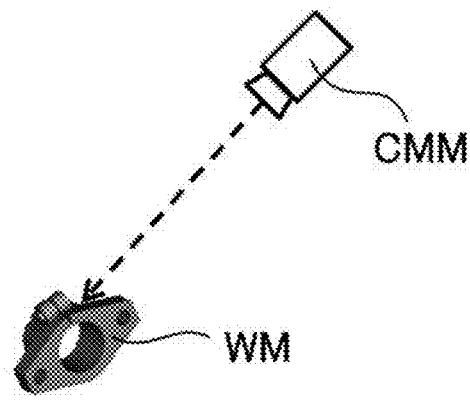
FIG. 65A is a schematic diagram illustrating an example in which a workpiece is viewed from the camera.
Figure 65B:
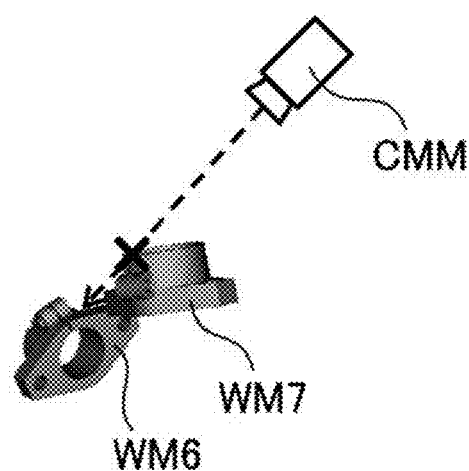
FIG. 65B is a schematic diagram illustrating an example in which the workpiece is not viewed from the camera.
Figure 65C:
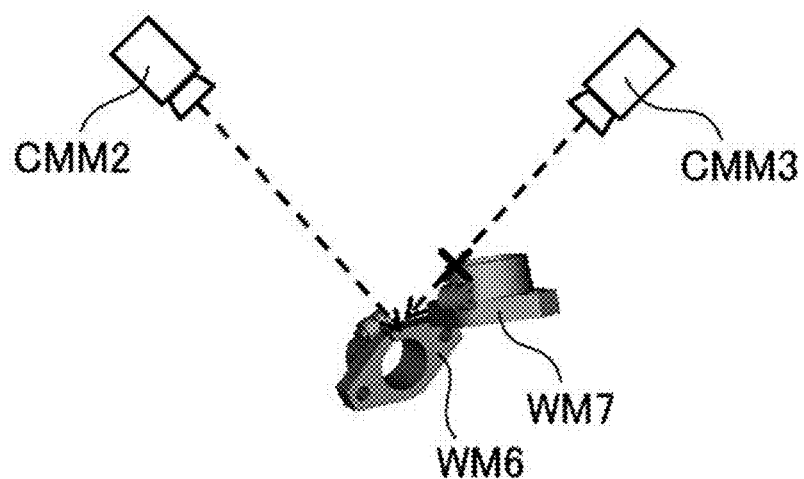
FIG. 65C is a schematic diagram illustrating an example in which all of the workpieces are viewed from a plurality of cameras.

In addition, as illustrated in FIG. 6, in a case where the sensor unit 2 includes two or more cameras, a point that is viewed from at least one camera model is to remain. For example, in FIG. 65A, since the workpiece model WM is viewed from the camera model CMM, the point is set as a valid voxel. On the other hand, as illustrated in FIG. 65B, in a case where a part of the workpiece model WM6 is hidden behind another workpiece model WM7 and is not viewed from the camera model CMM, the part is set as an invalid voxel. In addition, as illustrated in FIG. 65C, in a case where a workpiece model WM is viewed from any one of the plurality of camera models CMM2 and CMM3, the workpiece model is set as a valid voxel. As described above, a site that is recessed and is not viewed in the real world is excluded from the bulk pile image, and an image approximate to an image captured during the actual operation is obtained. In this manner, the accurate bulk pile simulation is performed.

Procedure of Picking Motion Simulation According to Embodiment 12

Figure 66:
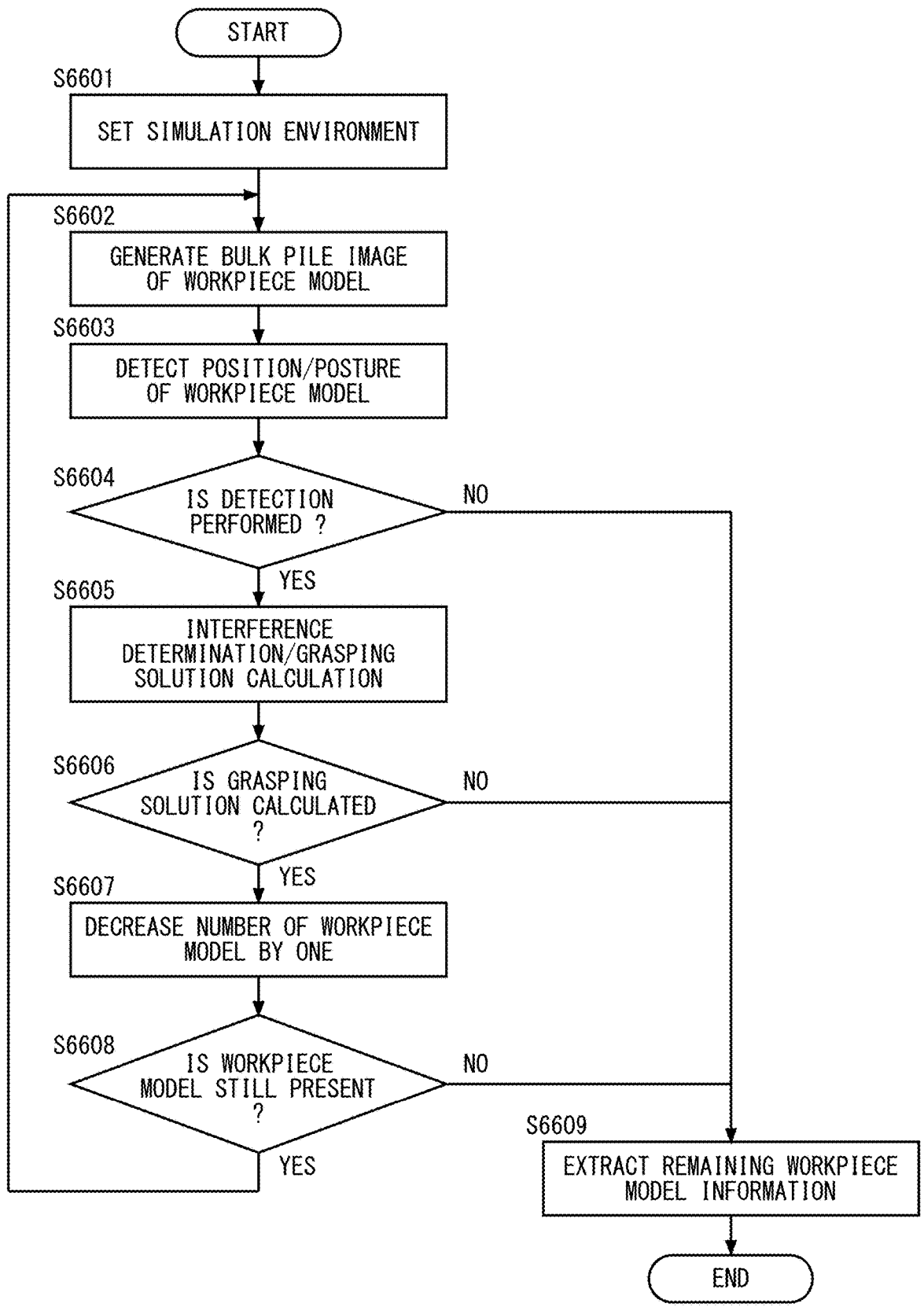
FIG. 66 is a flowchart illustrating a procedure of a picking motion simulation according to Embodiment 12.

Here, a procedure of the picking motion simulation according to Embodiment 12 is described based on the flowchart in FIG. 66. With respect to the same motion as that in the flowchart in FIG. 25 according to Embodiment 1 described above, the detailed description thereof is appropriately omitted. First, in Step S6601, a simulation environment is set. Next, in Step S6602, the bulk pile image of the workpiece model is generated. The procedure of generating the bulk pile image of the workpiece models is described in detail by using the flowchart in FIG. 67.

Procedure of Generating Bulk Pile Image According to Embodiment 12

First, in Step S6701, the posture and the dropping position of the workpiece models are set based on random numbers. Next, in Step S6702, the physical simulation of dropping the workpiece models is executed. Further, in Step S6703, it is determined whether or not the designated number of workpiece models are dropped. In a case where the designated number of workpiece models are not all dropped, the procedure returns to Step S6701 and the process is repeatedly performed. When it is determined that the designated number of workpiece models are dropped, the procedure proceeds to Step S6704, and the bulk pile image of the workpiece models is generated, based on the position and posture of the workpiece models. Here, the height image is generated from the three-dimensional bulk pile data.
Procedure of Generating Bulk Pile Image Here, in Step S6704, the procedure of generating the bulk pile image is described in detail based on the flowchart in FIG. 68. First, in Step S6801, the bulk pile data is converted into the position and the posture in which the CAD data is registered. Next, in Step S6802, the position and the posture is again drawn as the height image by the Z-buffering method. In Step S6803, it is determined whether all of the workpiece models are drawn. In a case where the drawing is not completed, the procedure returns to Step S6801 and the process is repeatedly performed. As a result, in a case where the drawing of all of the workpiece models is ended, the procedure proceeds to Step S6804.

Figure 69:
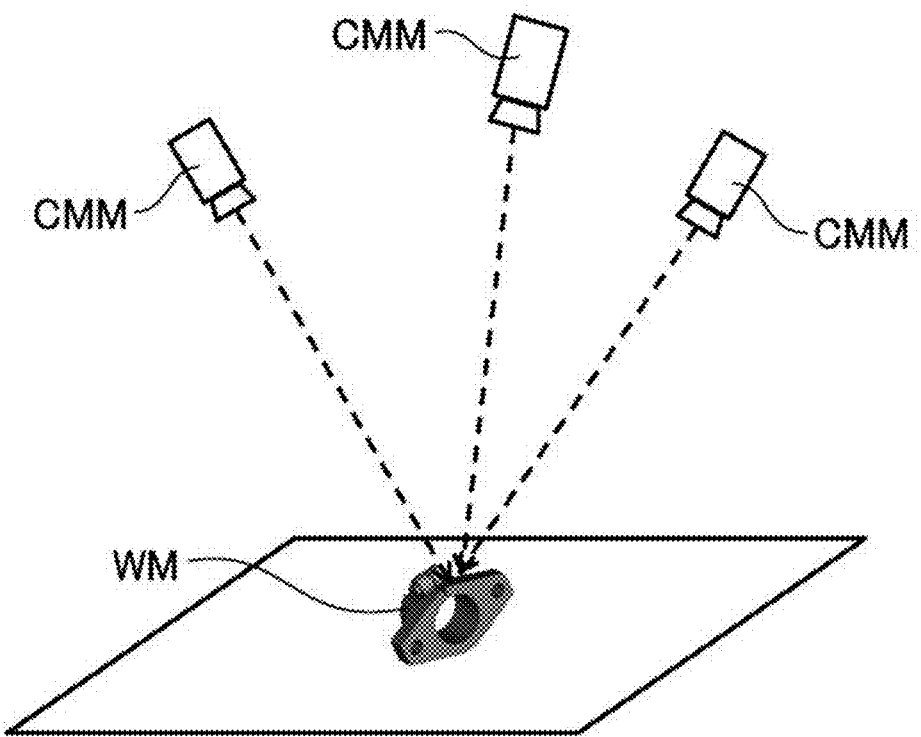
FIG. 69 is a schematic view illustrating straight lines connecting cameras and an attention position on the workpiece.

In Step S6804, a straight line connecting one point of the height image and the camera model is computed. Here, the position of the camera model in the three-dimensional virtual work space is defined in advance. Then, as illustrated in FIG. 69, a straight line expression connecting the pixels of the height image of the workpiece model WM and each of the camera models CMM is computed. For example, the straight line expression approximates to the following expression.

$$ax+by+cz=d$$

Figure 70:
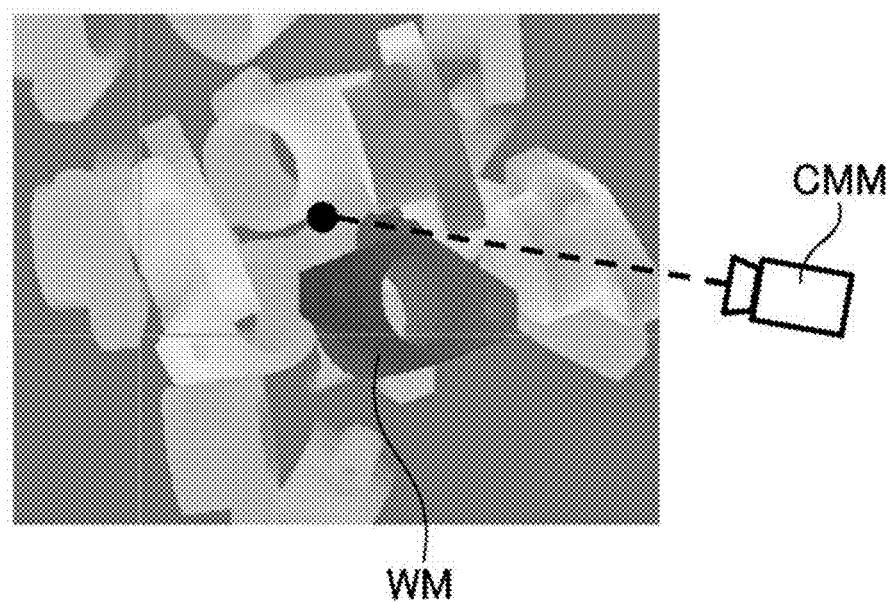
FIG. 70 is a schematic view illustrating a state of checking whether or not there is an obstacle on the straight line connecting the camera and the attention position.

In Step S6805, as illustrated in FIG. 70, it is checked whether an obstacle, here, another workpiece model WM is present on the straight line connecting to the camera models CMM. As a specific method, the straight line is converted into a two-dimensional line on the height image. In a case where points of the height image on the line and Z values at the positions thereof on the line are computed, and the points of the height image are present at a higher position, it is determined that the points are not viewed from the camera model.

Further, In Step S6806, a point that is not viewed from any one of the camera models is removed. Further, in Step S6807, it is determined whether or not the process is performed on all of the pixels. In a case where the process is not performed on all of the pixels, the procedure returns to Step S6804 and the process is repeatedly performed. When it is determined that the process is performed on all of the pixels, the process is ended.

Figure 67:
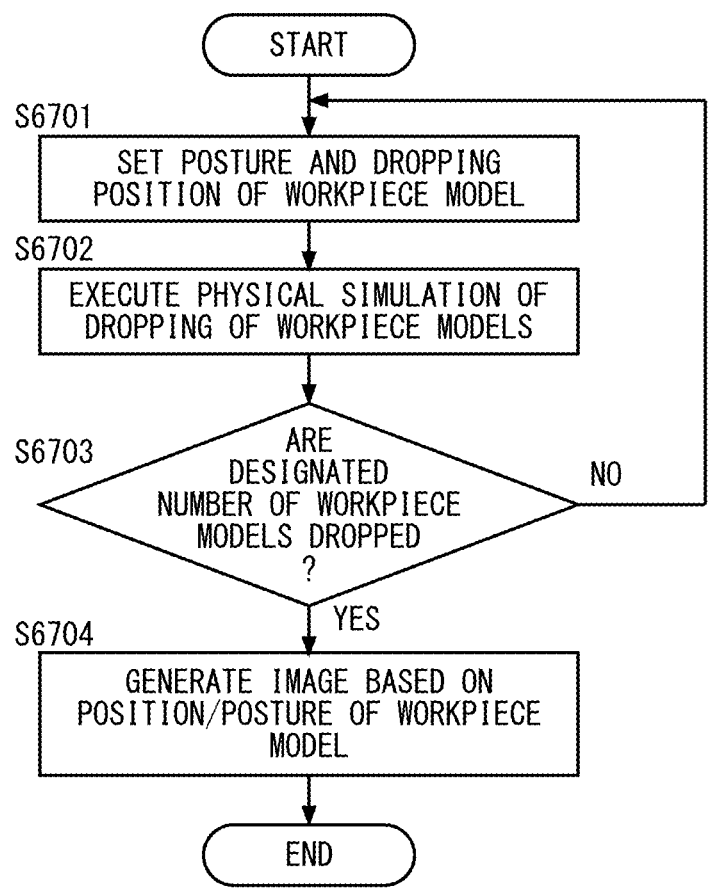
FIG. 67 is a flowchart illustrating a procedure of generating a bulk pile state of workpiece models in a physical simulation according to Embodiment 12.
Figure 68:
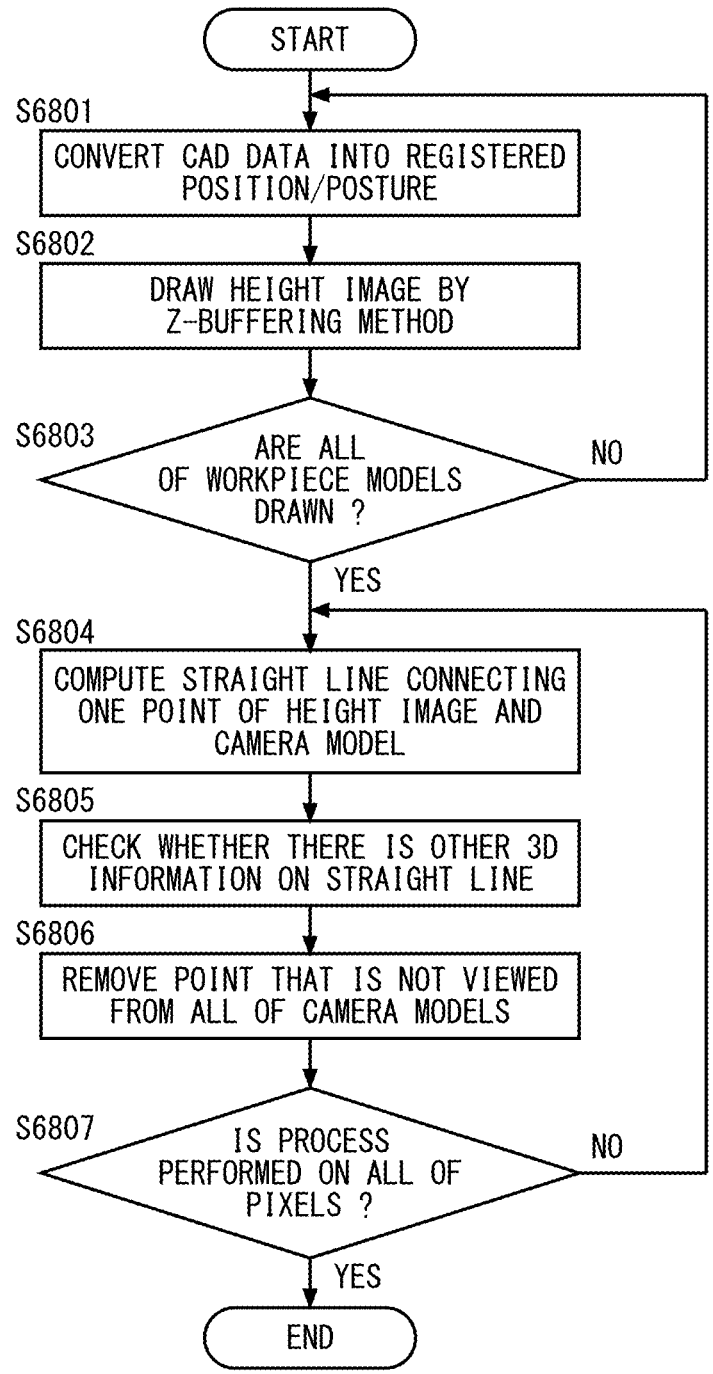
FIG. 68 is a flowchart illustrating a procedure of generating a bulk pile image.

As described above, when the bulk pile image is obtained in Step S6602 in FIG. 66 through the procedures in FIGS. 67 and 68, detection of the position and the posture of the workpiece models is tried in Step S6603. Further, in a case where it is determined whether or not it is possible to detect the position and the posture of the workpiece models and it is possible to perform the detection in Step S6604, the procedure proceeds to Step S6605. In a case where it is not possible to perform the detection, the procedure jumps to Step S6609. After information on the remaining workpiece models is extracted, the process is ended.

In a case where it is possible to detect the position and the posture of the workpiece models, interference determination between the end effector model and periphery data is performed and calculation of a grasping solution is tried in Step S6605. In a case where it is determined whether or not it is possible to calculate the grasping solution and it is possible to perform the calculation in Step S6606, the procedure proceeds to Step S6607. In a case where it is not possible to perform the calculation, the procedure jumps to Step S6609. The information on the remaining workpiece models is extracted, and the process is ended.

In a case where it is possible to calculate the grasping solution, the number of workpiece models is decreased by one in Step S6607. In a case where it is determined whether or not an unprocessed workpiece model remains in Step S6608 and an unprocessed workpiece model remains, the procedure returns to Step S6602 and the process is repeatedly performed. In a case where no unprocessed workpiece model remains, the procedure proceeds to Step S6609. In Step S6609, information of the remaining workpiece models is extracted.

As described above, the picking motion simulating unit executes the picking motion simulation. As described above, it is possible to more accurately estimate a measurement difficulty region in which the sensor unit using the camera cannot measure the three-dimensional shape of the workpiece.

In the examples described above, invalid pixels are determined depending on whether or not the pixels are viewed from the camera; however, it is possible to define not only the position of the camera but also the position of the projector and to set a condition in which the pixel is viewed from the projector and any one of the cameras. Further, a point having a height lower than that of peripheral points to an extent equal to or larger than a certain amount is removed without clearly defining the position of the camera, and thereby it is possible to obtain the same effect and to perform the simulation.

According to the robot simulation apparatus as described above, even when there is no preparation of disposing the sensor unit, piling up the workpieces, or the like in the real world, it is possible to virtually establish a state approximate to a state in which the workpieces piled in bulk are imaged and to perform the simulation in advance. In particular, the simulation is performed in consideration of a region that cannot be three-dimensionally measured during the actual operation. In this manner, it is possible to reduce a difference between the simulation and the actual operation, and it is possible to perform the simulation with high reliability.

Angle Threshold Determining Unit 54

Embodiment 13

In the examples described above, the example in which the angle threshold is set based on the virtual bulk pile data is described. However, the present invention is not limited to such a configuration, and it is possible to set the angle threshold based on a result of measurement of the actual workpieces and a bulk pile state by the sensor unit. In this case, the sensor unit actually performs the three-dimensional measurement on the workpiece group of the workpieces randomly piled in bulk. Therefore, the sensor unit is connected to the robot simulation apparatus which is the image processing unit.

Figure 71:
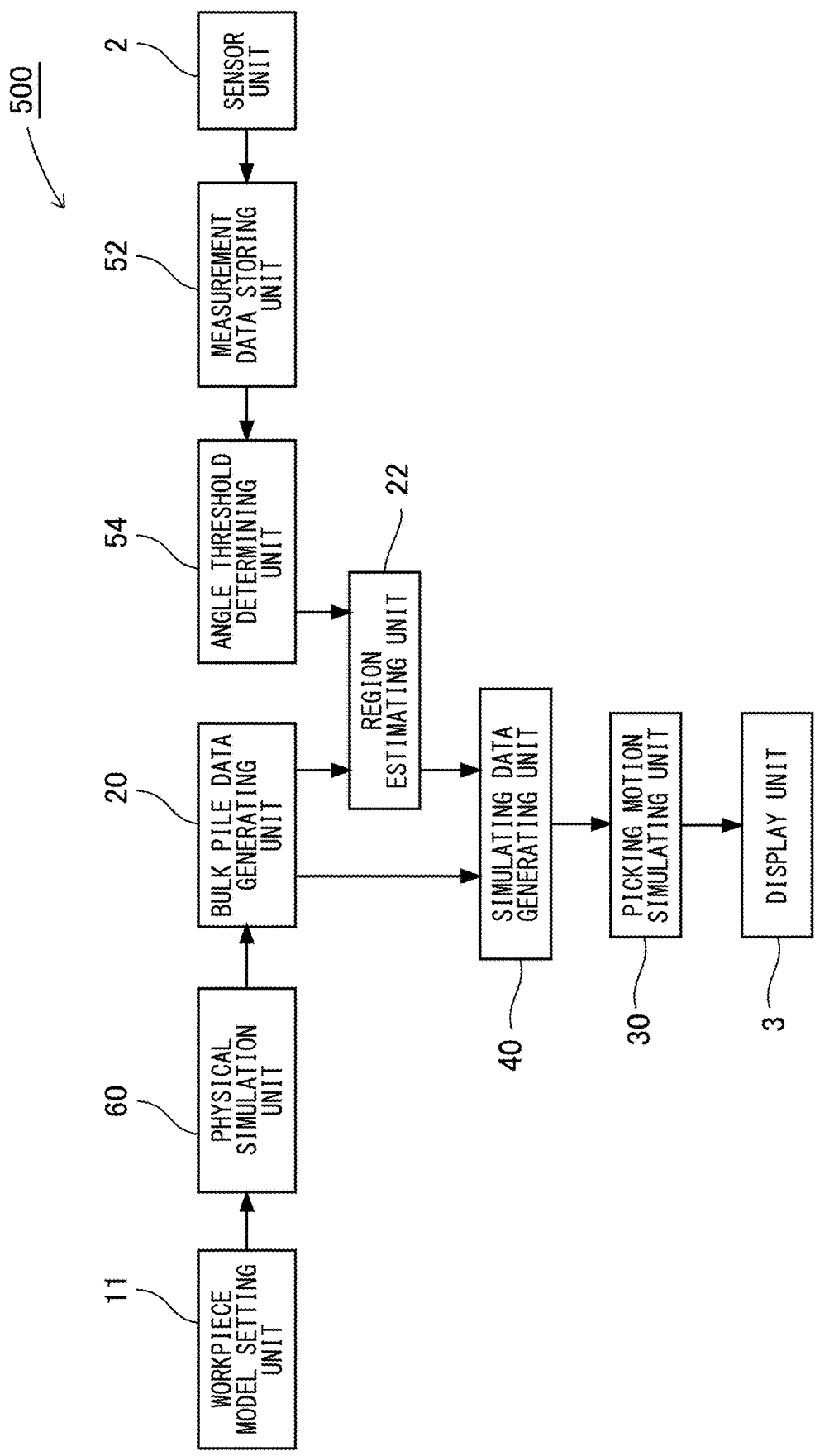
FIG. 71 is a block diagram illustrating a robot simulation apparatus according to Embodiment 13.

Such a robot simulation apparatus is illustrated as Embodiment 13 based on the block diagram in FIG. 71. A robot simulation apparatus 500 illustrated in FIG. 71 includes the sensor unit 2, a measurement data storing unit 52, an angle threshold determining unit 54, the workpiece model setting unit 11, the physical simulation unit 60, the bulk pile data generating unit 20, the simulating data generating unit 40, and the picking motion simulating unit 30. Also in Embodiment 13, the same reference signs are assigned to the same members as those in Embodiment 1 described above, and the detailed description thereof is appropriately omitted.

The measurement data storing unit 52 is a member that stores the three-dimensional measurement data having information of the inclination angle for each position with respect to a measurement axis of the sensor unit 2 which is obtained by three-dimensionally measuring a plurality of piled-up workpieces having different postures by the sensor unit 2. It is possible to use a fixed storing medium such as a hard disk, a semiconductor memory, other portable media, or the like as the measurement data storing unit 52.

The angle threshold determining unit 54 is a member that determines the angle threshold which is a reference to determination of whether or not to perform the three-dimensional measurement, based on the inclination angle information with respect to the measurement axis of the sensor unit 2, which is the information of the points that configure the three-dimensional measurement data of a plurality of workpieces stored in the measurement data storing unit 52. The measurement axis of the sensor unit 2 means the optical axis of the measurement light emitted from the three-dimensional measurement light source for the three-dimensional measurement performed by the sensor unit 2. In addition, the measurement axis of the sensor unit 2 may be set in the perpendicular direction or the like or in a predetermined direction.

The region estimating unit illustrated in FIG. 71 compares the virtual inclination angles of the points that configure the workpiece models in the bulk pile data generated by the bulk pile data generating unit 20 to the angle threshold determined by the angle threshold determining unit 54 and identifies a point having the virtual inclination angle larger than the angle threshold, as the estimated region that is estimated as a measurement difficulty region. In this manner, it is possible to acquire the data for simulation by excluding data in advance that is estimated as a measurement difficulty data, with the angle threshold as a reference, which is determined based on the inclination angle of the workpiece actually measured by the sensor unit 2. Therefore, it is possible to perform the simulation of the more accurate picking motion.

In addition, the robot simulation apparatus 500 according to Embodiment 13 may include the display unit 3. The display unit 3 is capable of displaying an angle distribution histogram indicating a cumulative distribution of the inclination angles of the points, based on the inclination angle information with respect to the measurement axis of the sensor unit 2, which is the information of the points that configure the three-dimensional measurement data of a plurality of workpieces stored in the measurement data storing unit 52.

Here, a method of determining the posture of the workpiece models which is three-dimensionally measurable based on actual measurement data is described. The determination of whether or not the sensor unit can perform the three-dimensional measurement on the bulk-piled workpiece group is performed with reference to the angle threshold set in advance as described above. However, the angle threshold varies depending on the workpieces. For example, it is relatively easy to measure the resin workpiece, and it is possible to perform the measurement even when the front surface thereof is inclined. However, it is not possible to measure a shiny metal workpiece. Therefore, it is desirable to adjust the angle threshold depending on the workpiece which is the target. However, it is not easy to perform the setting, and it is not possible to obtain a desired result with a set value.

In Embodiment 13, the optimal angle threshold is determined, based on the three-dimensional measurement data obtained by actually performing the three-dimensional measurement on the workpieces. Specifically, the angle threshold determining unit 54 calculates a front-surface inclination for each pixel of the image of the workpiece group that is actually piled in bulk and measures an entire angle distribution. By using the angle distribution, it is determined whether there is a workpiece having the front surface that can be measured even when the front surface is inclined to some degree, and the optimal threshold is determined. According to the method, regardless of variations in the material or the front-surface state of the workpiece, compatibility with the sensor used, a change in humidity, temperature, or the like, it is possible to determine the angle threshold based on the actual three-dimensional measurement data. Therefore, it is possible to select the angle threshold having high reliability.

Angle Distribution Histogram

The angle threshold determining unit 54 performs the angle distribution histogram indicating the cumulative distribution of the inclination angles of the points that configure the three-dimensional measurement data of the workpiece. Otherwise, the angle threshold determining unit or the measurement data storing unit may be incorporated into the sensor unit.

Figure 72:
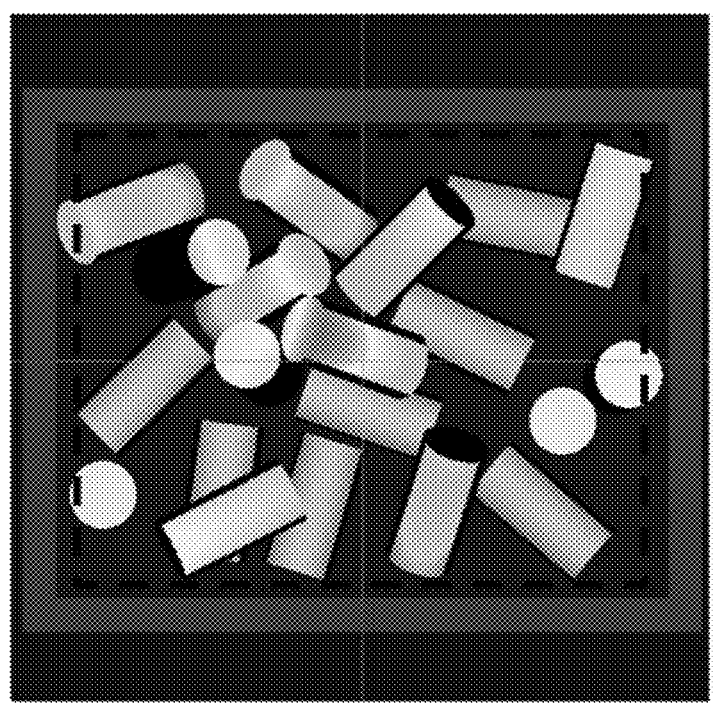
FIG. 72 is an image view illustrating a height image obtained by actually performing three-dimensional measurement on a bulk-piled workpiece group.
Figure 73:
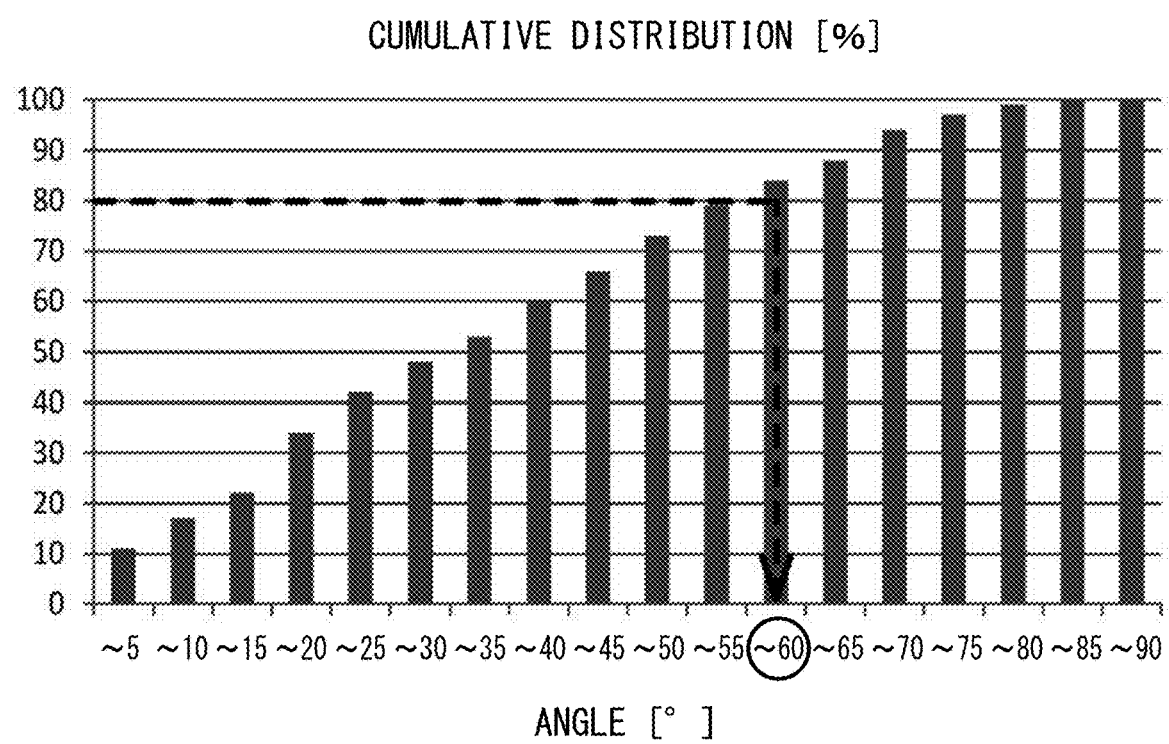
FIG. 73 is a graph illustrating an angle distribution histogram of the resin workpiece.
Figure 74:
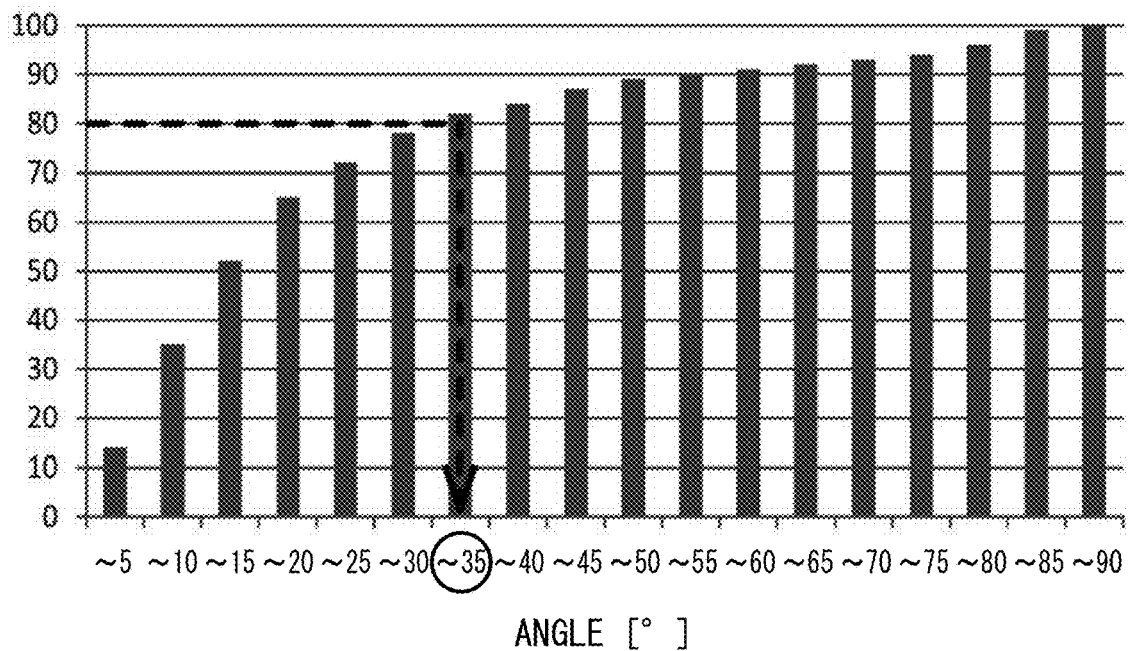
FIG. 74 is a graph illustrating an angle distribution histogram of the metal workpiece.

As an example, FIGS. 73 and 74 illustrate the respective angle distribution histograms obtained from the height image obtained by actually performing the three-dimensional measurement on the bulk-piled workpiece group as illustrated in FIG. 72. FIG. 73 illustrates the angle distribution histogram of the resin workpiece, and FIG. 74 illustrates the angle distribution histogram of the metal workpiece. Since the resin workpiece has the front surface from which diffuse reflection occurs, it is possible to measure the three-dimensional shape even when a large inclination of the front surface with respect to the sensor measurement axis occurs.

Therefore, as illustrated in FIG. 73, measured points are distributed in a wide angle range. On the other hand, since the regular reflection components are more formed from the metal workpiece, it is not possible to perform the measurement when a large inclination of the front surface with respect to the sensor measurement axis occurs. Accordingly, as illustrated in FIG. 74, the distribution is formed in a region having small inclination angles. Such an angle distribution histogram is displayed in an angle distribution histogram display region on the display unit 3. For example, the angle distribution histogram display region is realized by a GUI of a robot simulation program installed in a computer which is the robot simulation apparatus.

It is possible to determine the angle range in which the three-dimensional measurement results are obtained from the angle distribution histogram displayed as described above. The user can set the angle range in which the three-dimensional measurement is performed with respect to many points, in other words, the pixels, as a numerical value from the angle distribution histogram displayed on the display unit, or the user can manually set the angle threshold by directly designating from the screen. For example, in the examples in FIGS. 73 and 74, as the angle range in which 80% or more of pixels are included from both types, 60° is set in a case of the resin workpiece, and 35° is designated in a case of the metal workpiece.

In addition, a configuration in which the angle threshold is automatically set by the robot simulation apparatus may be employed, as well as being manually set by the user. For example, the angle threshold determining unit automatically computes an angle, at which it is possible to perform the three-dimensional measurement with respect to 80% or more of the pixels, as the angle threshold. In this case, the angle distribution histogram may be arbitrarily displayed or may be internally computed without display. In other words, as long as information of the angle distribution is obtained, it is not necessary to display the information in the shape of the histogram. In addition, the angle threshold that is automatically computed may be displayed on the display unit. At this time, a range satisfying the angle threshold may be highlighted on the angle distribution histogram and the result may be displayed.

Figure 75:
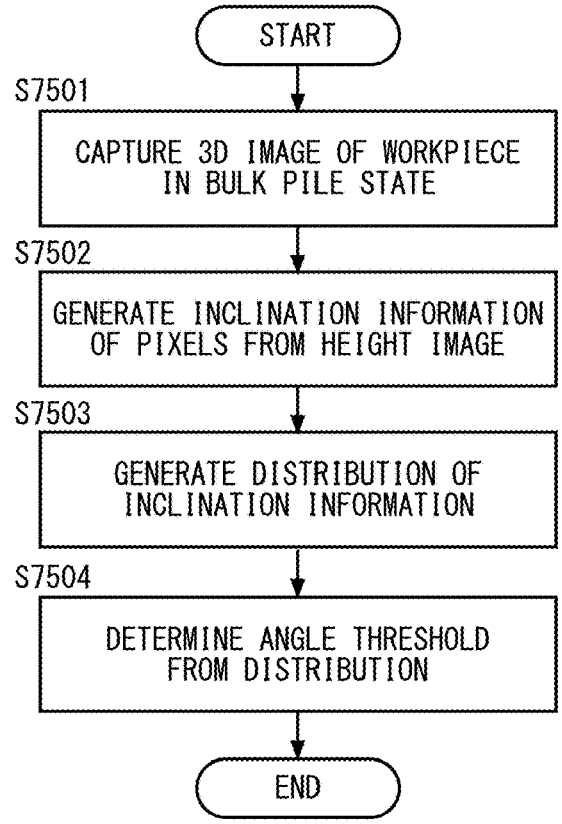
FIG. 75 is a flowchart illustrating a procedure of setting a simulation environment.

The picking motion simulation using the robot simulation apparatus 500 according to Embodiment 13 is performed in the same method as in FIGS. 67 and 68 described above. For example, the setting of the angle threshold is performed during the setting of a simulation environment of Step S6701 in FIG. 67. Here, a procedure of setting the simulation environment is described based on the flowchart in FIG. 75.

Procedure of Setting Simulation Environment According to Embodiment 13

Figure 76:
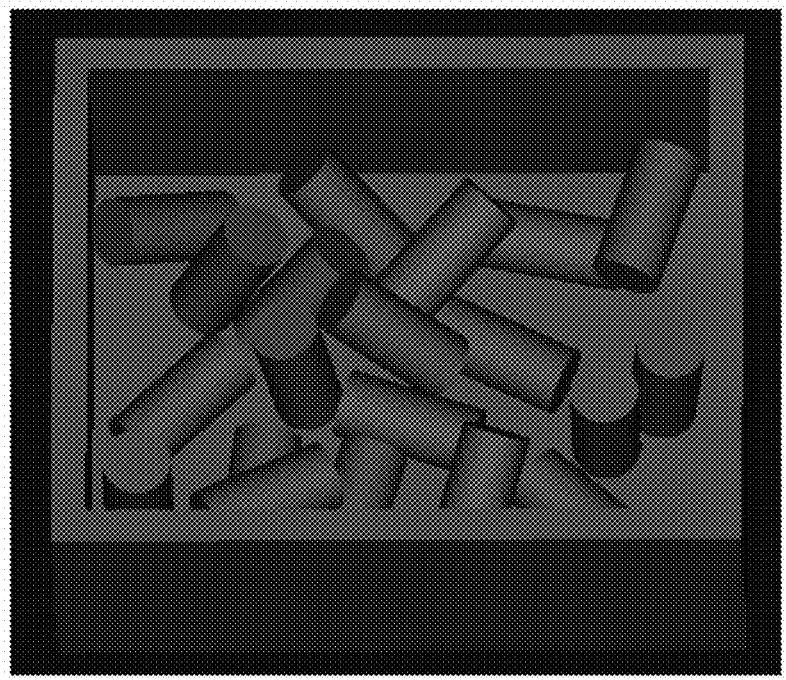
FIG. 76 is an image view illustrating a height image obtained by imaging a workpiece group in a bulk pile state.

First, in Step S7501, the sensor unit measures the three-dimensional shape of the workpiece group in the bulk pile state. In this manner, the height image having the height information as illustrated in FIG. 76 is obtained. In the example, the three-dimensional measurement is performed in a pattern projection method; however, it is possible to use another method, such as stereo measurement, TOF, or the like, for example.

Next, in Step S7502, inclination information is generated for each pixel that configures a three-dimensional height image that is captured. Here, differential processing is performed with respect to the height image, and thereby it is possible to generate a normal line map. Inclinations of points are computed with a Z component of the normal line. It is possible to express the inclinations of the points at the following expression.

$\theta = a \cos Nz$ ($Nz$: Z component of normal line)

In Step S7503; the angle distribution indicating a distribution of inclination information is computed. Here, the inclination distribution within a selected range is generated. Here, when the floor included in the height image is included in the computation, the rate of inclination 0 is increased. It is preferable that a mask process of excluding such a region is performed. For example, the height equal to or smaller than a certain value is negligible. In addition, since the information of the normal line is likely to be unstable in the vicinity of the invalid pixel, the information may be negligible.

Finally, in Step S7504, the angle threshold used for the picking motion simulation is determined from the computed angle distribution. For example, an angle at which the cumulative distribution is 80% or higher is set to the threshold of the measurable angle. As described above, it is possible to determine the angle threshold as one of the environment setting of the picking motion simulation.

In the examples described above, the angle distribution is generated from a result obtained by capturing the bulk-piled workpiece group one time; however, the present invention is not limited to such a configuration. For example, the distribution may be generated from results obtained by capturing the workpiece group a plurality of times. For example, the angle distribution is generated from averages of the height image obtained by capturing a plurality of times, and thereby it is possible to reduce an influence or the like of sporadic noise and to improve the stability.

According to Embodiment 13, when the simulation of picking from a bulk pile is performed, the position and the posture of the workpiece is not simulated as known information. Instead, an image obtained by simulating the capturing of the sensor unit is generated, and the simulated image is subjected to three-dimensional search processing, and the position and the posture of the workpiece are obtained. The simulation is performed by using the position and the posture obtained in this manner. In this manner, not the virtually obtained position and posture of the workpiece, but the actually obtained position and the posture of the workpiece makes it possible to obtain the simulation result more approximate to the actual operation.

In order to obtain the simulated image more approximate to the actual operation, it is determined whether or not it is possible to perform the measurement depending on the angle of the front surface of the workpiece, instead of determining that performing of the three-dimensional measurement with respect to the entire front surfaces of the workpieces is possible. In a case where it is not possible to perform the measurement, data obtained from the simulated image may be removed. For example, as in Embodiment 1 described above, the region estimating unit removes the invalid pixels from the bulk pile data. Specifically, points having low reliability of the three-dimensional measurement are removed as invalid pixels, based on the inclination angle information with respect to the measurement axis of the sensor unit 2, which is the information of the points that configure the three-dimensional measurement data of a plurality of workpieces stored in the measurement data storing unit 52 illustrated in FIG. 71. The angle threshold determining unit 54 computes the angle distribution based on the data from which the invalid pixels are removed.

As described above, in the robot simulation apparatus 500 according to Embodiment 13, it is possible to determine the optimal angle threshold obtained when the capturing simulation is performed, based on the actual measurement data, and the bulk pile simulation more approximate to the actual operation is performed.

Embodiment 14

Figure 77A:
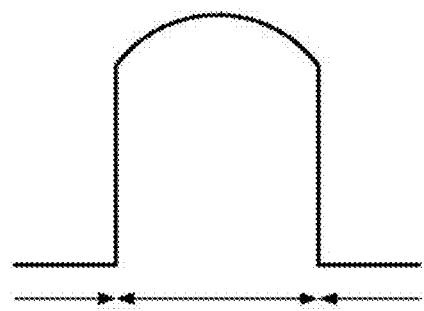
FIG. 77A is a diagram illustrating a profile of three-dimensional measurement data obtained through actual imaging.
Figure 77B:
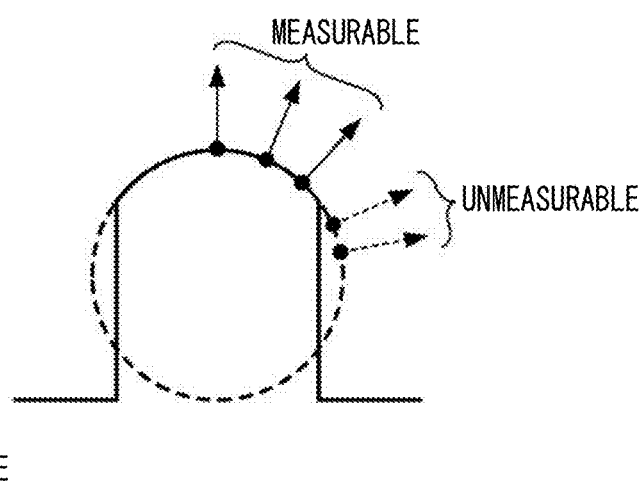
FIG. 77B is a diagram illustrating a state in which a three-dimensional search result is superimposed on FIG. 77A.

In the examples described above, the example in which the angle threshold is determined, based on the histogram or the like of the height image obtained by actually capturing the workpiece group in a bulk pile state by the sensor unit is described. Further, in the present invention, the three-dimensional search is performed with respect to the actually captured image, and it is possible to determine the angle range in which it is possible to perform the measurement by using the search results. Such an example as Embodiment 14 is described, based on FIGS. 77A and 77B. FIG. 77A illustrates a profile of the three-dimensional measurement data which is point group data obtained by actually performing the three-dimensional measurement on the workpiece group in the actual bulk pile state, and FIG. 77B illustrates a state in which the search results are superimposed on each other. Here, the points on the surface of the workpiece model used as the search model are disposed on measurement data based on a three-dimensional search result, as illustrated in FIG. 77B. It is checked whether or not there is measurement data corresponding to the points on the surfaces, and the angle range in which it is possible to perform the measurement is determined. FIG. 77A illustrates a region in which a projecting portion of the profile can be measured and unmeasurable regions as flat portions on both sides. In this respect, the three-dimensional search is performed with respect to the workpiece models corresponding to the same type of workpieces. For example, when the three-dimensional search is performed with respect to the cylindrical workpiece models, as illustrated in FIG. 77B, the matched portion, that is, three points on the left side in the figure are determined to be measurable, and unmatched portion, that is, two point on the right side in FIG. 77B are determined to be unmeasurable.

Figure 78:
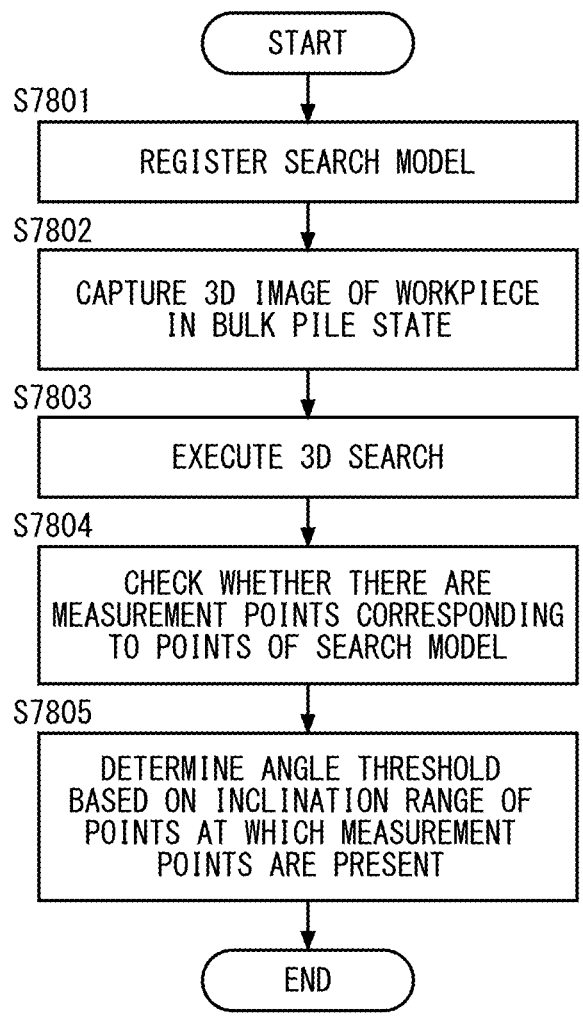
FIG. 78 is a flowchart illustrating a procedure of setting a simulation environment according to Embodiment 14.

The procedure of the picking motion simulation using the robot simulation apparatus according to Embodiment 14 or the procedure of generating the bulk pile image can be executed by using the same procedure in FIGS. 66 and 67, and thus the detailed description thereof is omitted. The setting of the angle threshold by using the search results of the three-dimensional search is performed during the setting of the simulation environment of Step S6701 in FIG. 67. Here, a procedure of setting a simulation environment is described based on the flowchart in FIG. 78.

First, in Step S7801, a search model for the three-dimensional search is registered. Here, the search model can be registered by using the workpiece models as described above or, here, three-dimensional CAD data. Otherwise, the search model may be registered by using the actually captured height image by the sensor unit. In addition, during the registration, the normal line information indicating the inclination of the surface at the points on the search model is saved.

Next, in Step S7802, a bulk pile state of actual workpieces is formed and the three-dimensional measurement is performed. Here, the three-dimensional measurement is performed by the projection method, and point group data is acquired (FIG. 77A); however, the present invention is not limited thereto, and another method such as the stereo measurement or TOF may be used.

Next, in Step S7803, three-dimensional search is performed by using the search model with respect to the obtained point group data, and the position and the posture of the workpieces are determined (FIG. 77B).

In Step S7804, it is checked whether or not there are measurement points corresponding to the points of the search model. Here, the points on the search model are disposed in a three-dimensional space by using the position and the posture of the workpieces determined from the results of the three-dimensional search. In a case where the three-dimensional measurement data is present in the vicinity of the disposed point, the point is determined to be already measured (FIG. 77B).

Finally, in Step S7805, the angle threshold is determined, based on an inclination range of points at which the measurement points are present. Here, the normal lines of the points on the measured workpieces are disposed in the three-dimensional space by using the position and the posture of the search model obtained through the three-dimensional search. Inclinations of the normal lines are computed. A normal line angle range of the measured points is computed, and thereby the angle threshold determining unit determines the threshold of the front surface inclination at which the workpiece can be measured. As described above, it is possible to determine the angle threshold based on the result of the three-dimensional search.

The normal line information is applied to the points that configure the search model used in the three-dimensional search, and thereby it is possible to use the inclination information of the search model even when the inclination information is not obtained from the point group data which is the actual measurement value of the workpiece superimposed on the search model of which the position and the posture are obtained as a result of the three-dimensional search. For example, in FIG. 77B, by using the information of the search model as the inclination information of the position represented by the point, it is possible to complement the information of a point of which the actual measurement value is not obtained (for example, an unmeasurable point). At this time, the inclination information of the search model may be used for the point of which the actual measurement value is obtained in the point group data.

The robot simulation apparatus, the robot simulation method, the robot simulation program, and the computer readable recording medium and recording device of the present invention are suitably applicable to a use of verifying the motion of the picking from a bulk pile by the robot.

What is claimed is:

1. A robot simulation apparatus that causes a sensor model to measure three-dimensional shapes of a plurality of workpiece models piled up in a virtual work space, which is a virtually formed work space so as to simulate picking motions from a virtual bulk pile by a robot which performs picking sequentially, the robot simulation apparatus comprising a processor in communication with a memory, the processor being configured to execute instructions stored in the memory that cause the processor to:

receive a user input that sets a workpiece model obtained by forming a model of a three-dimensional shape of the workpiece model and an angle threshold of the front surface of the workpiece model to estimate a region having an inclination angle equal to or larger than the angle threshold with respect to a measurement axis extending from the sensor model, the angle threshold being manually set by a user or determined by a front-surface state parameter including at least one of a material of the workpiece model, front-surface roughness, a machining method, color, and reflectance of the front-surface of the workpiece model, wherein the angle threshold defines angle ranges that are three-dimensionally measurable in a virtual bulk pile data of the plurality of workpiece models piled up in the virtual work space;

generate the virtual bulk pile data of the plurality of workpiece models piled up in the virtual work space;

identify an estimated region that is estimated to be three-dimensionally measurable by the sensor model which is disposed above the virtual work space, based on a position and a posture of each workpiece model in the virtual bulk pile data and the angle threshold; and execute a simulation for verifying the picking motion from the virtual bulk pile of the workpiece models in the virtual work space, based on data of the estimated region.

2. The robot simulation apparatus according to claim 1, wherein the instructions further cause the processor to:
set a camera model, as the sensor model, which virtually indicates a position and a posture of a camera, which is used for performing three-dimensional measurement of the workpiece model.

3. The robot simulation apparatus according to claim 2, wherein a projector model is included, which virtually indicates a position and a posture of a projector, which is used for performing three-dimensional measurement of the workpiece model, in the sensor model.

4. The robot simulation apparatus according to claim 3, wherein the estimated region, that is, a region at a blind spot when viewed from the sensor model, is estimated as a blind spot region in which measurement is difficult to be performed.

5. The robot simulation apparatus according to claim 3, wherein, as the estimated region, depending on a type of the sensor model that measures a three-dimensional shape, the instructions further cause the processor to define a blind spot region as,
a region at a blind spot from any one of the camera model and the projector model in a case where the sensor model virtually reproduces a state of three-dimensional measurement through a fringe projection method or an optical cutting method, and
a region at a blind spot from any one of a plurality of camera models in a case where the sensor model virtually reproduces a state of the three-dimensional measurement through a stereo method using a plurality of cameras.

6. The robot simulation apparatus according to claim 5, wherein the blind spot region is changed depending on a position of each workpiece model in a plane direction in the virtual work space.

7. The robot simulation apparatus according to claim 3, wherein the instructions further cause the processor to define a line segment, as a virtual optical axis, which connects a three-dimensional virtual measurement light source used when the three-dimensional measurement is performed using the sensor model and each of points that configure the virtual bulk pile data, to determine whether or not a point of another workpiece model is present on the virtual optical axis, to estimate the point as a point that is difficult to be three-dimensionally measured in a case where the point of the another workpiece model is present, and to identify an estimated region with a set of points that are difficult to be three-dimensionally measured.

8. The robot simulation apparatus according to claim 2, wherein the angle threshold is a predetermined fixed value.

9. The robot simulation apparatus according to claim 2, wherein the angle threshold is changed, based on three-dimensional measurement data actually measured by the sensor model.

10. The robot simulation apparatus according to claim 2, wherein the instructions further cause the processor to estimate an estimated region, in which measurement is difficult to be performed, from the virtual bulk pile data of the piled-up workpiece models used in a simulation, based on the sensor model.

11. The robot simulation apparatus according to claim 1, wherein the instructions further cause the processor to estimate an estimated region, in which measurement is difficult to be performed, based on actual measurement data obtained by simulatively performing three-dimensional measurement on workpieces piled in bulk, by the sensor model.

12. The robot simulation apparatus according to claim 1, wherein the instructions further cause the processor to:
set information of an environment of simulation.

13. The robot simulation apparatus according to claim 12, wherein the instructions further cause the processor to set a container model obtained by forming a model of a container that accommodates workpieces, and to estimate an estimated region, based on a relative positional relationship between the sensor model and the container model.

14. The robot simulation apparatus according to claim 1, wherein the instructions further cause the processor to set the workpiece model as a three-dimensional CAD model generated by CAD.

15. A robot simulation apparatus that causes a sensor model to measure three-dimensional shapes of a plurality of workpiece models piled up in a virtual work space, which is a virtually formed work space so as to simulate picking motions from a virtual bulk pile by a robot which performs picking sequentially, the robot simulation apparatus comprising a processor in communication with a memory, the processor being configured to execute instructions stored in the memory that cause the processor to:
receive a user input that sets a workpiece model obtained by forming a model of a three-dimensional shape of the workpiece model and an angle threshold of the front surface of the workpiece model to estimate a region having an inclination angle equal to or larger than the angle threshold with respect to a measurement axis extending from the sensor model, the angle threshold being manually set by a user or determined by a front-surface state parameter including at least one of a material of the workpiece model, front-surface roughness, a machining method, color, and reflectance of the front-surface of the workpiece model, wherein the angle threshold defines angle ranges that are three-dimensionally measurable in a virtual bulk pile data of the plurality of workpiece models piled up in the virtual work space;

generate the virtual bulk pile data of the plurality of workpiece models piled up in the virtual work space;

identify an estimated region that is estimated to be difficult to be three-dimensionally measured by the sensor model which is disposed above the virtual work space, based on a position and a posture of each workpiece model in the virtual bulk pile data and the angle threshold;

generate virtual bulk pile data as data for simulation, which does not include data of the estimated region; and execute a simulation for verifying the picking motion from the virtual bulk pile of the workpiece models in the virtual work space, by using the data for simulation.

16. The robot simulation apparatus according to claim 15, wherein, when any workpiece model is picked up during execution of the simulation of picking motion from the virtual bulk pile, the virtual bulk pile data for simulation is updated by re-estimating a measurable region with respect to remaining workpiece models.

17. A robot simulation method for simulating picking motions from a virtual bulk pile by a robot which sequentially picks up a plurality of workpieces piled up in a virtual work space, the robot simulation method comprising:

setting a workpiece model obtained by forming a model of a three-dimensional shape of a workpiece and an angle threshold of the front surface of the workpiece model to estimate a region having an inclination angle equal to or larger than the angle threshold with respect to a measurement axis extending from a sensor model, the angle threshold being manually set by a user or determined by a front-surface state parameter including at least one of a material of the workpiece, front-surface roughness, a machining method, color and reflectance of the front-surface of the workpiece, wherein the angle threshold defines angle ranges that are three-dimensionally measurable in a virtual bulk pile data of a plurality of piled-up workpiece models in the virtual work space;

generating the virtual bulk pile data of the plurality of piled-up workpiece models, which are set in the setting of the workpiece model, in the virtual work space as a virtually formed work space;

identifying an estimated region that is estimated to be three-dimensionally measurable by the sensor model which is disposed above the virtual work space, based on a position and a posture of each workpiece model in the virtual bulk pile data generated in the generating of the virtual bulk pile data and the angle threshold; and executing a picking motion simulation for verifying the picking motion from the virtual bulk pile of the workpiece models in the virtual work space, based on data of the estimated region identified in the identifying of the estimated region.

* * * * *